(12) United States Patent
Shin et al.

(10) Patent No.: US 10,193,734 B2
(45) Date of Patent: Jan. 29, 2019

(54) METHOD FOR TRANSCEIVING SIGNAL IN A WIRELESS COMMUNICATION SYSTEM AND APPARATUS FOR THE SAME

(71) Applicant: LG ELECTRONICS INC., Seoul (KR)

(72) Inventors: Seokmin Shin, Seoul (KR); Kunil Yum, Seoul (KR); Yunjung Yi, Seoul (KR); Bonghoe Kim, Seoul (KR); Hyunsoo Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 36 days.

(21) Appl. No.: 15/390,135

(22) Filed: Dec. 23, 2016

(65) Prior Publication Data

US 2017/0187563 A1 Jun. 29, 2017

Related U.S. Application Data

(60) Provisional application No. 62/290,892, filed on Feb. 3, 2016, provisional application No. 62/277,909, filed on Jan. 12, 2016, provisional application No. 62/387,372, filed on Dec. 24, 2015.

(51) Int. Cl.
*H04L 27/26* (2006.01)
*H04W 56/00* (2009.01)
*H04W 84/04* (2009.01)
*H04L 5/00* (2006.01)

(52) U.S. Cl.
CPC .......... *H04L 27/2675* (2013.01); *H04L 5/005* (2013.01); *H04L 5/0053* (2013.01); *H04L 27/2656* (2013.01); *H04W 56/0015* (2013.01); *H04L 27/2602* (2013.01); *H04W 84/042* (2013.01)

(58) Field of Classification Search
CPC ............ H04L 27/2675; H04L 27/2656; H04L 27/2602; H04L 5/005; H04L 5/0053; H04W 56/0015; H04W 84/042
See application file for complete search history.

(56) References Cited

U.S. PATENT DOCUMENTS

2015/0333880 A1* 11/2015 Yi ........................... H04L 5/001
370/329
2016/0262123 A1* 9/2016 Abedini ............ H04W 56/0015

* cited by examiner

*Primary Examiner* — Jianye Wu
(74) *Attorney, Agent, or Firm* — Lee Hong Degerman Kang Waimey

(57) ABSTRACT

Disclosed is a method for transmitting/receiving a signal in a wireless communication system supporting narrow-band (NB)-LTE, which is performed a terminal, including: receiving a narrow band synchronization signal from a base station; acquiring time synchronization and frequency synchronization with the base station based on the narrow band synchronization signal and detecting an identifier of the base station; and receiving a narrow band broadcast channel from the base station based on the detected identifier of the base station.

16 Claims, 32 Drawing Sheets

[FIG. 1]
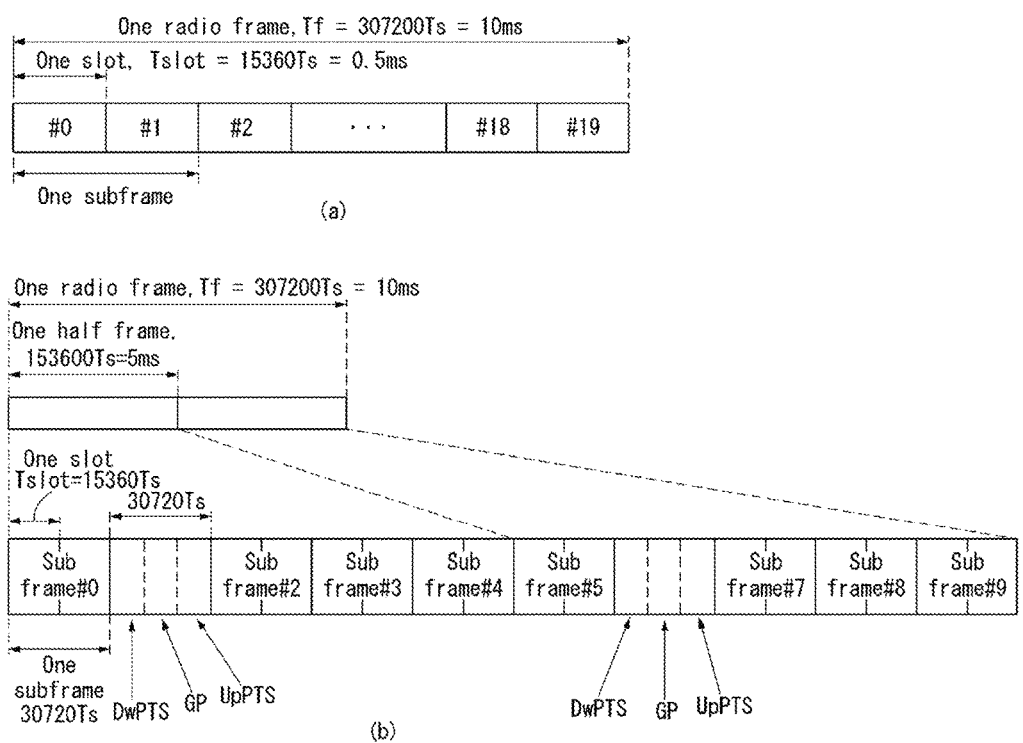

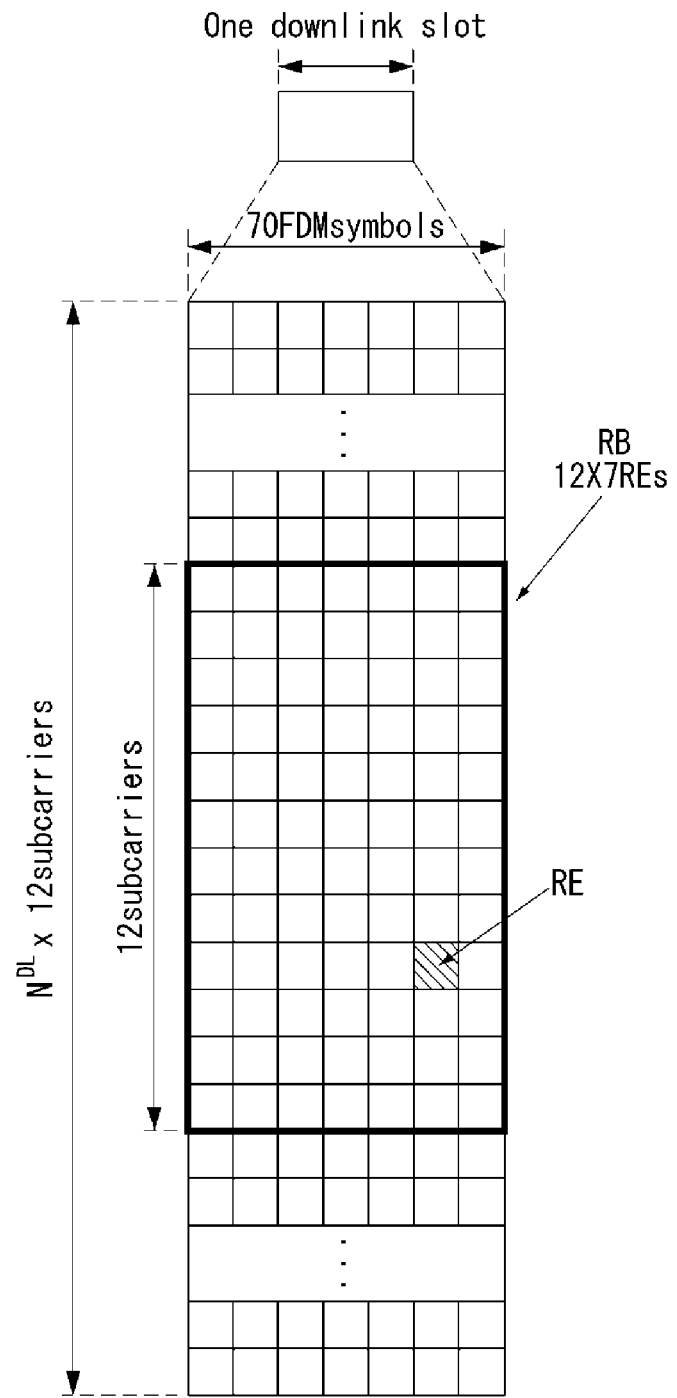
[FIG. 2]

[FIG. 3]
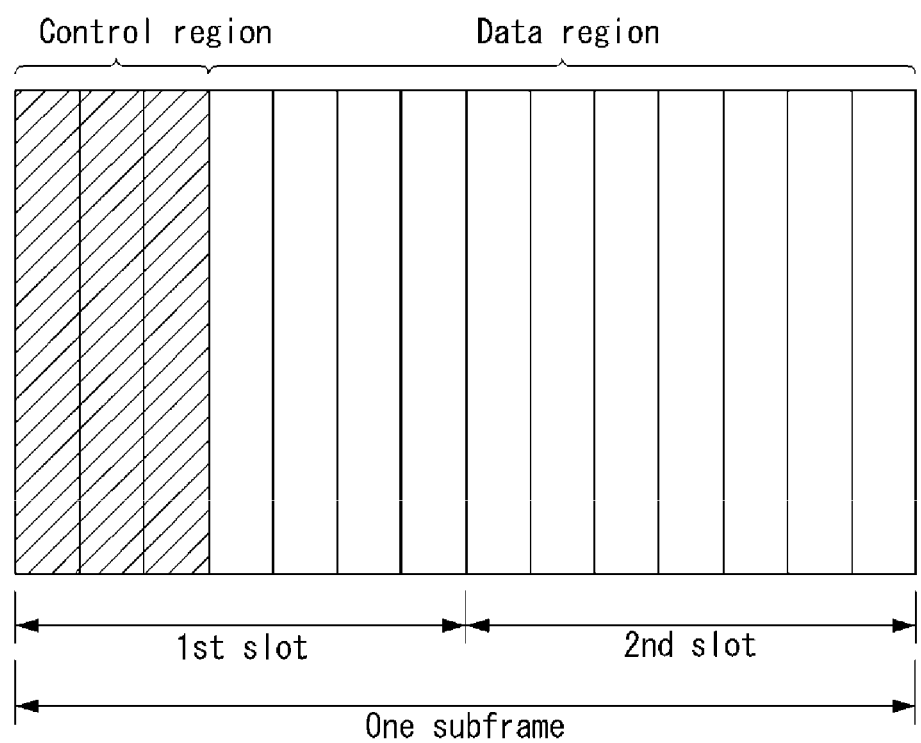

[FIG. 4]
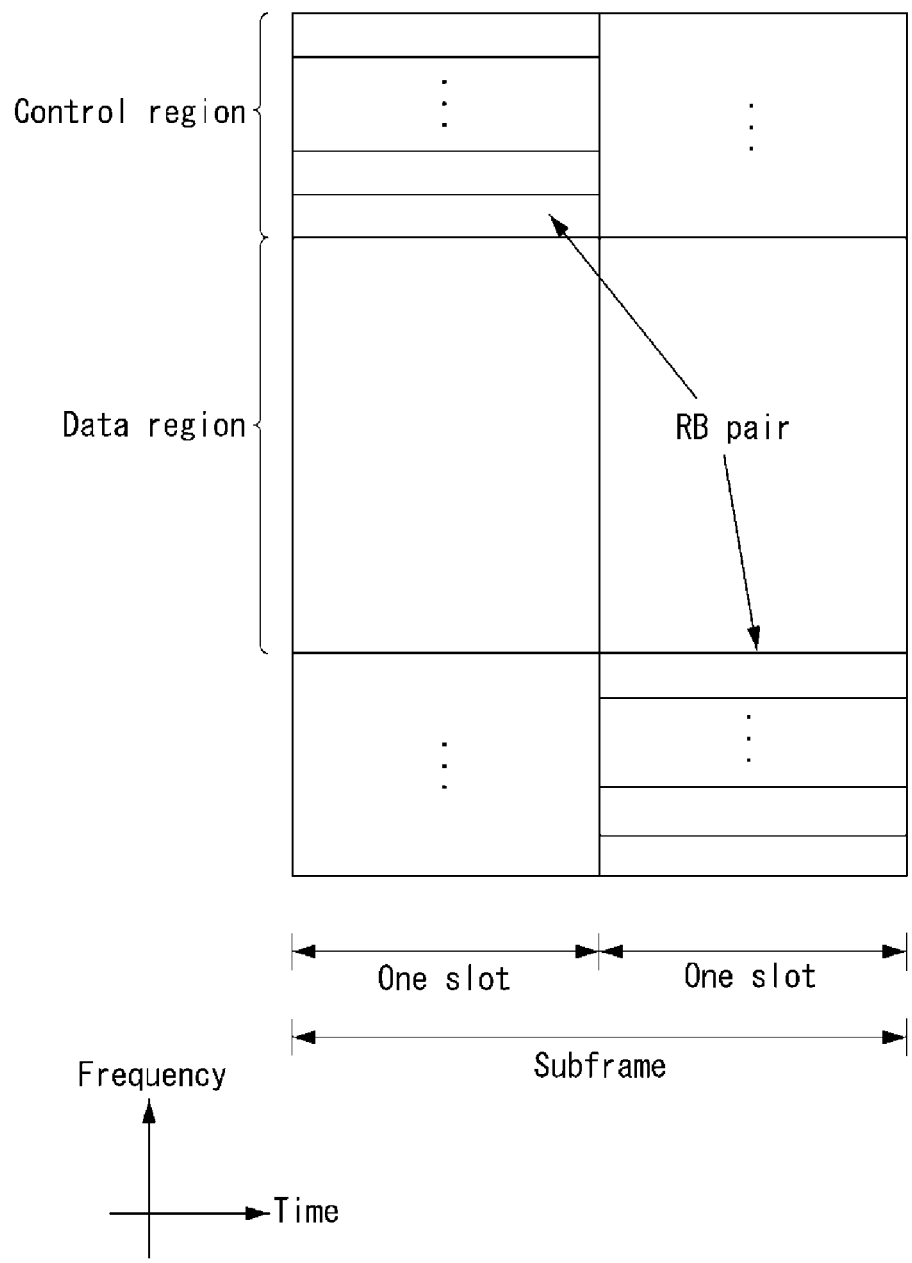

[FIG. 5]
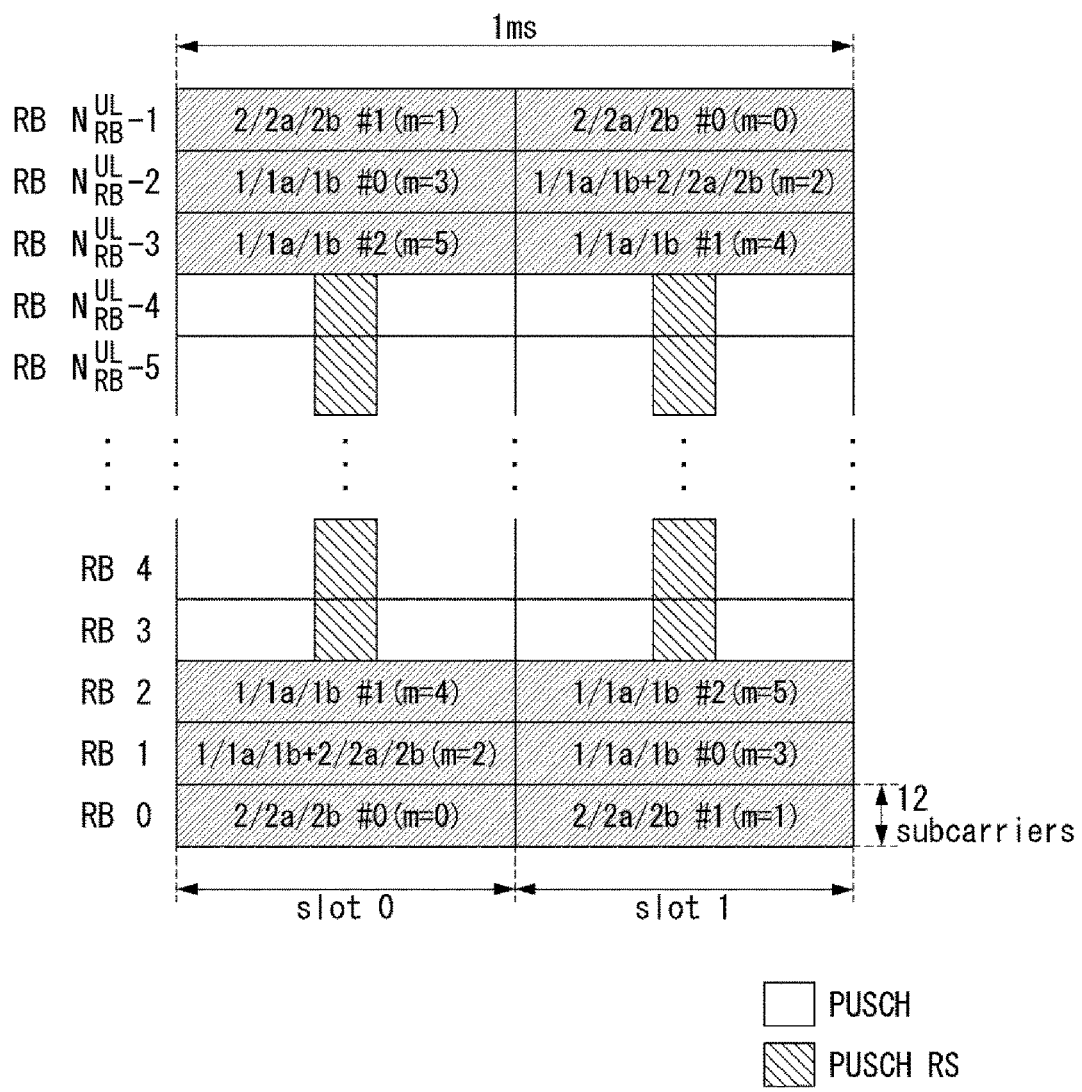

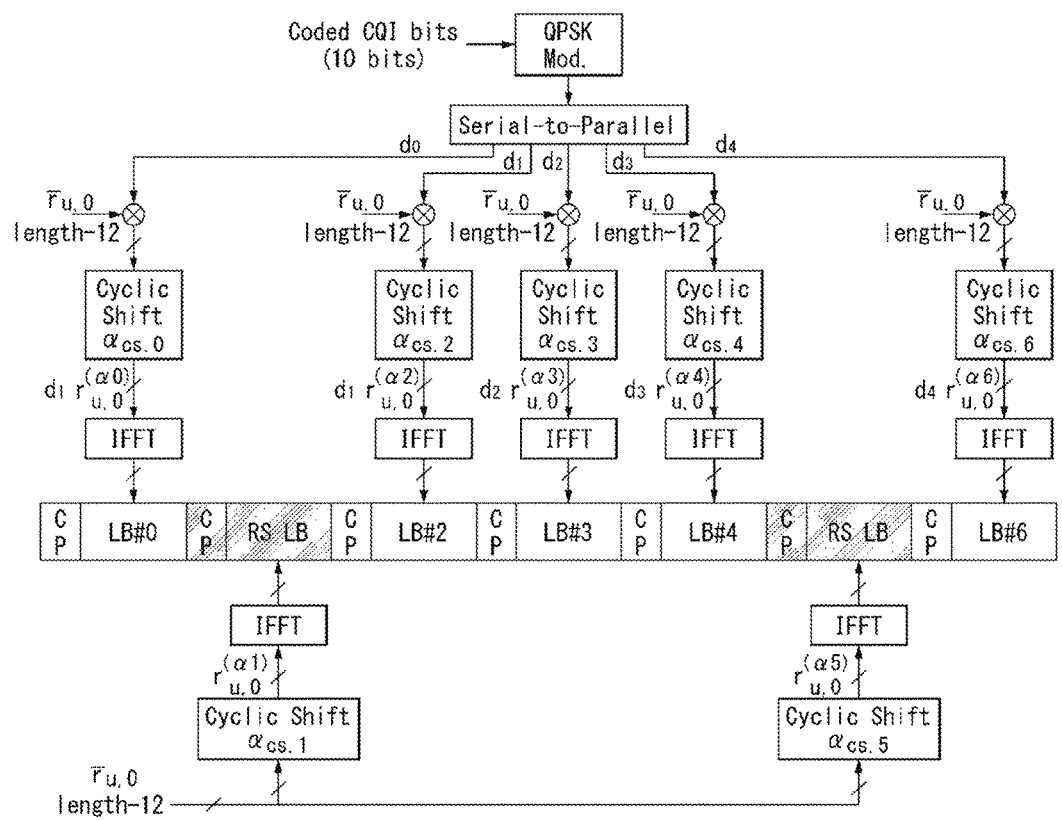
[FIG. 6]

[FIG. 7]
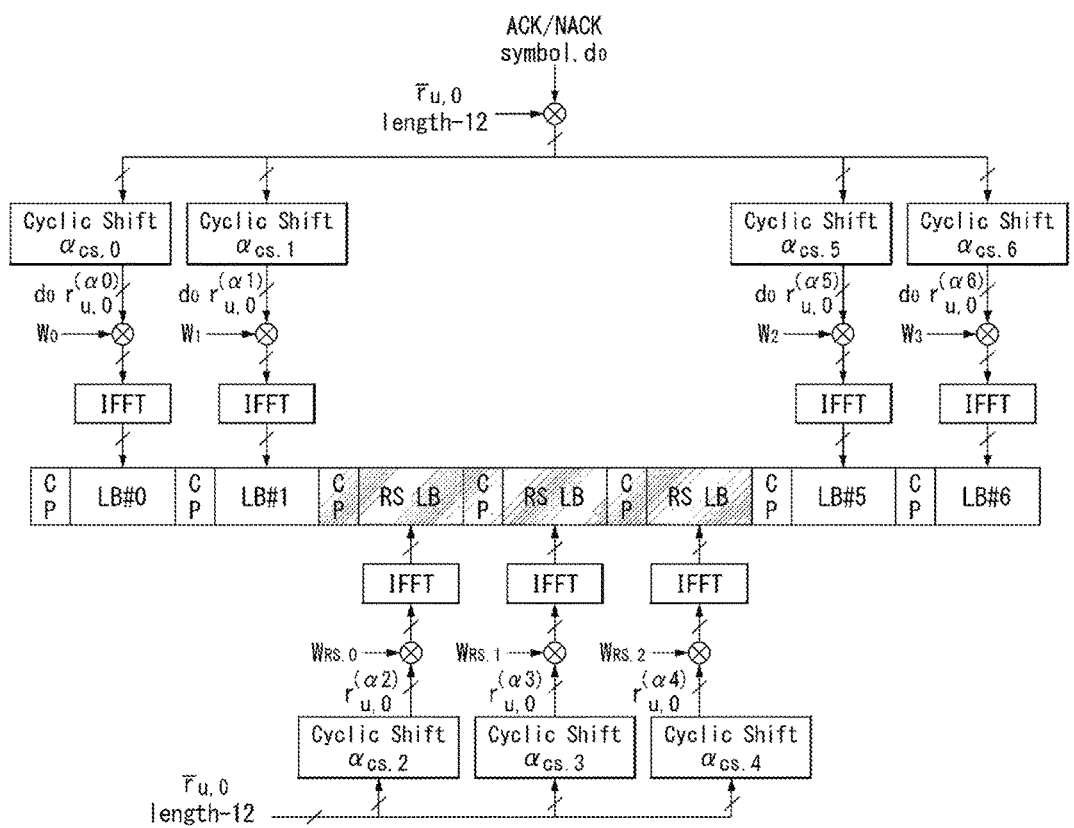

[FIG. 8]
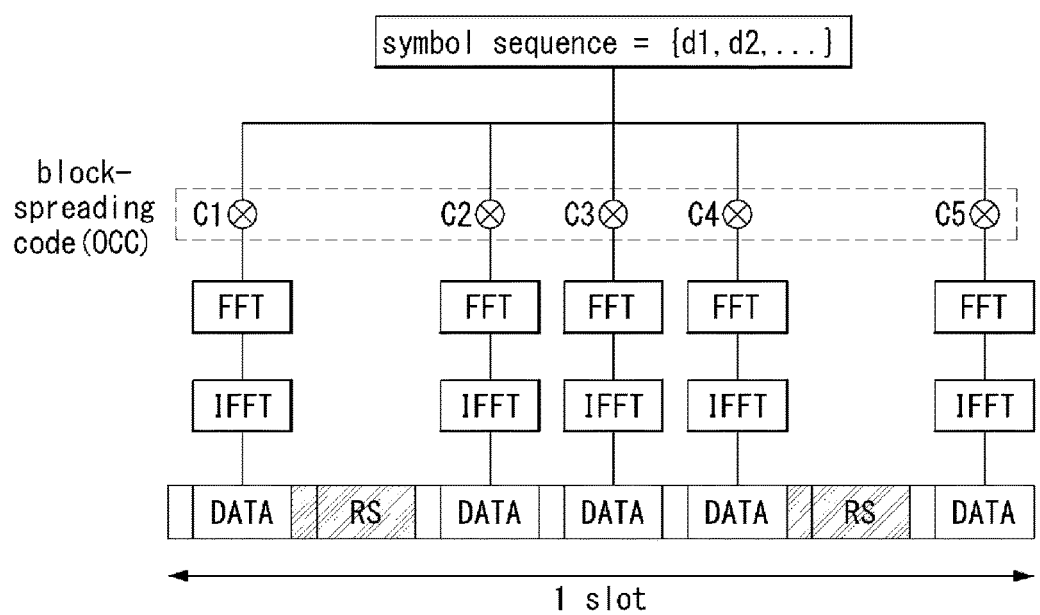

[FIG. 9]
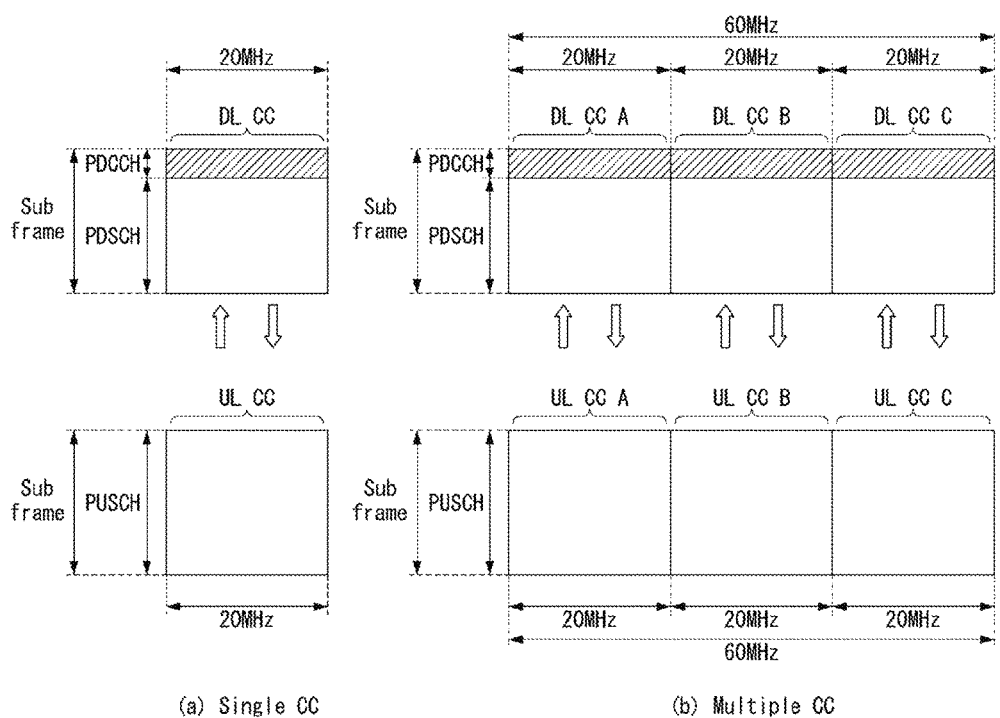
(a) Single CC                (b) Multiple CC

[FIG. 10]
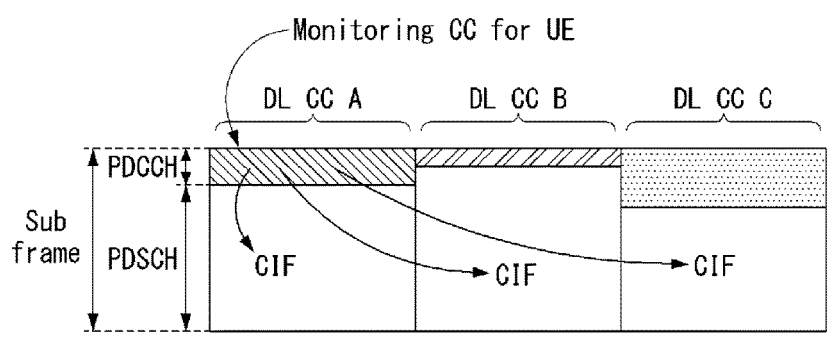
[FIG. 11]
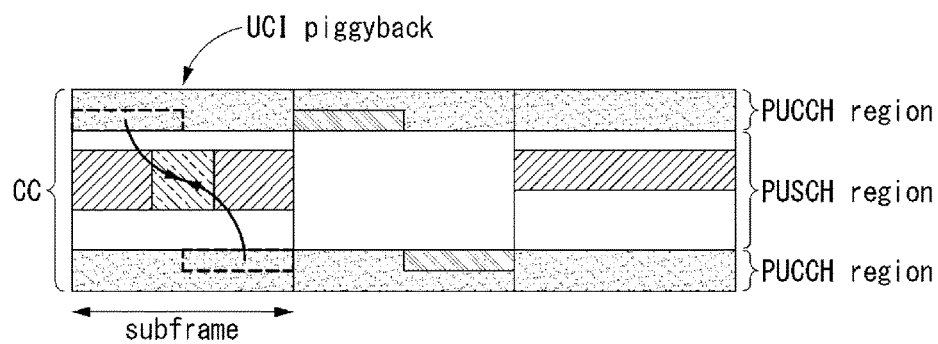

[FIG. 12]
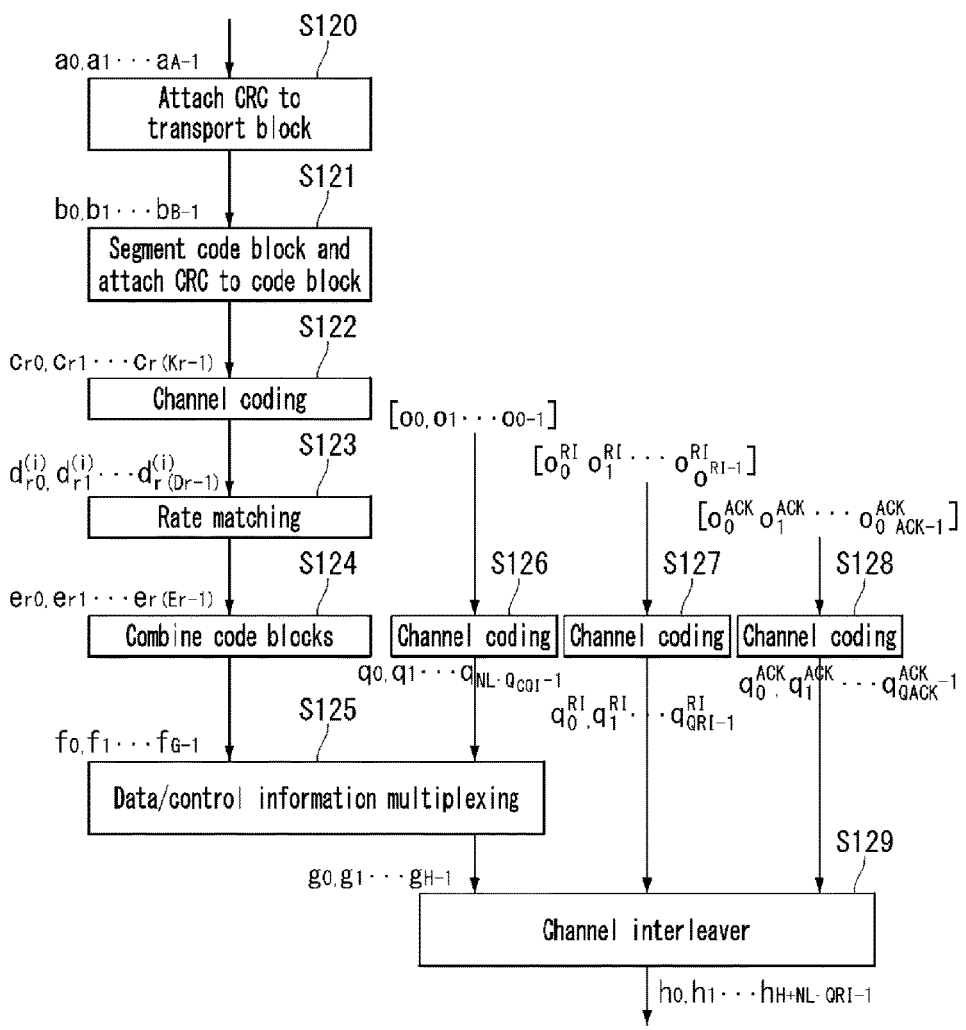

[FIG. 13]
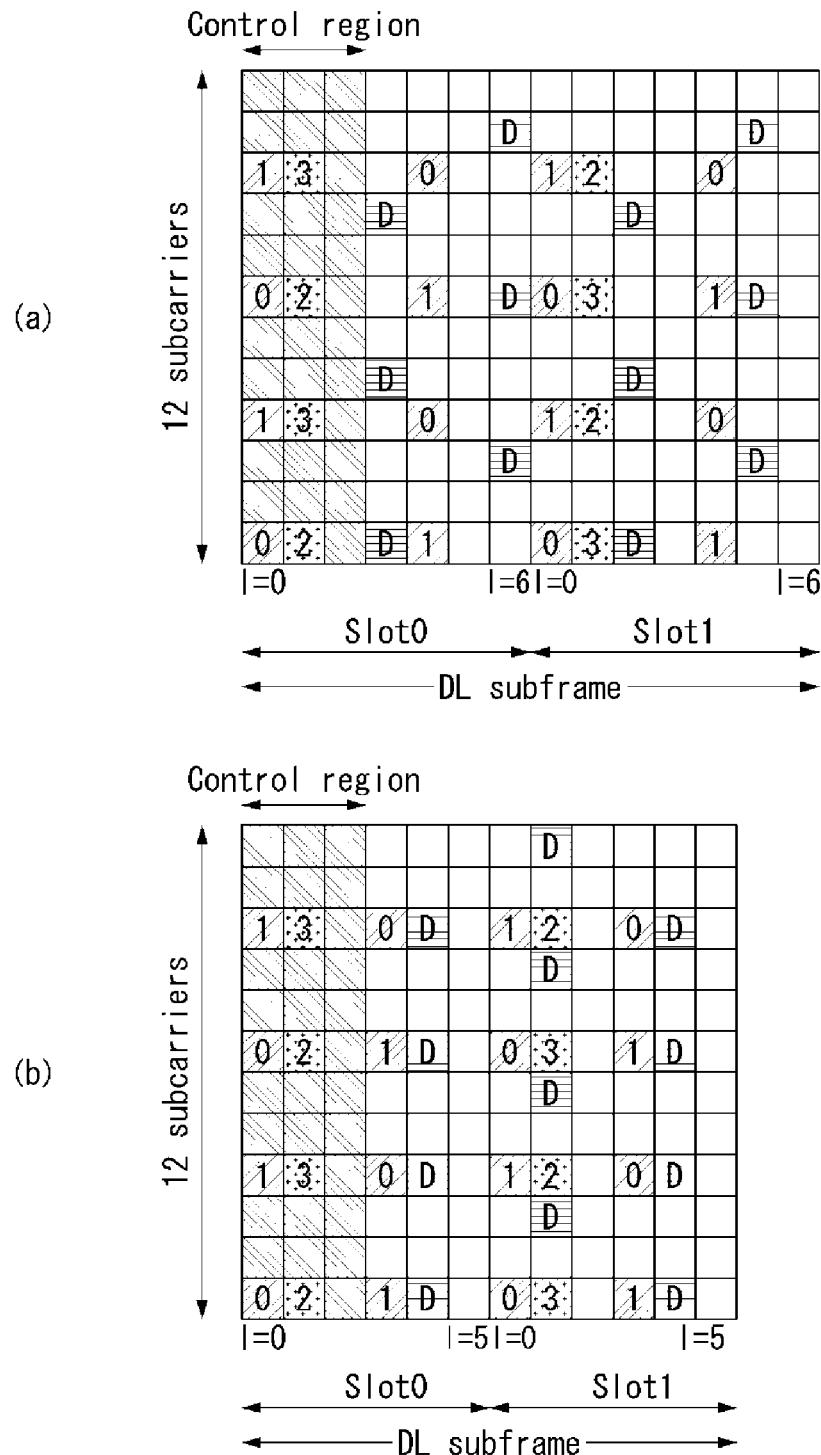

【FIG. 14】
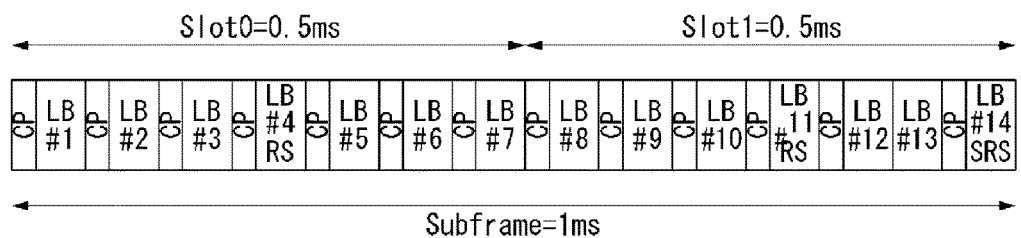
【FIG. 15】
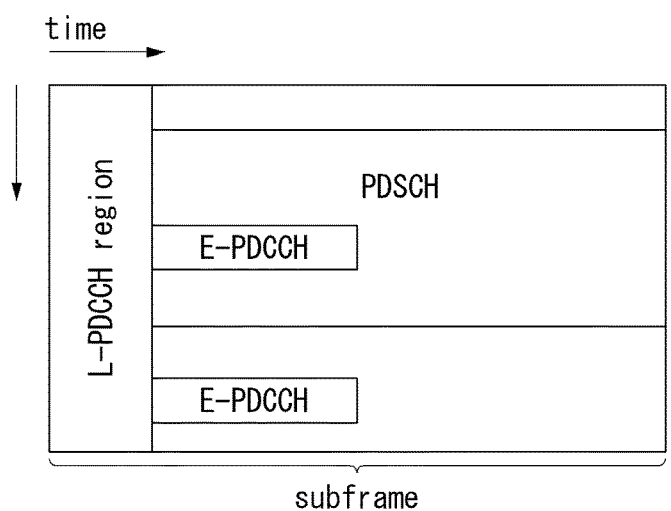

【FIG. 16】
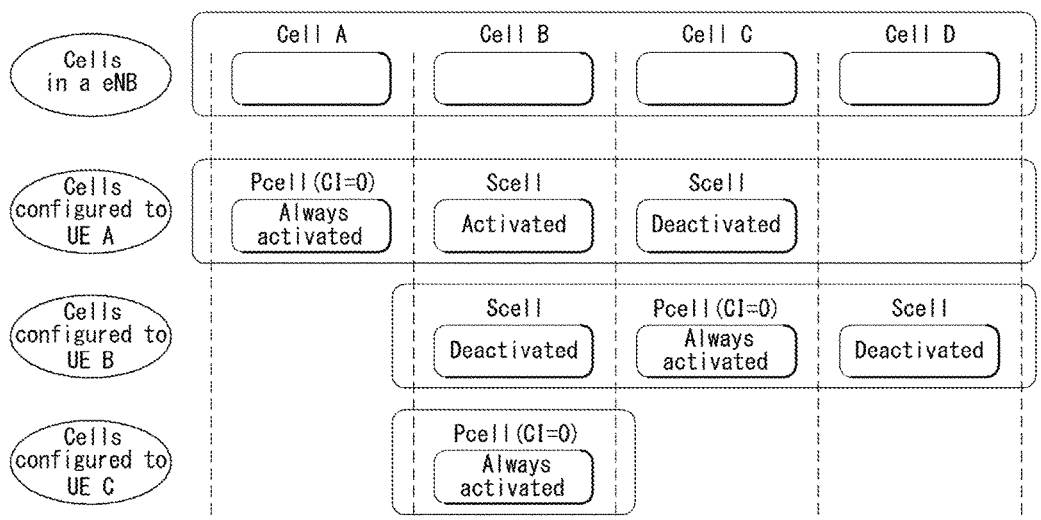
【FIG. 17】
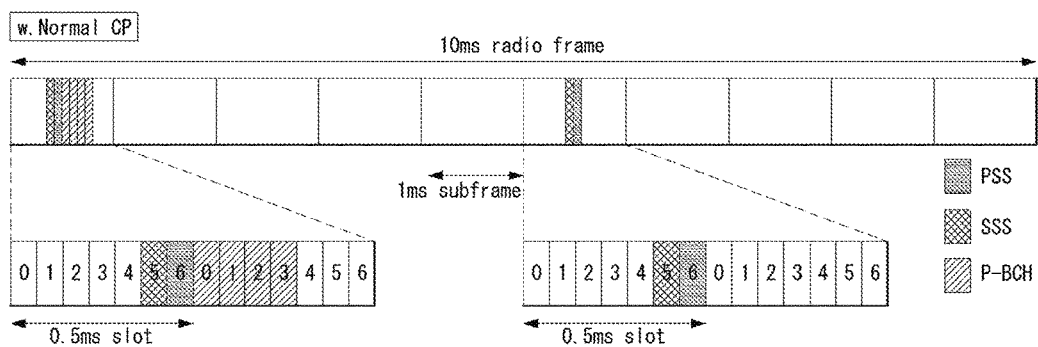

[FIG. 18]
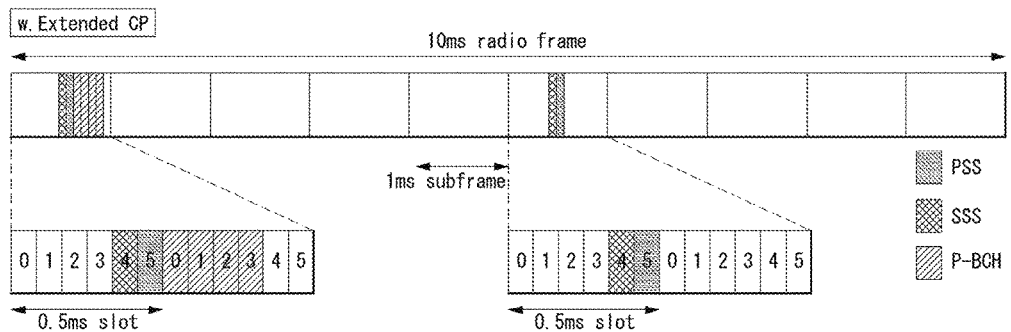
[FIG. 19]
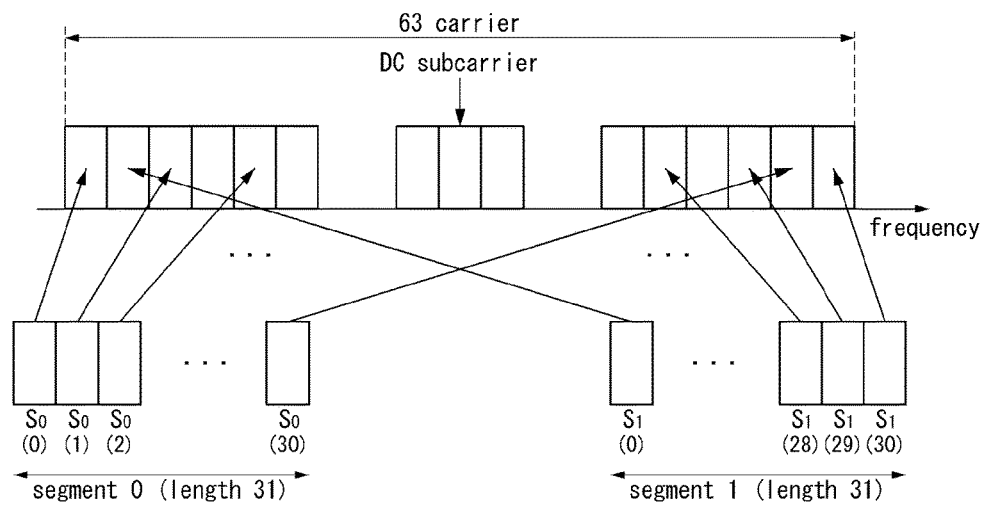

[FIG. 20]
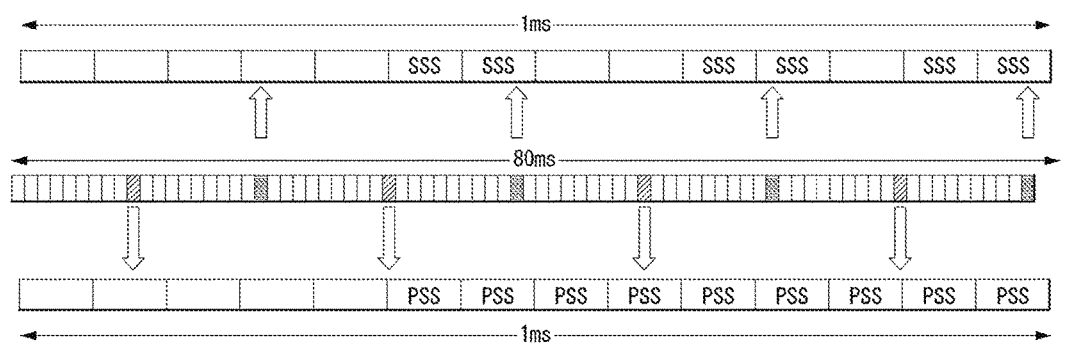
[FIG. 21]
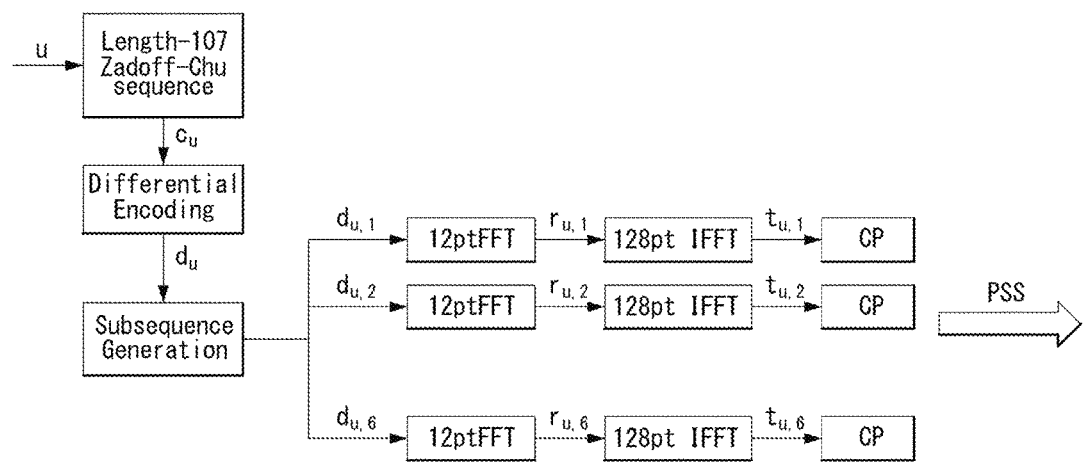

【FIG. 22】
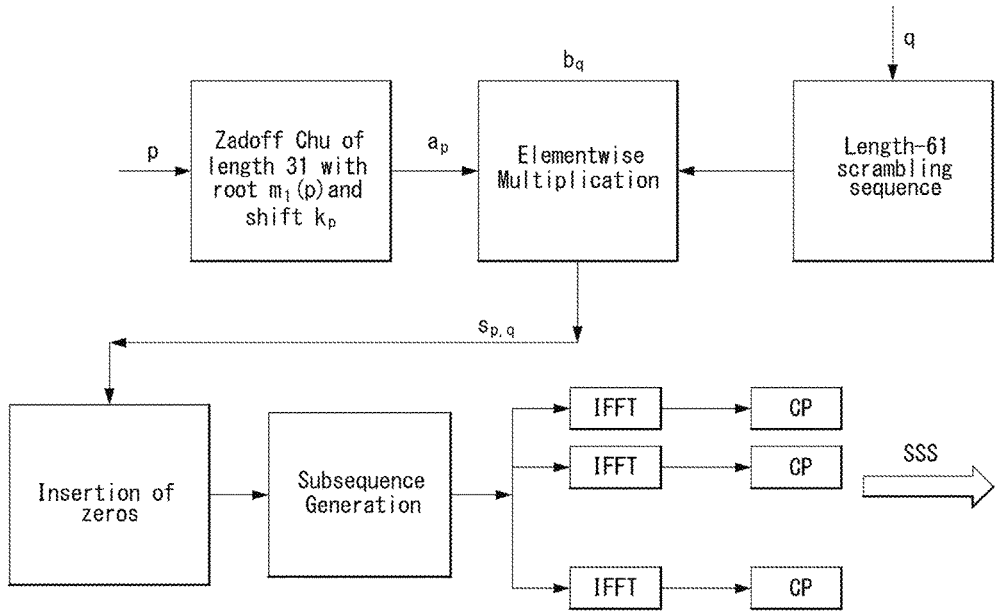
【FIG. 23】
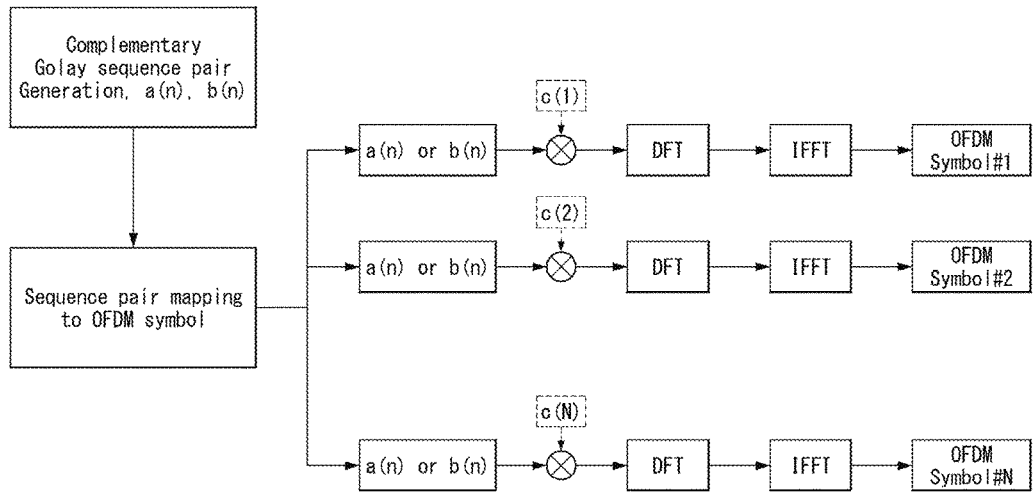

[FIG. 24]
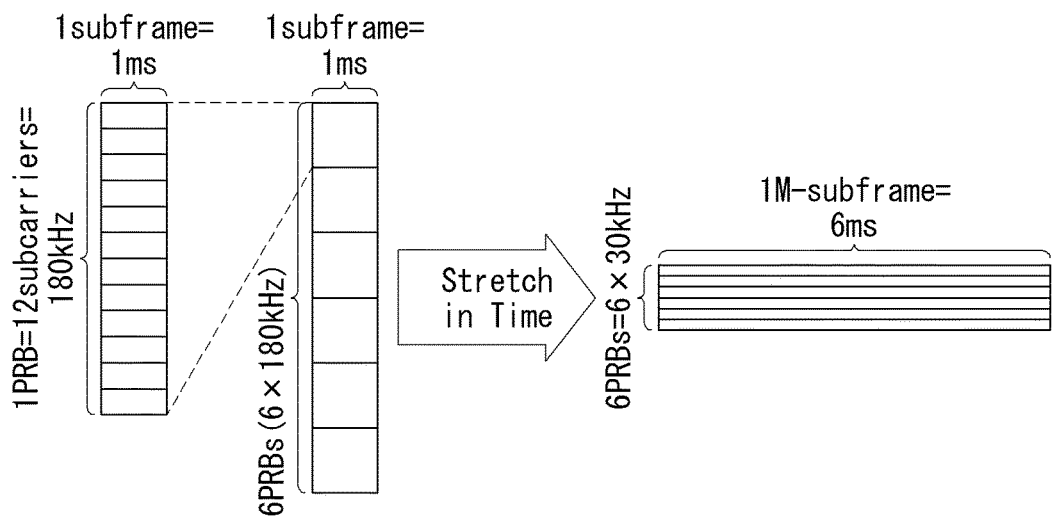
[FIG. 25]
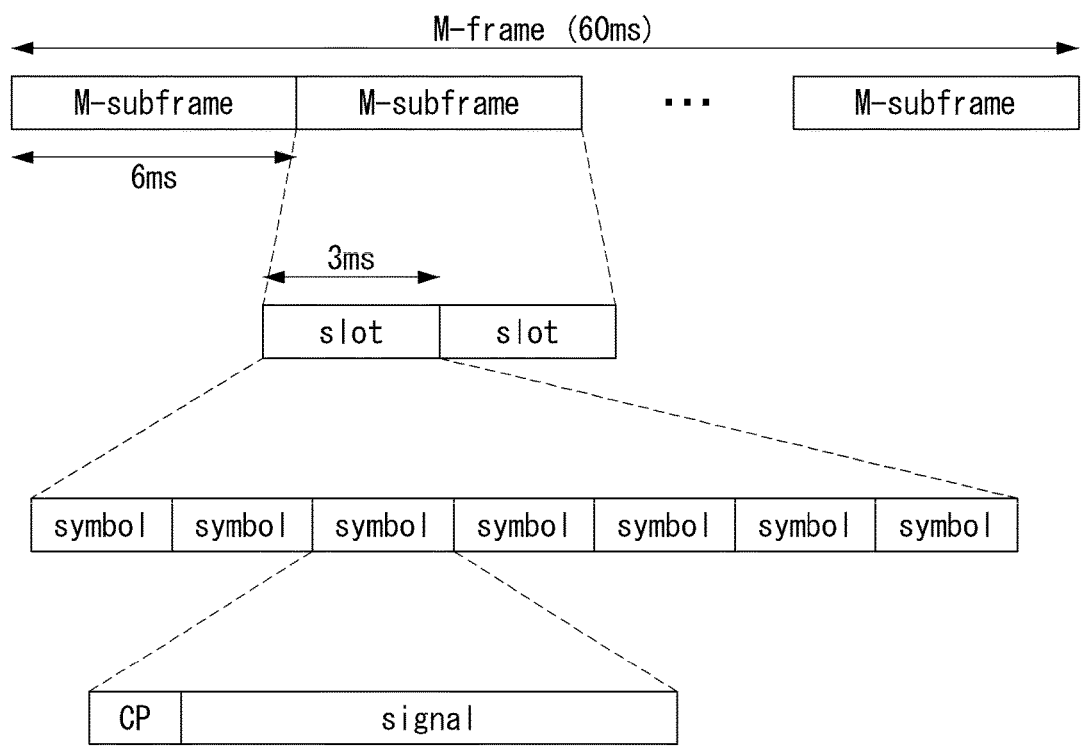

【FIG. 26】
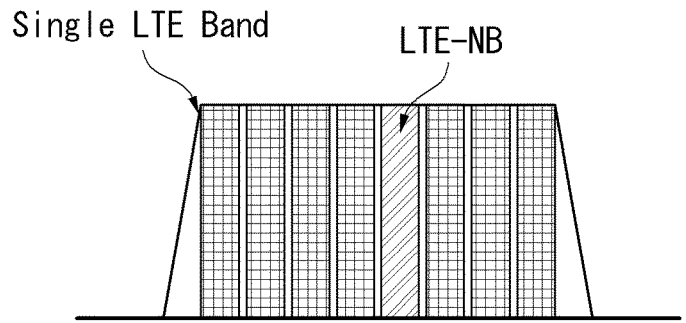
(a) In-band system
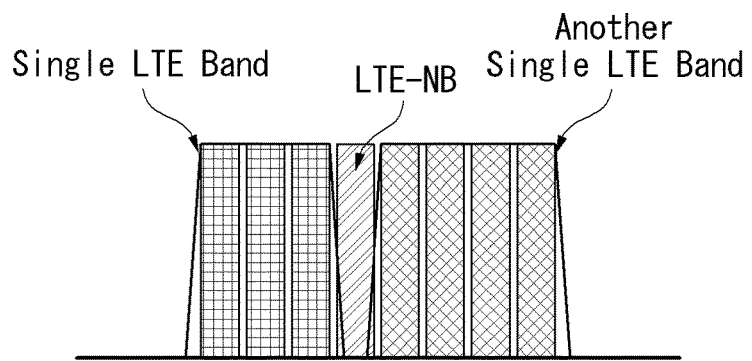
(b) Guard-band system
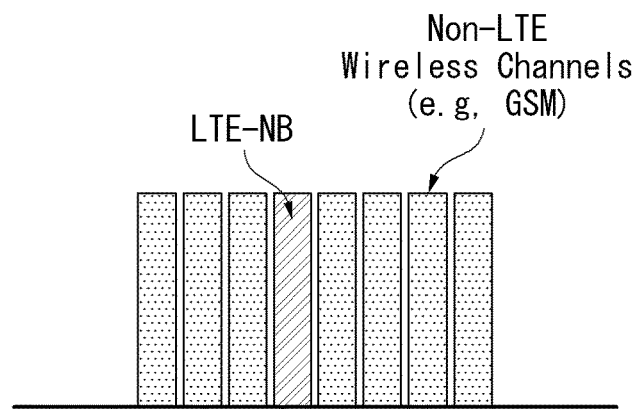
(c) Stand-alone system 【FIG. 27】
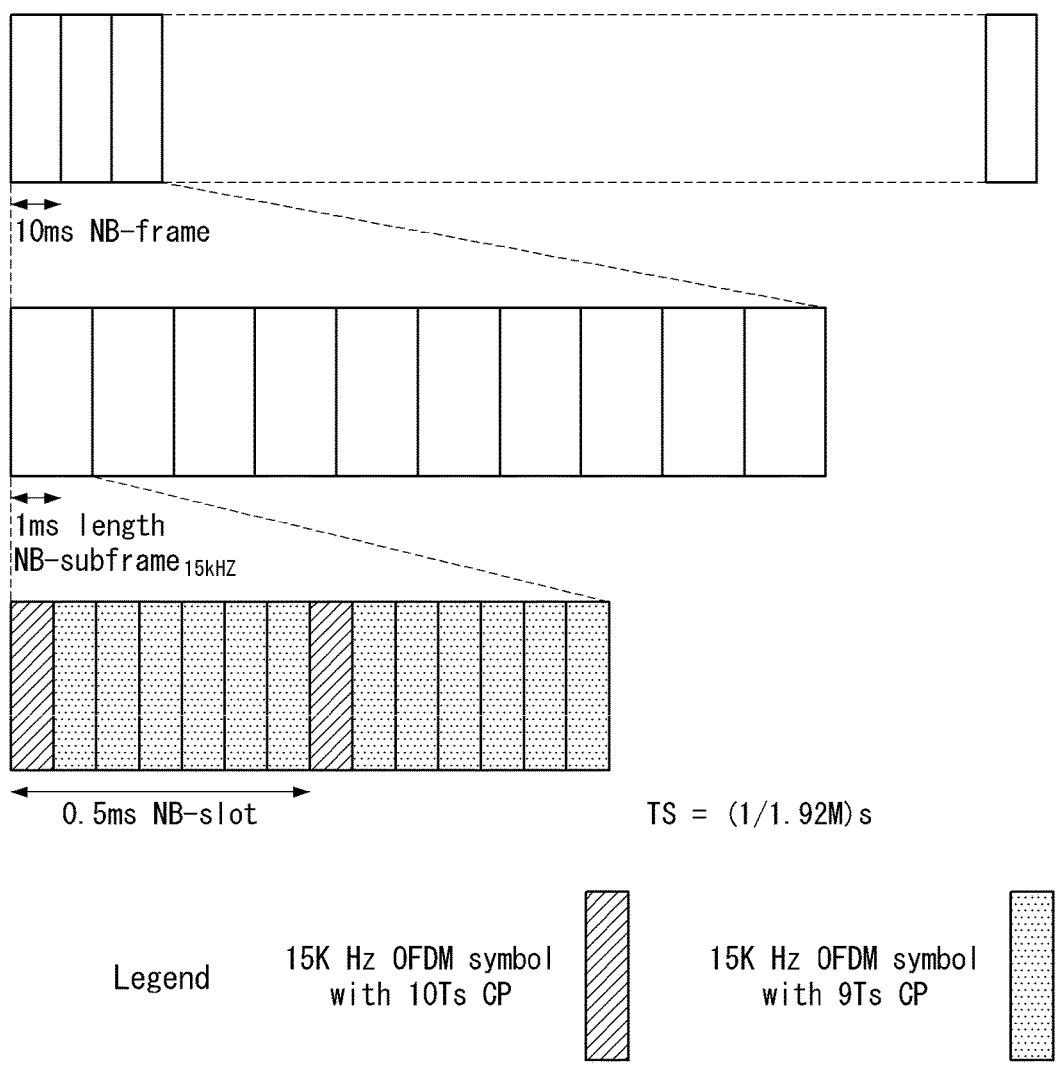

[FIG. 28]
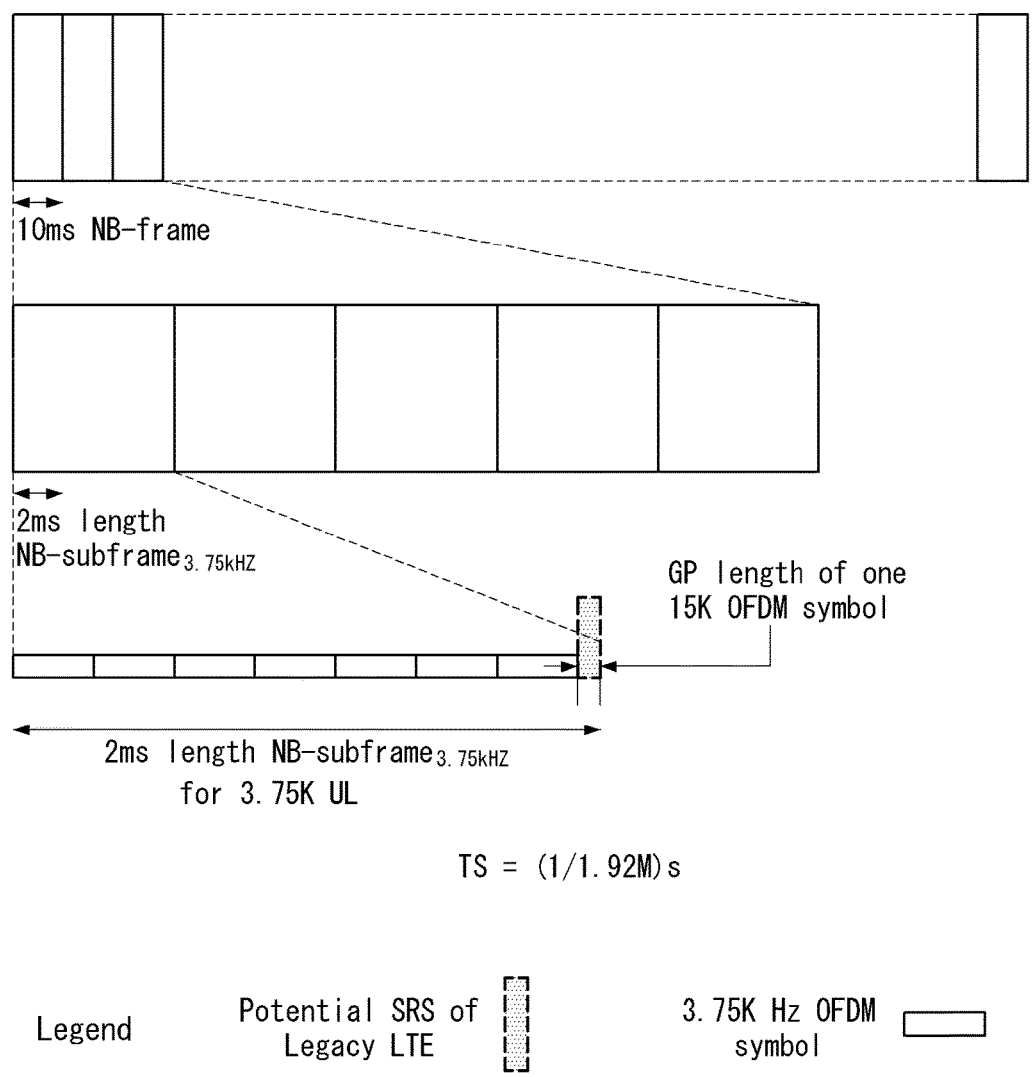

【FIG. 29】
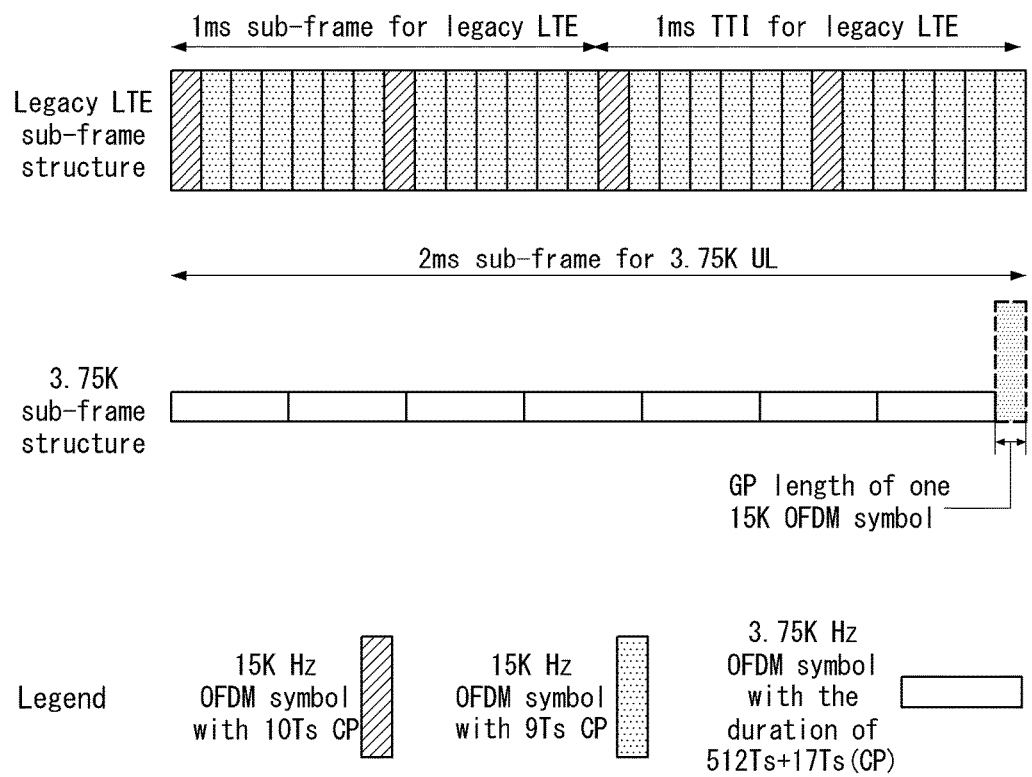
【FIG. 30】
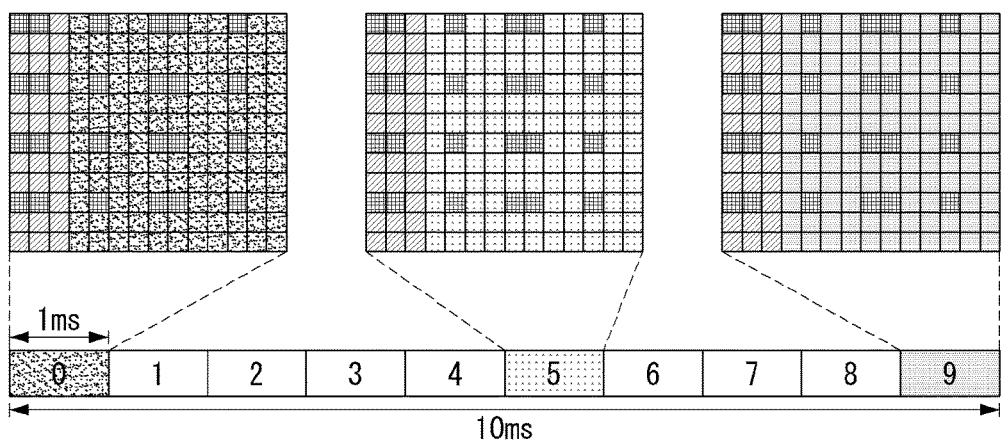

[FIG. 31]
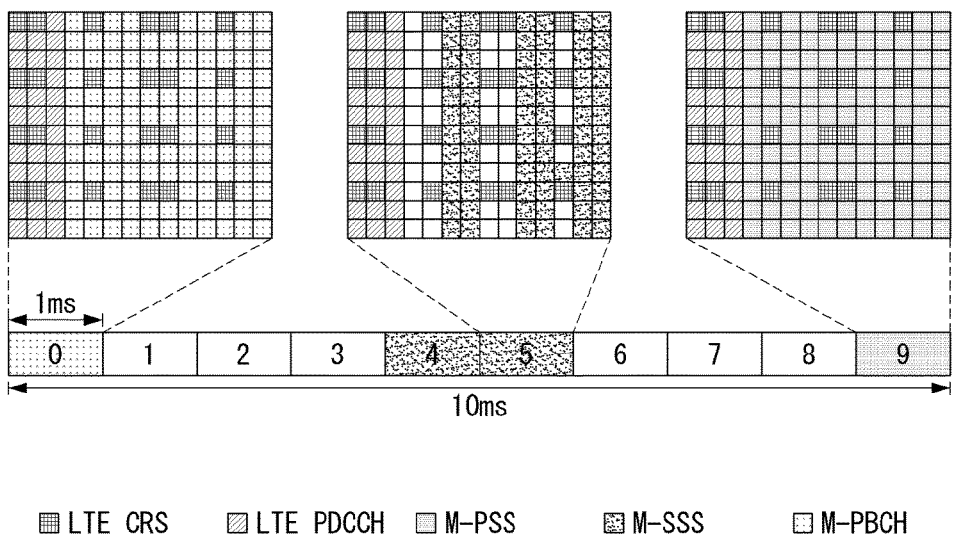
[FIG. 32]
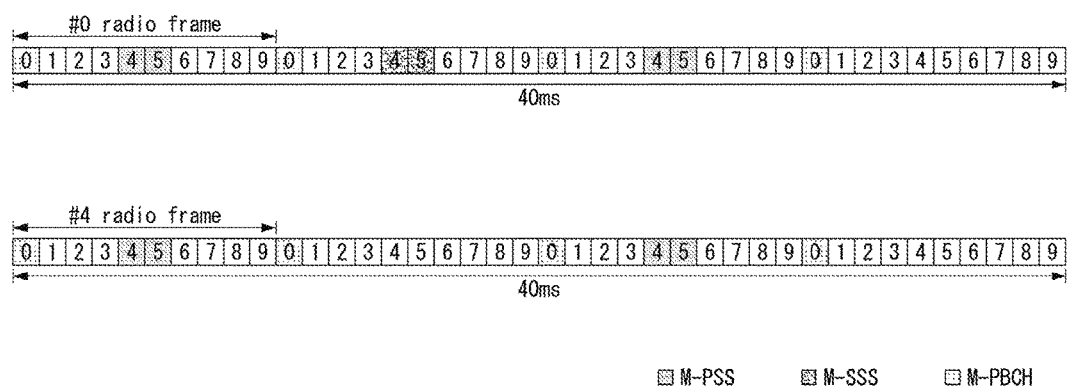

【FIG. 33】
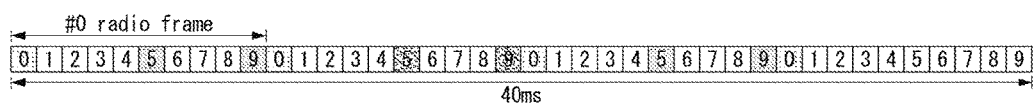
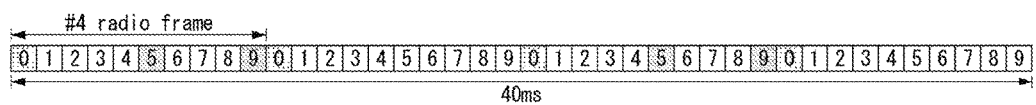
☐ M-PSS   ☒ M-SSS   ☐ M-PBCH
【FIG. 34】
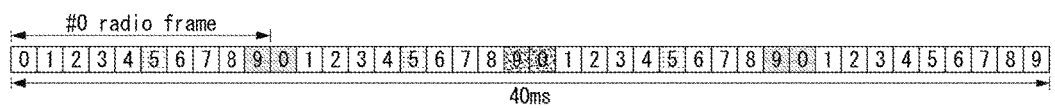
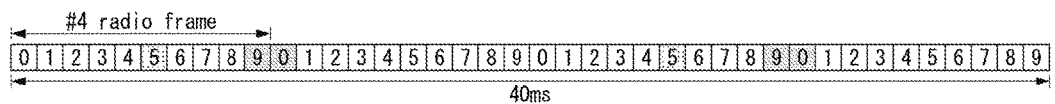
☐ M-PSS   ☒ M-SSS   ☐ M-PBCH

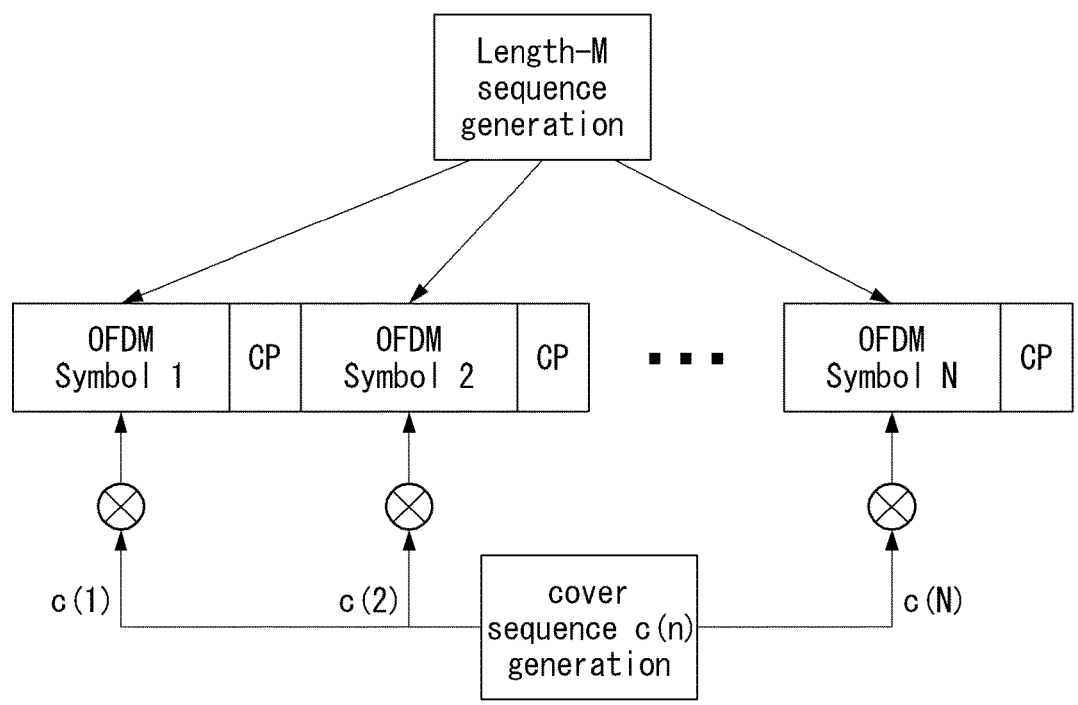
[FIG. 35]

[FIG. 36]
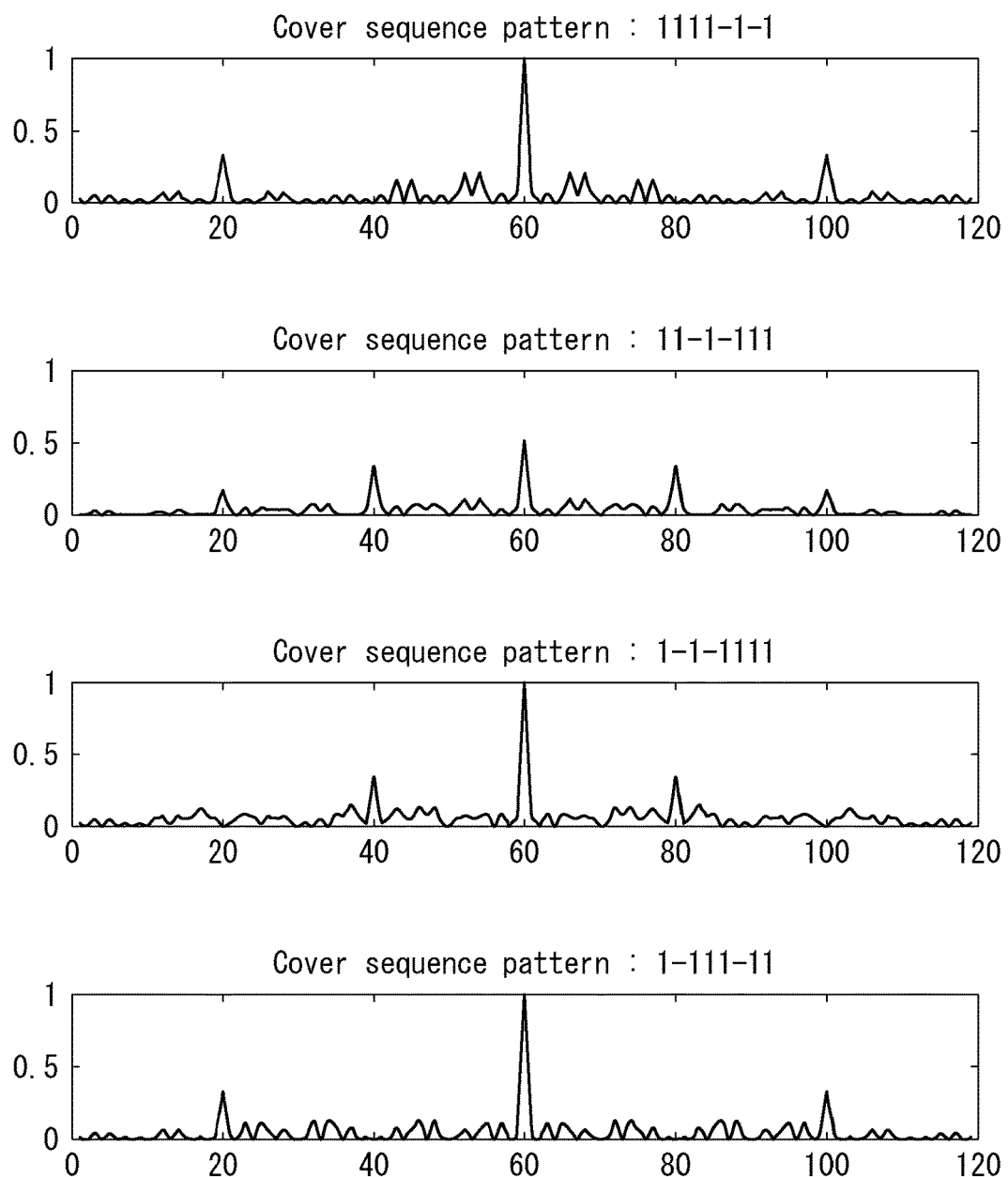

[FIG. 37]
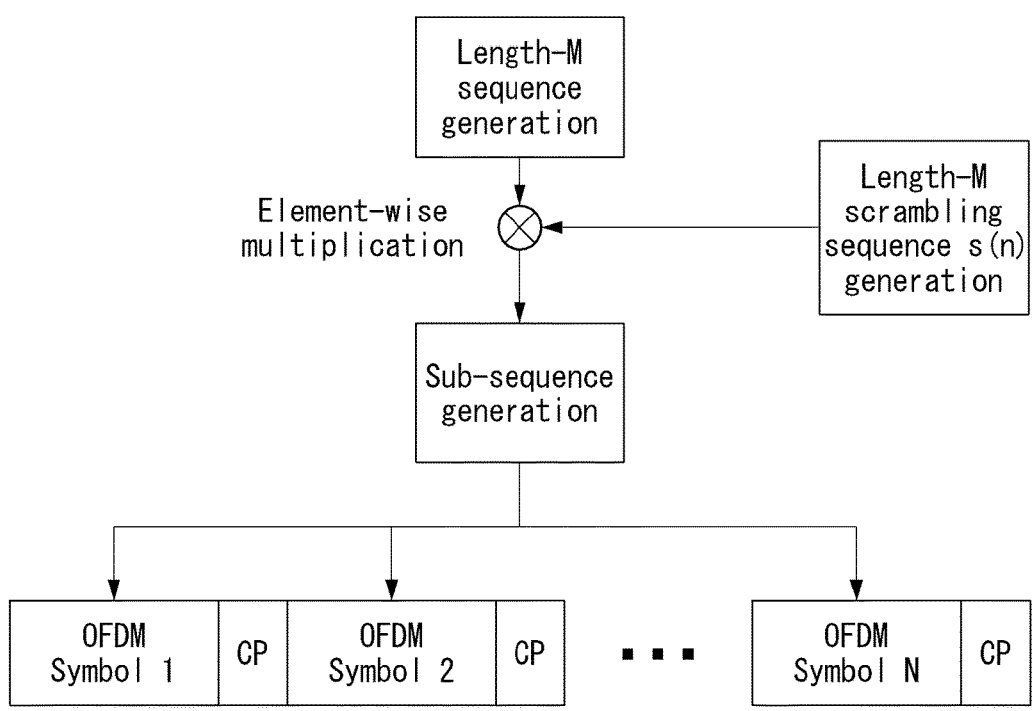

【FIG. 38】
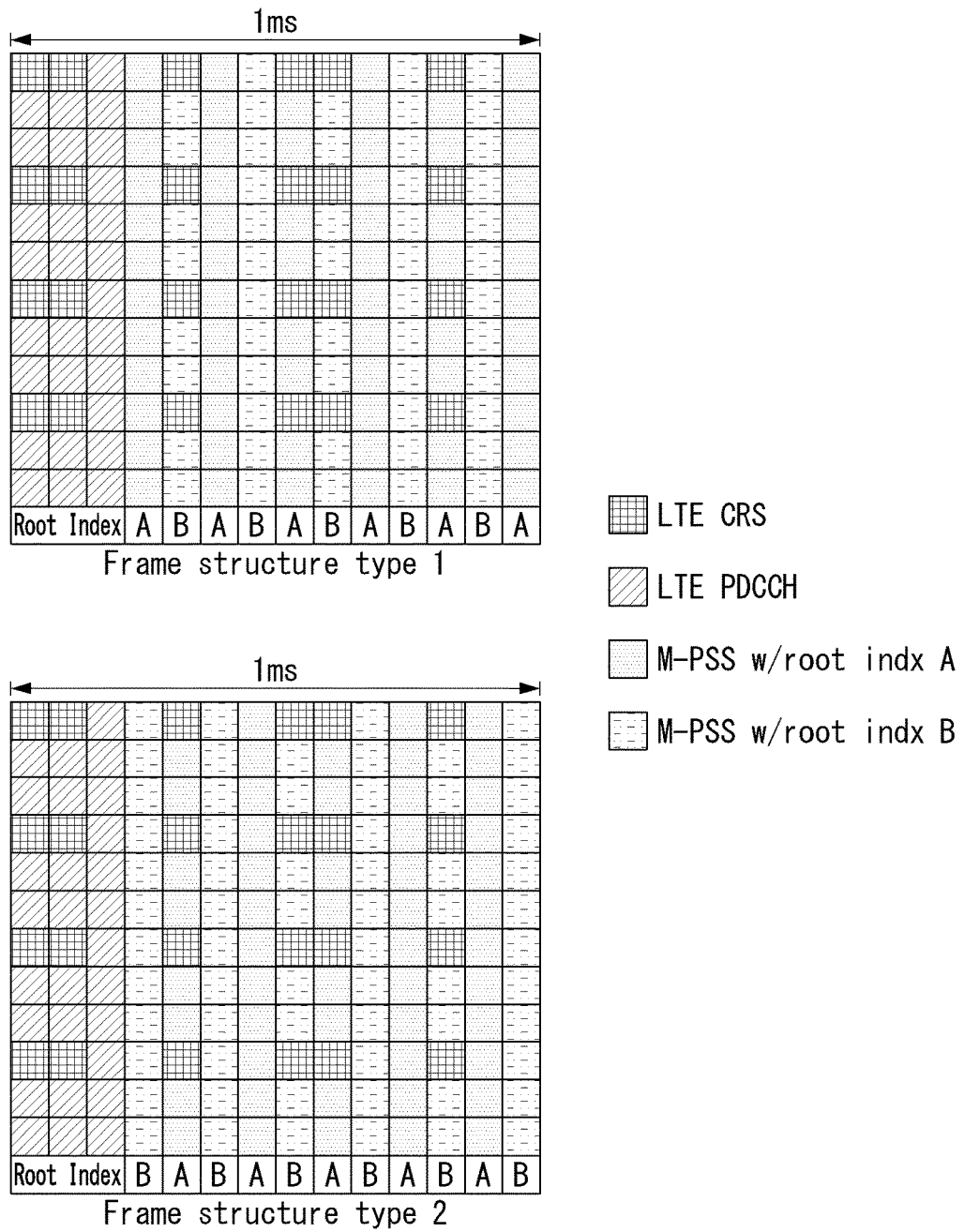

【FIG. 39】
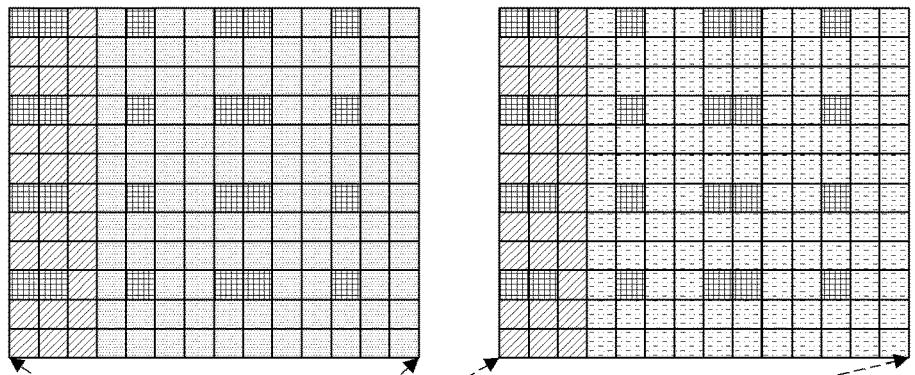
Frame structure type 1
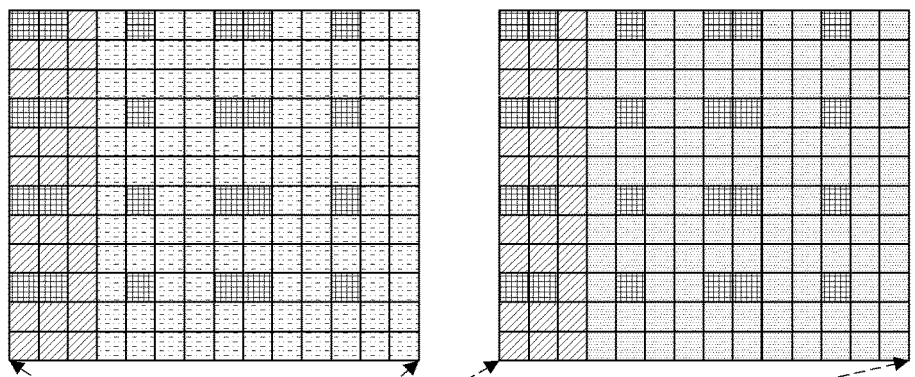
Frame structure type 2
- LTE CRS
- LTE PDCCH
- M-SSS
- M-PSS w/root indx A
- M-PSS w/root indx B 【FIG. 40】
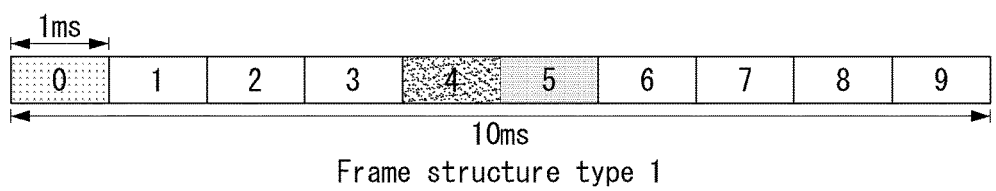
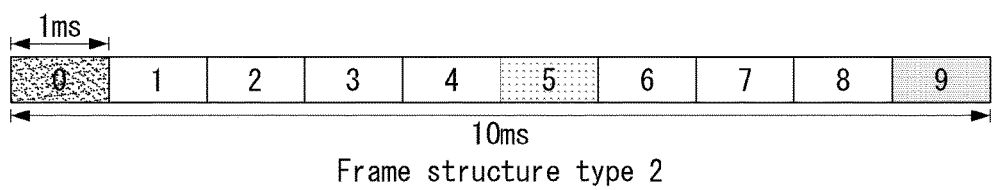
☐ M-PSS ▨ M-SSS ▨ M-PBCH
【FIG. 41】
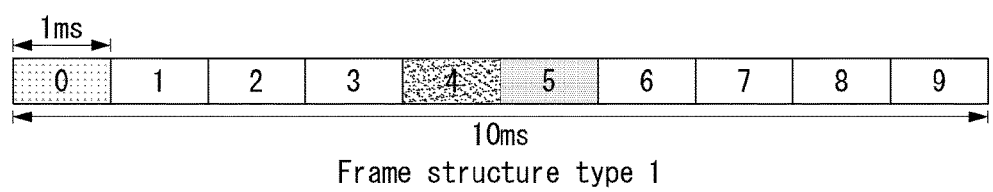
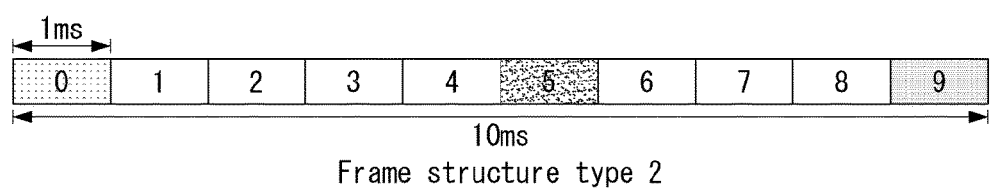
☐ M-PSS ▨ M-SSS ▨ M-PBCH

[FIG. 42]
10ms
Frame structure type 1
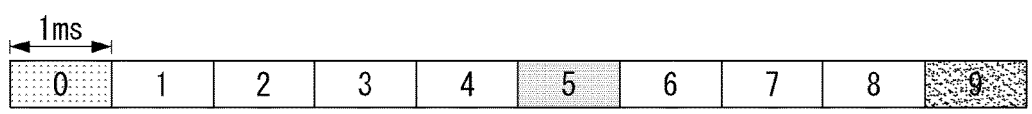
10ms
Frame structure type 2
☐ M-PSS  ▧ M-SSS  ☐ M-PBCH
[FIG. 43]
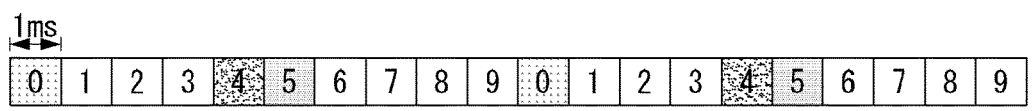
20ms
Frame structure type 1
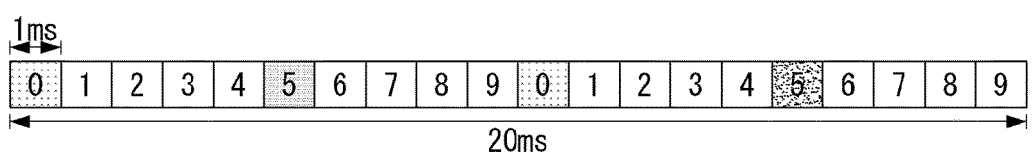
20ms
Frame structure type 2
☐ M-PSS  ▧ M-SSS  ☐ M-PBCH

[FIG. 44]
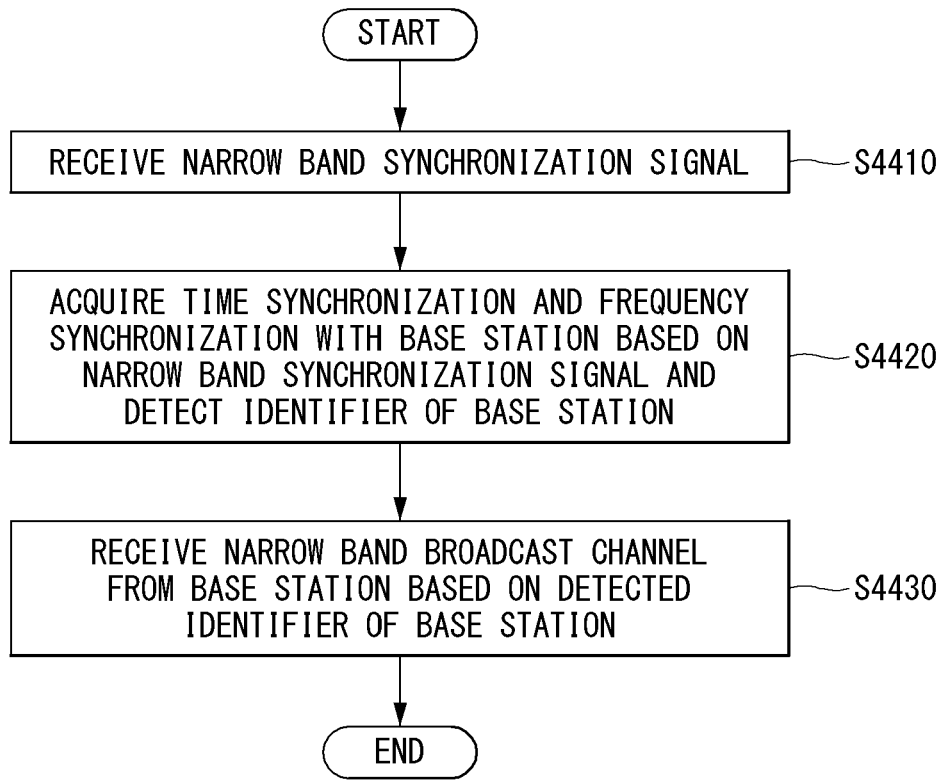
[FIG. 45]
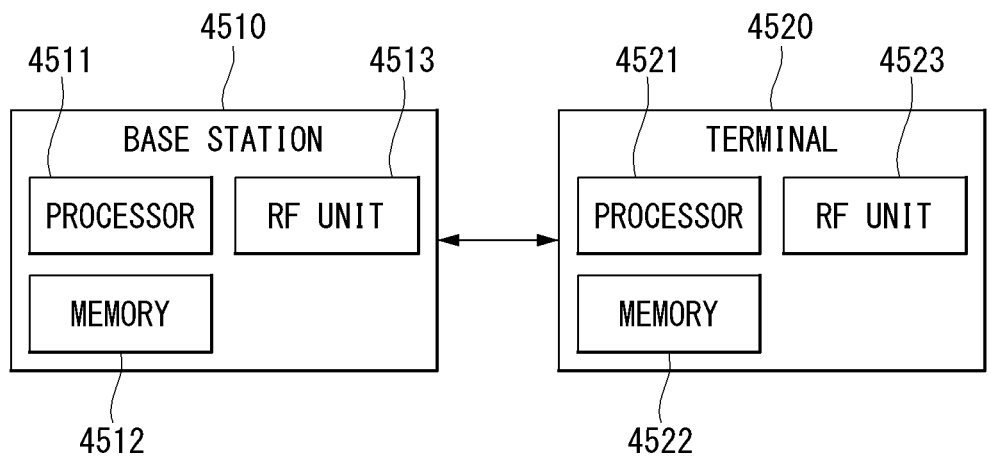

METHOD FOR TRANSCEIVING SIGNAL IN A WIRELESS COMMUNICATION SYSTEM AND APPARATUS FOR THE SAME

CROSS-REFERENCE TO RELATED APPLICATIONS

Pursuant to 35 U.S.C. § 119(e), this application claims the benefit of U.S. Provisional Patent Application Nos. 62/387,372, filed on Dec. 24, 2015, 62/277,909, filed on Jan. 12, 2016 and 62/290,892, filed on Feb. 3, 2016, the contents of which are all hereby incorporated by reference herein in their entirety.

BACKGROUND OF THE INVENTION

Field of the Invention

The present invention relates to a wireless communication system, and more particularly, to a method for transmitting/receiving a signal in a wireless communication system supporting narrowband (NB)-LTE and an apparatus for supporting the same.

Discussion of the Related Art

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

SUMMARY OF THE INVENTION

An object of the preset invention is to provide a pattern and/or a scheme in which a synchronization signal and a radio resource of a broadcast channel are mapped, which may be used for characteristics and a purpose of a narrowband LTE system in a wireless communication system supporting the narrowband LTE system.

Further, another object is to provide a method for transmitting/receiving a synchronization signal, a broadcast channel, and the like in an NB-LTE system considering a frame structure type defined in LTE.

The technical objects of the present invention are not limited to the aforementioned technical objects, and other technical objects, which are not mentioned above, will be apparently appreciated by a person having ordinary skill in the art from the following description.

In accordance with an embodiment of the present invention, a method for transmitting/receiving a signal in a wireless communication system supporting narrow-band (NB)-LTE, which is performed a terminal, including: receiving a narrow band synchronization signal from a base station; acquiring time synchronization and frequency synchronization with the base station based on the narrow band synchronization signal and detecting an identifier of the base station; and receiving a narrow band broadcast channel from the base station based on the detected identifier of the base station, wherein the narrow band synchronization signal and the narrow band broadcast channel are received through a narrow band (NB), the narrow band has a system bandwidth of 180 kHz and includes 12 subcarriers disposed at an interval of 15 kHz, the narrow band synchronization signal includes a narrow band primary synchronization signal and a narrow band secondary synchronization signal, the narrow band primary synchronization signal and the narrow band secondary synchronization signal are transmitted in different subframes, and the narrow band broadcast channel is transmitted in a first subframe of a radio frame.

Further, the narrow band primary synchronization signal may be transmitted in a $6^{th}$ subframe of the radio frame.

The narrow band synchronization signal and the narrow band broadcast channel may not be transmitted in at least one resource in which a reference signal (RS) is transmitted.

The narrow band synchronization signal and the narrow band broadcast channel may not be transmitted in first three symbols of the first subframe and the sixth subframe.

Further, the first subframe and the sixth subframe may be subframes which are not configured as a multicast broadcast single frequency network (MBSFN).

Transmission periods of the narrow band primary synchronization signal and the narrow band secondary synchronization signal may be set to be different from each other.

The transmission period of the narrow band secondary synchronization signal may be set to 20 ms.

In addition, the narrow band synchronization signal and the narrow band broadcast channel may be transmitted through 11 orthogonal frequency division multiple access (OFDM) symbols.

Moreover, the narrow band secondary synchronization signal may be transmitted through 12 subcarriers.

Further, the method may further include verifying a frame structure type supported by the base station based on at least one of the narrow band synchronization signal and the narrow band broadcast channel.

Moreover, the narrow band synchronization signal is generated by using a Zadoff-Chu (ZC) sequence.

Further, the narrow band primary synchronization signal may be generated based on a first ZC sequence and a second ZC sequence having different root indexes.

In addition, the first ZC sequence and the second ZC sequence may be mapped to symbols to which the narrow band primary synchronization signal is transmitted, respectively.

Further, the frame structure type supported by the base station may be distinguished according to the order in which the first ZC sequence and the second ZC sequence are mapped to the symbols, respectively.

In addition, which the narrow band primary synchronization signal may be generated based on a ZC sequence having a specific length and the ZC sequence having the specific length may be mapped to the symbols to which the narrow band primary synchronization signal is transmitted.

In accordance with another embodiment of the present invention, a terminal for transmitting/receiving a signal in a wireless communication system supporting narrow-band (NB)-LTE, including: a radio frequency (RF) unit for transmitting/receiving a wireless signal; and a processor functionally connected with the RF unit, wherein the processor controls receiving a narrow band synchronization signal from a base station, acquiring time synchronization and frequency synchronization with the base station based on the narrow band synchronization signal and detecting an identifier of the base station, and receiving a narrow band broadcast channel from the base station based on the detected identifier of the base station, the narrow band synchronization signal and the narrow band broadcast channel are received through a narrow band (NB), the narrow band has a system bandwidth of 180 kHz and includes 12 subcarriers disposed at an interval of 15 kHz, the narrow band synchronization signal includes a narrow band primary synchronization signal and a narrow band secondary synchronization signal, the narrow band primary synchronization signal and the narrow band secondary synchronization signal are transmitted in different subframes, and the narrow band broadcast channel is transmitted in a first subframe of a radio frame.

According to embodiments of the present invention, since a narrowband synchronization signal is transmitted in a subframe not configured as an MBSFN subframe, a collision with a PMCH transmitted through a synchronization signal in a narrowband system and an MBSFN subframe in an LTE system can be prevented.

Further, since a narrowband synchronization signal is configured not to be mapped to an OFDM symbol in which a control channel such as a PDCCH is transmitted or an OFDM symbol in which a CRS is transmitted, an impact of a legacy system caused due to introduction of a narrowband synchronization signal can be minimized.

In addition, since the narrowband synchronization signal is downlink-transmitted in a sixth subframe and a tenth subframe of a radio frame, the narrowband synchronization signal satisfies the most combinations/components among combinations/components that previously define uplink transmission or downlink transmission for each subframe.

Since the narrowband synchronization signal is transmitted by using remaining 11 OFDM symbols other than an OFDM symbol used for transmitting a reference signal or a control channel, a terminal can more accurately distinguish/decode the narrowband synchronization signal.

A frame structure type is defined to be distinguished through locations where the narrow synchronization signal and a narrowband broadcast channel are transmitted to reduce complexity for decoding of a terminal.

Effects which can be obtained in the present invention are not limited to the aforementioned effects and other unmentioned effects will be clearly understood by those skilled in the art from the following description.

BRIEF DESCRIPTION OF THE DRAWINGS

In order to help understanding of the present invention, the accompanying drawings which are included as a part of the Detailed Description provide embodiments of the present invention and describe the technical features of the present invention together with the Detailed Description.

FIG. 1 illustrates a structure of a radio frame in a wireless communication system to which the present invention can be applied.

FIG. 2 is a diagram illustrating a resource grid for one downlink slot in the wireless communication system to which the present invention can be applied.

FIG. 3 illustrates a structure of a downlink subframe in the wireless communication system to which the present invention can be applied.

FIG. 4 illustrates a structure of an uplink subframe in the wireless communication system to which the present invention can be applied.

FIG. 5 illustrates one example of a type in which PUCCH formats are mapped to a PUCCH area of an uplink physical resource block in the wireless communication system to which the present invention can be applied.

FIG. 6 illustrates a structure of a CQI channel in the case of a normal CP in the wireless communication system to which the present invention can be applied.

FIG. 7 illustrates a structure of an ACK/NACK channel in the case of the normal CP in the wireless communication system to which the present invention can be applied.

FIG. 8 illustrates one example of generating and transmitting 5 SC-FDMA symbols during one slot in the wireless communication system to which the present invention can be applied.

FIG. 9 illustrates one example of a component carrier and carrier merging in the wireless communication system to which the present invention can be applied.

FIG. 10 illustrates one example of a subframe structure depending on cross carrier scheduling in the wireless communication system to which the present invention can be applied.

FIG. 11 illustrates one example of transmission channel processing of a UL-SCH in the wireless communication system to which the present invention can be applied.

FIG. 12 illustrates one example of a signal processing procedure of an uplink share channel which is a transport channel in the wireless communication system to which the present invention can be applied.

FIG. 13 illustrates a reference signal pattern mapped to a downlink resource block pair in the wireless communication system to which the present invention can be applied.

FIG. 14 illustrates an uplink subframe including a sounding reference signal symbol in the wireless communication system to which the present invention can be applied.

FIG. 15 is a diagram illustrating one example in which a legacy PDCCH, a legacy PDSCH, and a legacy E-PDCCH are multiplexed.

FIG. 16 is a diagram illustrating classification of cells of a system supporting carrier merging.

FIG. 17 is a diagram illustrating a frame structure used for SS transmission in a system using a normal cyclic prefix (CP).

FIG. 18 is a diagram illustrating the frame structure used for the SS transmission in a system using an extended CP.

FIG. 19 is a diagram illustrating two sequences in a logic area are interleaved and mapped in a physical area.

FIG. 20 is a diagram illustrating a frame structure in which an M-PSS and an M-SSS are mapped.

FIG. 21 is a diagram illustrating a method for generating an M-PSS according to an embodiment of the present invention.

FIG. 22 is a diagram illustrating a method for generating an M-SSS according to an embodiment of the present invention.

FIG. 23 illustrates one example of a method for implementing an M-PSS to which a method proposed by the present specification can be applied.

FIG. 24 is a diagram illustrating how uplink numerology is stretched in a time domain.

FIG. 25 is a diagram illustrating one example of time units for uplink of NB-LTE based on a 2.5 kHz subcarrier spacing.

FIG. 26 illustrates one example of an operation system of an NB LTE system to which a method proposed by the present specification can be applied.

FIG. 27 illustrates one example of an NB-frame structure for a 15 kHz subcarrier spacing to which a method proposed by the present specification can be applied.

FIG. 28 illustrates one example of an NB-frame structure for a 3.75 kHz subcarrier spacing to which a method proposed by the present specification can be applied.

FIG. 29 illustrates one example of an NB subframe structure for a 3.75 kHz subcarrier spacing to which a method proposed by the present specification can be applied.

FIG. 30 is a diagram illustrating one example of narrow band synchronization signal and narrow band broadcast channel configurations having the same location in a radio frame proposed by the present specification.

FIG. 31 is a diagram illustrating another example of the narrow band synchronization signal and narrow band broadcast channel configurations having the same location in the radio frame proposed by the present specification.

FIG. 32 is a diagram illustrating yet another example of the narrow band synchronization signal and narrow band broadcast channel configurations having the same location in the radio frame proposed by the present specification.

FIG. 33 is a diagram illustrating still yet another example of the narrow band synchronization signal and narrow band broadcast channel configurations having the same location in the radio frame proposed by the present specification.

FIG. 34 is a diagram illustrating still yet another example of the narrow band synchronization signal and narrow band broadcast channel configurations having the same location in the radio frame proposed by the present specification.

FIG. 35 illustrates one example of an M-PSS transmission structure to which a method proposed by the present specification can be applied.

FIG. 36 is a diagram illustrating correlation characteristics depending on various cover sequence patterns.

FIG. 37 illustrates one example of an SSS transmission structure to which the method proposed by the present specification can be applied.

FIG. 38 illustrates one example of a method for transmitting an M-PSS by using different sequences for each frame structure type proposed by the present specification.

FIG. 39 illustrates another example of the method for transmitting an M-PSS by using different sequences for each frame structure type proposed by the present specification.

FIG. 40 is a diagram illustrating one example of narrow band synchronization signal and narrow band broadcast channel configurations having different locations in a radio frame proposed by the present specification.

FIG. 41 is a diagram illustrating another example of the narrow band synchronization signal and narrow band broadcast channel configurations having different locations in the radio frame proposed by the present specification.

FIG. 42 is a diagram illustrating yet another example of the narrow band synchronization signal and narrow band broadcast channel configurations having different locations in the radio frame proposed by the present specification.

FIG. 43 is a diagram illustrating still yet another example of the narrow band synchronization signal and narrow band broadcast channel configurations having different locations in the radio frame proposed by the present specification.

FIG. 44 is a flowchart illustrating one example of a method for transmitting a narrow band synchronization signal and a narrow band synchronization signal by considering a frame structure type proposed by the present specification.

FIG. 45 is a diagram illustrating one example of an internal block diagram of a wireless communication apparatus to which the methods proposed by the present specification can be applied.

DETAILED DESCRIPTION OF THE EMBODIMENTS

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 shows he uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each sub frame of the radio frame, 'D' represents a subframe for downlink transmission, 'U' represents a subframe for uplink transmission, and 'S' represents a special subframe constituted by three fields such as the DwPTS, the GP, and the UpPTS. The uplink-downlink configuration may be divided into 7 configurations and the positions and/or the numbers of the downlink subframe, the special subframe, and the uplink subframe may vary for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms or 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal. Further, the configuration information as a kind of downlink control information may be transmitted through a physical downlink control channel (PDCCH) similarly to other scheduling information and may be commonly transmitted to all terminals in a cell through a broadcast channel as broadcasting information.

The structure of the radio frame is just one example and the number subcarriers included in the radio frame or the number of slots included in the subframe and the number of OFDM symbols included in the slot may be variously changed.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Physical Uplink Control Channel (PUCCH)

The uplink control information (UCI) transmitted through the PUCCH may include a scheduling request (SR), HARQ ACK/NACK information, and downlink channel measurement information.

The HARQ ACK/NACK information may be generated according to a downlink data packet on the PDSCH is successfully decoded. In the existing wireless communication system, 1 bit is transmitted as ACK/NACK information with respect to downlink single codeword transmission and 2 bits are transmitted as the ACK/NACK information with respect to downlink 2-codeword transmission.

The channel measurement information which designates feedback information associated with a multiple input multiple output (MIMO) technique may include a channel quality indicator (CQI), a precoding matrix index (PMI), and a rank indicator (RI). The channel measurement information may also be collectively expressed as the CQI.

20 bits may be used per subframe for transmitting the CQI.

The PUCCH may be modulated by using binary phase shift keying (BPSK) and quadrature phase shift keying (QPSK) techniques. Control information of a plurality of terminals may be transmitted through the PUCCH and when code division multiplexing (CDM) is performed to distinguish signals of the respective terminals, a constant amplitude zero autocorrelation (CAZAC) sequence having a length of 12 is primary used. Since the CAZAC sequence has a characteristic to maintain a predetermined amplitude in the time domain and the frequency domain, the CAZAC sequence has a property suitable for increasing coverage by decreasing a peak-to-average power ratio (PAPR) or cubic metric (CM) of the terminal. Further, the ACK/NACK information for downlink data transmission performed through the PUCCH is covered by using an orthogonal sequence or an orthogonal cover (OC).

Further, the control information transmitted on the PUCCH may be distinguished by using a cyclically shifted sequence having different cyclic shift (CS) values. The cyclically shifted sequence may be generated by cyclically shifting a base sequence by a specific cyclic shift (CS) amount. The specific CS amount is indicated by the cyclic shift (CS) index. The number of usable cyclic shifts may vary depending on delay spread of the channel. Various types of sequences may be used as the base sequence the CAZAC sequence is one example of the corresponding sequence.

Further, the amount of control information which the terminal may transmit in one subframe may be determined according to the number (that is, SC-FDMA symbols other an SC-FDMA symbol used for transmitting a reference signal (RS) for coherent detection of the PUCCH) of SC-FDMA symbols which are usable for transmitting the control information.

In the 3GPP LTE system, the PUCCH is defined as a total of 7 different formats according to the transmitted control information, a modulation technique, the amount of control information, and the like and an attribute of the uplink control information (UCI) transmitted according to each PUCCH format may be summarized as shown in Table 2 given below.

TABLE 2

| PUCCH Format | Uplink Control Information(UCI) |
|---|---|
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

PUCCH format 1 is used for transmitting only the SR. A waveform which is not modulated is adopted in the case of transmitting only the SR and this will be described below in detail.

PUCCH format 1 a or 1 b is used for transmitting the HARQ ACK/NACK. PUCCH format 1a or 1 b may be used when only the HARQ ACK/NACK is transmitted in a predetermined subframe. Alternatively, the HARQ ACK/NACK and the SR may be transmitted in the same subframe by using PUCCH format 1a or 1b.

PUCCH format 2 is used for transmitting the CQI and PUCCH format 2a or 2b is used for transmitting the CQI and the HARQ ACK/NACK.

In the case of an extended CP, PUCCH format 2 may be transmitted for transmitting the CQI and the HARQ ACK/NACK.

FIG. 5 illustrates one example of a type in which PUCCH formats are mapped to a PUCCH region of an uplink physical resource block in the wireless communication system to which the present invention can be applied.

In FIG. 5, $N_{RB}^{UL}$ represents the number of resource blocks in the uplink and 0, 1, . . . , $N_{RB}^{UL}-1$ mean numbers of physical resource blocks. Basically, the PUCCH is mapped to both edges of an uplink frequency block. As illustrated in FIG. 5, PUCCH format 2/2a/2b is mapped to a PUCCH region expressed as m=0, 1 and this may be expressed in such a manner that PUCCH format 2/2a/2b is mapped to resource blocks positioned at a band edge. Further, both PUCCH format 2/2a/2b and PUCCH format 1/1a/1b may be mixedly mapped to a PUCCH region expressed as m=2. Next, PUCCH format 1/1a/1b may be mapped to a PUCCH region expressed as m=3, 4, and 5. The number ($N_{RB}^{(2)}$) of PUCCH RBs which are usable by PUCCH format 2/2a/2b may be indicated to terminals in the cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency wise (alternatively, a frequency resolution) to be measured may be controlled by the base station. In the time domain, periodic and aperiodic CQI reporting may be supported. PUCCH format 2 may be used for only the periodic reporting and the PUSCH may be used for aperiodic reporting. In the case of the aperiodic reporting, the base station may instruct the terminal to transmit a scheduling resource loaded with individual CQI reporting for the uplink data transmission.

FIG. 6 illustrates a structure of a CQI channel in the case of a general CP in the wireless communication system to which the present invention can be applied.

In SC-FDMA symbols 0 to 6 of one slot, SC-FDMA symbols 1 and 5 (second and sixth symbols) may be used for transmitting a demodulation reference signal and the CQI information may be transmitted in the residual SC-FDMA symbols. Meanwhile, in the case of the extended CP, one SC-FDMA symbol (SC-FDMA symbol 3) is used for transmitting the DMRS.

In PUCCH format 2/2a/2b, modulation by the CAZAC sequence is supported and the CAZAC sequence having the length of 12 is multiplied by a QPSK-modulated symbol. The cyclic shift (CS) of the sequence is changed between the symbol and the slot. The orthogonal covering is used with respect to the DMRS.

The reference signal (DMRS) is loaded on two SC-FDMA symbols separated from each other by 3 SC-FDMA symbols among 7 SC-FDMA symbols included in one slot and the CQI information is loaded on 5 residual SC-FDMA symbols. Two RSs are used in one slot in order to support a high-speed terminal. Further, the respective terminals are distinguished by using the CS sequence. CQI information symbols are modulated and transferred to all SC-FDMA symbols and the SC-FDMA symbol is constituted by one sequence. That is, the terminal modulates and transmits the CQI to each sequence.

The number of symbols which may be transmitted to one TTI is 10 and modulation of the CQI information is determined up to QPSK. When QPSK mapping is used for the SC-FDMA symbol, since a CQI value of 2 bits may be loaded, a CQI value of 10 bits may be loaded on one slot. Therefore, a CQI value of a maximum of 20 bits may be loaded on one subframe. A frequency domain spread code is used for spreading the CQI information in the frequency domain.

The CAZAC sequence (for example, ZC sequence) having the length of 12 may be used as the frequency domain spread code. CAZAC sequences having different CS values may be applied to the respective control channels to be distinguished from each other. IFFT is performed with respect to the CQI information in which the frequency domain is spread.

12 different terminals may be orthogonally multiplexed on the same PUCCH RB by a cyclic shift having 12 equivalent intervals. In the case of a general CP, a DMRS sequence on SC-FDMA symbol 1 and 5 (on SC-FDMA symbol 3 in the case of the extended CP) is similar to a CQI signal sequence on the frequency domain, but the modulation of the CQI information is not adopted.

The terminal may be semi-statically configured by upper-layer signaling so as to periodically report different CQI, PMI, and RI types on PUCCH resources indicated as PUCCH resource indexes ($n_{PUCCH}^{(1,\tilde{p})}$, $n_{PUCCH}^{(2,\tilde{p})}$, and $n_{PUCCH}^{(3,\tilde{p})}$). Herein, the PUCCH resource index ($n_{PUCCH}^{(2,\tilde{p})}$) is information indicating the PUCCH region used for PUCCH format 2/2a/2b and a CS value to be used.

PUCCH Channel Structure

PUCCH formats 1a and 1b are described.

In PUCCH format 1a and 1b, the CAZAC sequence having the length of 12 is multiplied by a symbol modulated by using a BPSK or QPSK modulation scheme. For example, a result acquired by multiplying a modulated symbol d (0) by a CAZAC sequence r (n) (n=0, 1, 2, . . . , N−1) having a length of N becomes y(0), y(1), y(2), . . . , y(N−1). y(0), . . . , y(N−1) symbols may be designated as a block of symbols. The modulated symbol is multiplied by the CAZAC sequence and thereafter, the block-wise spread using the orthogonal sequence is adopted.

A Hadamard sequence having a length of 4 is used with respect to general ACK/NACK information and a discrete Fourier transform (DFT) sequence having a length of 3 is used with respect to the ACK/NACK information and the reference signal.

The Hadamard sequence having the length of 2 is used with respect to the reference signal in the case of the extended CP.

FIG. 7 illustrates a structure of an ACK/NACK channel in the case of a general CP in the wireless communication system to which the present invention can be applied.

In FIG. 7, a PUCCH channel structure for transmitting the HARQ ACK/NACK without the CQI is exemplarily illustrated.

The reference signal (DMRS) is loaded on three consecutive SC-FDMA symbols in a middle part among 7 SC-FDMA symbols and the ACK/NACK signal is loaded on 4 residual SC-FDMA symbols.

Meanwhile, in the case of the extended CP, the RS may be loaded on two consecutive symbols in the middle part. The number of and the positions of symbols used in the RS may vary depending on the control channel and the numbers and the positions of symbols used in the ACK/NACK signal associated with the positions of symbols used in the RS may also correspondingly vary depending on the control channel.

Acknowledgment response information (not scrambled status) of 1 bit and 2 bits may be expressed as one HARQ ACK/NACK modulated symbol by using the BPSK and QPSK modulation techniques, respectively. A positive acknowledgement response (ACK) may be encoded as '1' and a negative acknowledgment response (NACK) may be encoded as '0'.

When a control signal is transmitted in an allocated band, 2-dimensional (D) spread is adopted in order to increase a multiplexing capacity. That is, frequency domain spread and time domain spread are simultaneously adopted in order to increase the number of terminals or control channels which may be multiplexed.

A frequency domain sequence is used as the base sequence in order to spread the ACK/NACK signal in the frequency domain. A Zadoff-Chu (ZC) sequence which is one of the CAZAC sequences may be used as the frequency domain sequence. For example, different CSs are applied to the ZC sequence which is the base sequence, and as a result, multiplexing different terminals or different control channels may be applied. The number of CS resources supported in an SC-FDMA symbol for PUCCH RBs for HARQ ACK/NACK transmission is set by a cell-specific upper-layer signaling parameter ($\Delta_{shift}^{PUCCH}$).

The ACK/NACK signal which is frequency-domain spread is spread in the time domain by using an orthogonal spreading code. As the orthogonal spreading code, a Walsh-Hadamard sequence or DFT sequence may be used. For example, the ACK/NACK signal may be spread by using an orthogonal sequence (w0, w1, w2, and w3) having the length of 4 with respect to 4 symbols. Further, the RS is also spread through an orthogonal sequence having the length of 3 or 2. This is referred to as orthogonal covering (OC).

Multiple terminals may be multiplexed by a code division multiplexing (CDM) scheme by using the CS resources in the frequency domain and the OC resources in the time domain described above. That is, ACK/NACK information and RSs of a lot of terminals may be multiplexed on the same PUCCH RB.

In respect to the time-domain spread CDM, the number of spreading codes supported with respect to the ACK/NACK information is limited by the number of RS symbols. That is, since the number of RS transmitting SC-FDMA symbols is smaller than that of ACK/NACK information transmitting SC-FDMA symbols, the multiplexing capacity of the RS is smaller than that of the ACK/NACK information.

For example, in the case of the general CP, the ACK/NACK information may be transmitted in four symbols and not 4 but 3 orthogonal spreading codes are used for the ACK/NACK information and the reason is that the number of RS transmitting symbols is limited to 3 to use only 3 orthogonal spreading codes for the RS.

In the case of the subframe of the general CP, when 3 symbols are used for transmitting the RS and 4 symbols are used for transmitting the ACK/NACK information in one slot, for example, if 6 CSs in the frequency domain and 3 orthogonal cover (OC) resources may be used, HARQ acknowledgement responses from a total of 18 different terminals may be multiplexed in one PUCCH RB. In the case of the subframe of the extended CP, when 2 symbols are used for transmitting the RS and 4 symbols are used for transmitting the ACK/NACK information in one slot, for example, if 6 CSs in the frequency domain and 2 orthogonal cover (OC) resources may be used, the HARQ acknowledgement responses from a total of 12 different terminals may be multiplexed in one PUCCH RB.

Next, PUCCH format 1 is described. The scheduling request (SR) is transmitted by a scheme in which the terminal requests scheduling or does not request the scheduling. An SR channel reuses an ACK/NACK channel structure in PUCCH format 1a/1b and is configured by an on-off keying (OOK) scheme based on an ACK/NACK channel design. In the SR channel, the reference signal is not transmitted. Therefore, in the case of the general CP, a sequence having a length of 7 is used and in the case of the extended CP, a sequence having a length of 6 is used. Different cyclic shifts (CSs) or orthogonal covers (OCs) may be allocated to the SR and the ACK/NACK. That is, the terminal transmits the HARQ ACK/NACK through a resource allocated for the SR in order to transmit a positive SR. The terminal transmits the HARQ ACK/NACK through a resource allocated for the ACK/NACK in order to transmit a negative SR.

Next, an enhanced-PUCCH (e-PUCCH) format is described. An e-PUCCH may correspond to PUCCH format 3 of an LTE-A system. A block spreading technique may be applied to ACK/NACK transmission using PUCCH format 3.

The block spreading technique is a scheme that modulates transmission of the control signal by using the SC-FDMA scheme unlike the existing PUCCH format 1 series or 2 series. As illustrated in FIG. 8, a symbol sequence may be spread and transmitted on the time domain by using an orthogonal cover code (OCC). The control signals of the plurality of terminals may be multiplexed on the same RB by using the OCC. In the case of PUCCH format 2 described above, one symbol sequence is transmitted throughout the time domain and the control signals of the plurality of terminals are multiplexed by using the cyclic shift (CS) of the CAZAC sequence, while in the case of a block spreading based on PUCCH format (for example, PUCCH format 3), one symbol sequence is transmitted throughout the frequency domain and the control signals of the plurality of terminals are multiplexed by using the time domain spreading using the OCC.

FIG. 8 illustrates one example of generating and transmitting 5 SC-FDMA symbols during one slot in the wireless communication system to which the present invention can be applied.

In FIG. 8, an example of generating and transmitting 5 SC-FDMA symbols (that is, data part) by using an OCC having the length of 5 (alternatively, SF=5) in one symbol sequence during one slot. In this case, two RS symbols may be used during one slot.

In the example of FIG. 8, the RS symbol may be generated from a CAZAC sequence to which a specific cyclic shift value is applied and transmitted in a type in which a predetermined OCC is applied (alternatively, multiplied) throughout a plurality of RS symbols. Further, in the example of FIG. 8, when it is assumed that 12 modulated symbols are used for each OFDM symbol (alternatively, SC-FDMA symbol) and the respective modulated symbols are generated by QPSK, the maximum bit number which may be transmitted in one slot becomes 24 bits (=12×2). Accordingly, the bit number which is transmittable by two slots becomes a total of 48 bits. When a PUCCH channel structure of the block spreading scheme is used, control information having an extended size may be transmitted as compared with the existing PUCCH format 1 series and 2 series.

General Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRC- ConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

FIG. 9 illustrates examples of a component carrier and carrier aggregation in the wireless communication system to which the present invention can be applied.

FIG. 9a illustrates a single carrier structure used in an LTE system. The component carrier includes the DL CC and the UL CC. One component carrier may have a frequency range of 20 MHz.

FIG. 9b illustrates a carrier aggregation structure used in the LTE system. In the case of FIG. 9b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Cross Carrier Scheduling

In the carrier aggregation system, in terms of scheduling for the carrier or the serving cell, two types of a self-scheduling method and a cross carrier scheduling method are provided. The cross carrier scheduling may be called cross component carrier scheduling or cross cell scheduling.

The cross carrier scheduling means transmitting the PDCCH (DL grant) and the PDSCH to different respective DL CCs or transmitting the PUSCH transmitted according to the PDCCH (UL grant) transmitted in the DL CC through other UL CC other than a UL CC linked with the DL CC receiving the UL grant.

Whether to perform the cross carrier scheduling may be UE-specifically activated or deactivated and semi-statically known for each terminal through the upper-layer signaling (for example, RRC signaling).

When the cross carrier scheduling is activated, a carrier indicator field (CIF) indicating through which DL/UL CC the PDSCH/PUSCH the PDSCH/PUSCH indicated by the corresponding PDCCH is transmitted is required. For example, the PDCCH may allocate the PDSCH resource or the PUSCH resource to one of multiple component carriers by using the CIF. That is, the CIF is set when the PDSCH or PUSCH resource is allocated to one of DL/UL CCs in which the PDCCH on the DL CC is multiply aggregated. In this case, a DCI format of LTE-A Release-8 may extend according to the CIF. In this case, the set CIF may be fixed to a 3-bit field and the position of the set CIF may be fixed regardless of the size of the DCI format. Further, a PDCCH structure (the same coding and the same CCE based resource mapping) of the LTE-A Release-8 may be reused.

On the contrary, when the PDCCH on the DL CC allocates the PDSCH resource on the same DL CC or allocates the PUSCH resource on a UL CC which is singly linked, the CIF is not set. In this case, the same PDCCH structure (the same coding and the same CCE based resource mapping) and DCI format as the LTE-A Release-8 may be used.

When the cross carrier scheduling is possible, the terminal needs to monitor PDCCHs for a plurality of DCIs in a control region of a monitoring CC according to a transmission mode and/or a bandwidth for each CC. Therefore, a configuration and PDCCH monitoring of a search space which may support monitoring the PDCCHs for the plurality of DCIs are required.

In the carrier aggregation system, a terminal DL CC aggregate represents an aggregate of DL CCs in which the terminal is scheduled to receive the PDSCH and a terminal UL CC aggregate represents an aggregate of UL CCs in which the terminal is scheduled to transmit the PUSCH. Further, a PDCCH monitoring set represents a set of one or more DL CCs that perform the PDCCH monitoring. The PDCCH monitoring set may be the same as the terminal DL CC set or a subset of the terminal DL CC set. The PDCCH monitoring set may include at least any one of DL CCs in the terminal DL CC set. Alternatively, the PDCCH monitoring set may be defined separately regardless of the terminal DL CC set. The DL CCs included in the PDCCH monitoring set may be configured in such a manner that self-scheduling for the linked UL CC is continuously available. The terminal DL CC set, the terminal UL CC set, and the PDCCH monitoring set may be configured UE-specifically, UE group-specifically, or cell-specifically.

When the cross carrier scheduling is deactivated, the deactivation of the cross carrier scheduling means that the PDCCH monitoring set continuously means the terminal DL CC set and in this case, an indication such as separate signaling for the PDCCH monitoring set is not required. However, when the cross carrier scheduling is activated, the PDCCH monitoring set is preferably defined in the terminal DL CC set. That is, the base station transmits the PDCCH through only the PDCCH monitoring set in order to schedule the PDSCH or PUSCH for the terminal.

FIG. 10 illustrates one example of a subframe structure depending on cross carrier scheduling in the wireless communication system to which the present invention can be applied.

Referring to FIG. 10, a case is illustrated, in which three DL CCs are associated with a DL subframe for an LTE-A terminal and DL CC 'A' is configured as a PDCCH monitoring DL CC. When the CIF is not used, each DL CC may transmit the PDCCH scheduling the PDSCH thereof without the CIF. On the contrary, when the CIF is used through the upper-layer signaling, only one DL CC 'A' may transmit the PDCCH scheduling the PDSCH thereof or the PDSCH of another CC by using the CIF. In this case, DL CC 'B' and 'C' in which the PDCCH monitoring DL CC is not configured does not transmit the PDCCH.

General ACK/NACK Multiplexing Method

In a situation in which the terminal simultaneously needs to transmit multiple ACKs/NACKs corresponding to multiple data units received from an eNB, an ACK/NACK mulplexign method based on PUCCH resource selection may be considered in order to maintain a single-frequency characteristic of the ACK/NACK signal and reduce ACK/NACK transmission power.

Together with ACK/NACK multiplexing, contents of ACK/NACK responses for multiple data units may be identified by combining a PUCCH resource and a resource of QPSK modulation symbols used for actual ACK/NACK transmission.

For example, when one PUCCH resource may transmit 4 bits and four data units may be maximally transmitted, an ACK/NACK result may be identified in the eNB as shown in Table 3 given below.

TABLE 3

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 3 given above, HARQ-ACK(i) represents an ACK/NACK result for an i-th data unit. In Table 3 given above, discontinuous transmission (DTX) means that there is no data unit to be transmitted for the corresponding HARQ-ACK(i) or that the terminal may not detect the data unit corresponding to the HARQ-ACK(i).

According to Table 3 given above, a maximum of four PUCCH resources ($n_{PUCCH,0}^{(1)}$, $n_{PUCCH,1}^{(1)}$, $n_{PUCCH,2}^{(1)}$, and $n_{PUCCH,3}^{(1)}$) are provided and b(0) and b(1) are two bits transmitted by using a selected PUCCH.

For example, when the terminal successfully receives all of four data units, the terminal transmits 2 bits (1,1) by using $n_{PUCCH,1}^{(1)}$.

When the terminal fails to decoding in first and third data units and succeeds in decoding in second and fourth data units, the terminal transmits bits (1,0) by using $n_{PUCCH,3}^{(1)}$.

In ACK/NACK channel selection, when there is at least one ACK, the NACK and the DTX are coupled with each other. The reason is that a combination of the PUCCH resource and the QPSK symbol may not all ACK/NACK states. However, when there is no ACK, the DTX is decoupled from the NACK.

In this case, the PUCCH resource linked to the data unit corresponding to one definite NACK may also be reserved to transmit signals of multiple ACKs/NACKs.

Validation of PDCCH for Semi-Persistent Scheduling

Semi-persistent scheduling (SPS) is a scheduling scheme that allocates the resource to the terminal to be persistently maintained during a specific time interval.

When a predetermined amount of data is transmitted for a specific time like a voice over Internet protocol (VoIP), since the control information need not be transmitted every data transmission interval for the resource allocation, the waste of the control information may be reduced by using the SPS scheme. In a so-called semi-persistent scheduling (SPS) method, a time resource domain in which the resource may be allocated to the terminal is preferentially allocated.

In this case, in a semi-persistent allocation method, a time resource domain allocated to a specific terminal may be configured to have periodicity. Then, a frequency resource domain is allocated as necessary to complete allocation of the time-frequency resource. Allocating the frequency resource domain may be designated as so-called activation. When the semi-persistent allocation method is used, since the resource allocation is maintained during a predetermined period by one-time signaling, the resource need not be repeatedly allocated, and as a result, signaling overhead may be reduced.

Thereafter, since the resource allocation to the terminal is not required, signaling for releasing the frequency resource allocation may be transmitted from the base station to the terminal. Releasing the allocation of the frequency resource domain may be designated as deactivation.

In current LTE, in which subframes the SPS is first transmitted/received through radio resource control (RRC) signaling for the SPS for the uplink and/or downlink is announced to the terminal. That is, the time resource is preferentially designated among the time and frequency resources allocated for the SPS through the RRC signaling. In order to announce a usable subframe, for example, a period and an offset of the subframe may be announced. However, since the terminal is allocated with only the time resource domain through the RRC signaling, even though the terminal receives the RRC signaling, the terminal does not immediately perform transmission and reception by the SPS and the terminal allocates the frequency resource domain as necessary to complete the allocation of the time-frequency resource. Allocating the frequency resource domain may be designated as deactivation and releasing the allocation of the frequency resource domain may be designated as deactivation.

Therefore, the terminal receives the PDCCH indicating the activation and thereafter, allocate the frequency resource according to RB allocation information included in the received PDCCH and applies modulation and code rate depending on modulation and coding scheme (MCS) information to start transmission and reception according to the period and the offset of the subframe allocated through the RRC signaling.

Next, when the terminal receives the PDCCH announcing the deactivation from the base station, the terminal stops transmission and reception. When the terminal receives the PDCCH indicating the activation or reactivation after stopping the transmission and reception, the terminal resumes the transmission and reception again with the period and the offset of the subframe allocated through the RRC signaling by using the RC allocation, the MCS, and the like designated by the PDCCH. That is, the time resource is performed through the RRC signaling, but the signal may be actually transmitted and received after receiving the PDCCH indicating the activation and reactivation of the SPS and the signal transmission and reception stop after receiving the PDCCH indicating the deactivation of the SPS.

When all conditions described below are satisfied, the terminal may validate a PDCCH including an SPS indication. First, a CRC parity bit added for a PDCCH payload needs to be scrambled with an SPS C-RNTI and second, a new data indicator (NDI) field needs to be set to 0. Herein, in the case of DCI formats 2, 2A, 2B, and 2C, the new data indicator field indicates one activated transmission block.

In addition, when each field used in the DCI format is set according to Tables 4 and 5 given below, the validation is completed. When the validation is completed, the terminal recognizes that received DCI information is valid SPS activation or deactivation (alternatively, release). On the contrary, when the validation is not completed, the terminal recognizes that a non-matching CRC is included in the received DCI format.

Table 4 shows a field for validating the PDCCH indicating the SPS activation.

TABLE 4

|  | DCI format 0 | DCI format 1/1A | DCI format 2/2A/2B |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 5 shows a field for validating the PDCCH indicating the SPS deactivation (alternatively, release).

TABLE 5

|  | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

When the DCI format indicates SPS downlink scheduling activation, a TPC command value for the PUCCH field may be used as indexes indicating four PUCCH resource values set by the upper layer.

PUCCH Piggybacking in Rel-8 LTE

FIG. 11 illustrates one example of transport channel processing of a UL-SCH in the wireless communication system to which the present invention can be applied.

In a 3GPP LTE system (=E-UTRA, Rel. 8), in the case of the UL, single carrier transmission having an excellent peak-to-average power ratio (PAPR) or cubic metric (CM) characteristic which influences the performance of a power amplifier is maintained for efficient utilization of the power amplifier of the terminal. That is, in the case of transmitting the PUSCH of the existing LTE system, data to be transmitted may maintain the single carrier characteristic through DFT-precoding and in the case of transmitting the PUCCH, information is transmitted while being loaded on a sequence having the single carrier characteristic to maintain the single carrier characteristic. However, when the data to be DFT-precoded is non-contiguously allocated to a frequency axis or the PUSCH and the PUCCH are simultaneously transmitted, the single carrier characteristic deteriorates. Therefore, when the PUSCH is transmitted in the same subframe as the transmission of the PUCCH as illustrated in FIG. 11, uplink control information (UCI) to be transmitted to the PUCCH is transmitted (piggyback) together with data through the PUSCH.

Since the PUCCH and the PUSCH may not be simultaneously transmitted as described above, the existing LTE terminal uses a method that multiplexes uplink control information (UCI) (CQI/PMI, HARQ-ACK, RI, and the like) to the PUSCH region in a subframe in which the PUSCH is transmitted.

As one example, when the channel quality indicator (CQI) and/or precoding matrix indicator (PMI) needs to be transmitted in a subframe allocated to transmit the PUSCH, UL-SCH data and the CQI/PMI are multiplexed after DFT-spreading to transmit both control information and data. In this case, the UL-SCH data is rate-matched by considering a CQI/PMI resource. Further, a scheme is used, in which the control information such as the HARQ ACK, the RI, and the like punctures the UL-SCH data to be multiplexed to the PUSCH region.

FIG. 12 illustrates one example of a signal processing process of an uplink share channel of a transport channel in the wireless communication system to which the present invention can be applied.

Herein, the signal processing process of the uplink share channel (hereinafter, referred to as "UL-SCH") may be applied to one or more transport channels or control information types.

Referring to FIG. 12, the UL-SCH transfers data to a coding unit in the form of a transport block (TB) once every a transmission time interval (TTI).

A CRC parity bit $p_0, p_1, p_2, p_3, \ldots p_{L-1}$ is attached to a bit of the transport block received from the upper layer (S120). In this case, A represents the size of the transport block and L represents the number of parity bits. Input bits to which the CRC is attached are shown in $b_0, b_1, b_2, b_3, \ldots, b_{B-1}$. In this case, B represents the number of bits of the transport block including the CRC.

$b_0, b_1, b_2, b_3, \ldots, b_{B-1}$ is segmented into multiple code blocks (CBs) according to the size of the TB and the CRC is attached to multiple segmented CBs (S121). Bits after the code block segmentation and the CRC attachment are shown in $c_{r0}, c_{r1}, c_{r2}, c_{r3}, \ldots, c_{r(K_r-1)}$. Herein, r represents No. (r=0, ..., C-1) of the code block and Kr represents the bit number depending on the code block r. Further, C represents the total number of code blocks.

Subsequently, channel coding is performed (S122). Output bits after the channel coding are shown in $d_{r0}^{(i)}, d_{r1}^{(i)}, d_{r2}^{(i)}, d_{r3}^{(i)}, \ldots, d_{r(D_r-1)}^{(i)}$. In this case, i represents an encoded stream index and may have a value of 0, 1, or 2. Dr represents the number of bits of the i-th encoded stream for the code block r. r represents the code block number (r=0, ..., C-1) and C represents the total number of code blocks. Each code block may be encoded by turbo coding.

Subsequently, rate matching is performed (S123). Bits after the rate matching are shown in $e_{r0}, e_{r1}, e_{r2}, e_{r3}, \ldots, e_{r(E_r-1)}$. In this case, r represents the code block number (r=0, ..., C-1) and C represents the total number of code blocks. Er represents the number of rate-matched bits of the r-th code block.

Subsequently, concatenation among the code blocks is performed again (S124). Bits after the concatenation of the code blocks is performed are shown in $f_0, f_1, f_2, f_3, \ldots, f_{G-1}$. In this case, G represents the total number of bits encoded for transmission and when the control information is multiplexed with the UL-SCH, the number of bits used for transmitting the control information is not included.

Meanwhile, when the control information is transmitted in the PUSCH, channel coding of the CQI/PMI, the RI, and the ACK/NACK which are the control information is independently performed (S126, S127, and S128). Since different encoded symbols are allocated for transmitting each control information, the respective control information has different coding rates.

In time division duplex (TDD), as an ACK/NACK feedback mode, two modes of ACK/NACK bundling and ACK/NACK multiplexing are supported by an upper-layer configuration. ACK/NACK information bits for the ACK/NACK bundling are constituted by 1 bit or 2 bits and ACK/NACK information bits for the ACK/NACK multiplexing are constituted by 1 to 4 bits.

After the concatenation among the code blocks in step S134, encoded bits $f_0, f_1, f_2, f_3, \ldots, f_{G-1}$ of the UL-SCH data and encoded bits $q_0, q_1, q_2, q_3, \ldots, q_{N_L \cdot Q_{CQI}-1}$ of the CQI/PMI are multiplexed (S125). A multiplexed result of the data and the CQI/PMI is shown in $g_0, g_1, g_2, g_3, \ldots, g_{H'-1}$. In this case, $g_i$ (i=0, ..., H'-1) represents a column vector having a length of $(Q_m \cdot N_L)$. $H=(G+N_L \cdot Q_{CQI})$ and $H'=H/(H_L \cdot Q_m)$. $N_L$ represents the number of layers mapped to a UL-SCH transport block and H represents the total number of encoded bits allocated to $N_L$ transport layers mapped with the transport block for the UL-SCH data and the CQI/PMI information.

Subsequently, the multiplexed data and CQI/PMI, a channel encoded RI, and the ACK/NACK are channel-interleaved to generate an output signal (S129).

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

When the data is transmitted and received by using the MIMO antenna, a channel state between the transmitting antenna and the receiving antenna need to be detected in order to accurately receive the signal. Therefore, the respective transmitting antennas need to have individual reference signals.

The downlink reference signal includes a common RS (CRS) shared by all terminals in one cell and a dedicated RS (DRS) for a specific terminal. Information for demodulation and channel measurement may be provided by using the reference signals.

The receiver side (that is, terminal) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as the UE-specific RS or the demodulation RS (DMRS).

FIG. 13 illustrates a reference signal pattern mapped to a downlink resource block pair in the wireless communication system to which the present invention can be applied.

Referring to FIG. 13, as a wise in which the reference signal is mapped, the downlink resource block pair may be expressed by one subframe in the timedomain×12 subcarriers in the frequency domain. That is, one resource block pair has a length of 14 OFDM symbols in the case of a normal cyclic prefix (CP) (FIG. 13a) and a length of 12 OFDM symbols in the case of an extended cyclic prefix (CP) (FIG. 13b). Resource elements (REs) represented as '0', '1', '2', and '3' in a resource block lattice mean the positions of the CRSs of antenna port indexes '0', '1', '2', and '3', respectively and resource elements represented as 'D' means the positon of the DRS.

Hereinafter, when the CRS is described in more detail, the CRS is used to estimate a channel of a physical antenna and distributed in a whole frequency band as the reference signal which may be commonly received by all terminals positioned in the cell. Further, the CRS may be used to demodulate the channel quality information (CSI) and data.

The CRS is defined as various formats according to an antenna array at the transmitter side (base station). The 3GPP LTE system (for example, release-8) supports various antenna arrays and a downlink signal transmitting side has three types of antenna arrays of three single transmitting antennas, two transmitting antennas, and four transmitting antennas. When the base station uses the single transmitting antenna, a reference signal for a single antenna port is arrayed. When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule of mapping the CRS to the resource block is defined as below.

$$k = 6m + (v + v_{shift}) \bmod 6 \quad \text{[Equation 1]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

-continued $$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 1, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink. ns represents a slot index and, $N_{ID}^{cell}$ represents a cell ID. mod represents an modulo operation. The position of the reference signal varies depending on the $v_{shift}$ value in the frequency domain. Since $v_{shift}$ is subordinated to the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 2 shows the case of the normal CP and Equation 3 shows the case of the extended CP.

$$k = (k') \bmod N_{sc}^{RB} + N_{sc}^{RB} \cdot n_{PRB} \quad \text{[Equation 2]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 3]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 2 and 3, k and l represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks. $N_{RB}^{PDSCH}$ represents a frequency band of the resource block for the PDSCH transmission. ns represents the slot index and $N_{ID}^{cell}$ represents the cell ID. mod represents the modulo operation. The position of the reference signal varies depending on the $v_{shift}$ value in the frequency domain. Since $v_{shift}$ is subordinated to the cell ID, the position of the reference signal has various frequency shift values according to the cell.

Sounding Reference Signal (SRS)

The SRS is primarily used for the channel quality measurement in order to perform frequency-selective scheduling and is not associated with transmission of the uplink data and/or control information. However, the SRS is not limited thereto and the SRS may be used for various other purposes for supporting improvement of power control and various start-up functions of terminals which have not been scheduled. One example of the start-up function may include an initial modulation and coding scheme (MCS), initial power control for data transmission, timing advance, and frequency semi-selective scheduling. In this case, the frequency semi-selective scheduling means scheduling that selectively allocates the frequency resource to the first slot of the subframe and allocates the frequency resource by pseudo-randomly hopping to another frequency in the second slot.

Further, the SRS may be used for measuring the downlink channel quality on the assumption that the radio channels between the uplink and the downlink are reciprocal. The assumption is valid particularly in the time division duplex in which the uplink and the downlink share the same frequency spectrum and are divided in the time domain.

Subframes of the SRS transmitted by any terminal in the cell may be expressed by a cell-specific broadcasting signal. A 4-bit cell-specific 'srsSubframeConfiguration' parameter represents 15 available subframe arrays in which the SRS may be transmitted through each radio frame. By the arrays, flexibility for adjustment of the SRS overhead is provided according to a deployment scenario.

A 16-th array among them completely turns off a switch of the SRS in the cell and is suitable primarily for a serving cell that serves high-speed terminals.

FIG. 14 illustrates an uplink subframe including a sounding reference signal symbol in the wireless communication system to which the present invention can be applied.

Referring to FIG. 14, the SRS is continuously transmitted through a last SC FDMA symbol on the arrayed subframes. Therefore, the SRS and the DMRS are positioned at different SC-FDMA symbols.

The PUSCH data transmission is not permitted in a specific SC-FDMA symbol for the SRS transmission and consequently, when sounding overhead is highest, that is, even when the SRS symbol is included in all subframes, the sounding overhead does not exceed approximately 7%.

Each SRS symbol is generated by a base sequence (random sequence or a sequence set based on Zadoff-Ch (ZC)) associated with a given time wise and a given frequency band and all terminals in the same cell use the same base sequence. In this case, SRS transmissions from a plurality of terminals in the same cell in the same frequency band and at the same time are orthogonal to each other by different cyclic shifts of the base sequence to be distinguished from each other.

SRS sequences from different cells may be distinguished for each other by allocating different base sequences to respective cells, but orthogonality among different base sequences is not assured.

Coordinated Multi-Point Transmission and Reception (COMP)

According to a demand of LTE-advanced, CoMP transmission is proposed in order to improve the performance of the system. The CoMP is also called co-MIMO, collaborative MIMO, network MIMO, and the like. It is anticipated that the CoMP will improves the performance of the terminal positioned at a cell edge and improve an average throughput of the cell (sector).

In general, inter-cell interference decreases the performance and the average cell (sector) efficiency of the terminal positioned at the cell edge in a multi-cell environment in which a frequency reuse index is 1. In order to alleviate the inter-cell interference, the LTE system adopts a simple passive method such as fractional frequency reuse (FFR) in the LTE system so that the terminal positioned at the cell edge has appropriate performance efficiency in an interference-limited environment. However, a method that reuses the inter-cell interference or alleviates the inter-cell interference as a signal (desired signal) which the terminal needs to receive is more preferable instead of reduction of the use of the frequency resource for each cell. The CoMP transmission scheme may be adopted in order to achieve the aforementioned object.

The CoMP scheme which may be applied to the downlink may be classified into a joint processing (JP) scheme and a coordinated scheduling/beamforming (CS/CB) scheme.

In the JP scheme, the data may be used at each point (base station) in a CoMP wise. The CoMP wise means a set of base stations used in the CoMP scheme. The JP scheme may be again classified into a joint transmission scheme and a dynamic cell selection scheme.

The joint transmission scheme means a scheme in which the signal is simultaneously transmitted through a plurality of points which are all or fractional points in the CoMP wise.

That is, data transmitted to a single terminal may be simultaneously transmitted from a plurality of transmission points. Through the joint transmission scheme, the quality of the signal transmitted to the terminal may be improved regardless of coherently or non-coherently and interference with another terminal may be actively removed.

The dynamic cell selection scheme means a scheme in which the signal is transmitted from the single point through the PDSCH in the CoMP wise. That is, data transmitted to the single terminal at a specific time is transmitted from the single point and data is not transmitted to the terminal at another point in the CoMP wise. The point that transmits the data to the terminal may be dynamically selected.

According to the CS/CB scheme, the CoMP wise performs beamforming through coordination for transmitting the data to the single terminal. That is, the data is transmitted to the terminal only in the serving cell, but user scheduling/beamforming may be determined through coordination of a plurality of cells in the CoMP wise.

In the case of the uplink, CoMP reception means receiving the signal transmitted by the coordination among a plurality of points which are geographically separated. The CoMP scheme which may be applied to the uplink may be classified into a joint reception (JR) scheme and the coordinated scheduling/beamforming (CS/CB) scheme.

The JR scheme means a scheme in which the plurality of points which are all or fractional points receives the signal transmitted through the PDSCH in the CoMP wise. In the CS/CB scheme, only the single point receives the signal transmitted through the PDSCH, but the user scheduling/beamforming may be determined through the coordination of the plurality of cells in the CoMP wise.

Cross-CC Scheduling and E-PDCCH Scheduling

In the existing 3GPP LTE Rel-10 system, if a cross-CC scheduling operation is defined in an aggregation situation for a plurality of CCs (component carrier=(serving) cell), one CC may be preset to be able to receive DL/UL scheduling from only one specific CC (i.e., scheduling CC) (namely, to be able to receive DL/UL grant PDCCH for the corresponding scheduled CC).

The corresponding scheduling CC may basically perform a DL/UL scheduling for the scheduling CC itself.

In other words, the SS for the PDCCH scheduling the scheduling/scheduled CC in the cross-CC scheduling relation may come to exist in the control channel area of the scheduling CC.

Meanwhile, in the LTE system, CFDD DL carrier or TDD DL subframes use first n OFDM symbols of the subframe for PDCCH, PHICH, PCFICH and the like which are physical channels for transmission of various control informations and use the rest of the OFDM symbols for PDSCH transmission.

At this time, the number of symbols used for control channel transmission in each subframe is dynamically transmitted to the UE through the physical channel such as PCFICH or is semi-statically transmitted to the UE through RRC signaling.

At this time, particularly, value n may be set by 1 to 4 symbols depending on the subframe characteristic and system characteristic (FDD/TDD, system bandwidth, etc.).

Meanwhile, in the existing LTE system, PDCCH, which is the physical channel for transmitting DL/UL scheduling and various control information, may be transmitted through limited OFDM symbols.

Hence, the enhanced PDCCH (i.e., E-PDCCH), which is more freely multiplexed in PDSCH and FDM/TDM scheme, may be introduced instead of the control channel which is transmitted through the OFDM which is separated from the PDSCH like PDCCH.

FIG. 15 illustrates an example of multiplexing legacy PDCCH, PDSCH and E-PDCCH.

Here, the legacy PDCCH may be expressed as L-PDCCH.

FIG. 16 is a diagram illustrating a cell classification in a system that supports the carrier aggregation.

Referring to FIG. 16, a configured cell is a cell that should be carrier-merged based on a measurement report among the cells of a BS may be configured for each terminal. The configured cell may reserve a resource for an ACK/NACK transmission for a PDSCH transmission beforehand. An activated cell is a cell that is configured to transmit PDSCH/PUSCH actually among the configured cells, and performs a Channel State Information (CSI) report for the PDSCH/PUSCH transmission and a Sounding Reference Signal (SRS) transmission. A de-activated cell is a cell that does not transmit the PDSCH/PUSCH transmission by a command of BS or a timer operation, may also stop the CSI report and the SRS transmission.

Synchronization Signal/Sequence (SS)

An SS includes a primary (P)-SS and a secondary (S)-SS, and corresponds to a signal used when a cell search is performed.

FIG. 17 is a diagram illustrating a frame structure used for an SS transmission in a system that uses a normal cyclic prefix (CP). FIG. 10 is a diagram illustrating a frame structure used for an SS transmission in a system that uses an extended CP.

The SS is transmitted in 0th subframe and second slot of the fifth subframe, respectively, considering 4.6 ms which is a Global System for Mobile communications (GSM) frame length for the easiness of an inter-Radio Access Technology (RAT) measurement, and a boundary for the corresponding radio frame may be detected through the S-SS. The P-SS is transmitted in the last OFDM symbol of the corresponding slot and the S-SS is transmitted in the previous OFDM symbol of the P-SS.

The SS may transmit total 504 physical cell IDs through the combination of 3 P-SSs and 168 S-SSs. In addition, the SS and the PBCH are transmitted within 6 RBs at the center of a system bandwidth such that a terminal may detect or decode them regardless of the transmission bandwidth.

A transmission diversity scheme of the SS is to use a single antenna port only and not separately used in a standard. That is, the transmission diversity scheme of the SS uses a single antenna transmission or a transmission technique transparent to a terminal (e.g., Precoder Vector Switching (PVS), Time-Switched Transmit Diversity (TSTD) and Cyclic-Delay Diversity (CDD)).

1. P-SS Sign

Zadoff-Chu (ZC) sequence of length 63 in frequency domain may be defined and used as a sequence of the P-SS. The ZC sequence is defined by Equation 4, a sequence element, n=31 that corresponds to a DC subcarrier is punctured. In Equation 4, N_zc=63.

$$d_u(n) = e^{-j\frac{\pi u n(n+1)}{N_{ZC}}} \qquad [\text{Equation 4}]$$

Among 6 RBs (=7 subcarriers) positioned at the center of frequency domain, the remaining 9 subcarriers are always transmitted in zero value, which makes it easy to design a filter for performing synchronization. In order to define total three P-SSs, the value of u=29, 29 and 34 may be used in Equation 4. In this case, since 29 and 34 have the conjugate symmetry relation, two correlations may be simultaneously performed. Here, the conjugate symmetry means Equation 5. By using the characteristics, it is possible to implement one shot correlater for u=29 and 43, and accordingly, about 33.3% of total amount of calculation may be decreased.

$$d_n(n)=(-1)^n(d_{N_{ZC}-u}(n))^*, \text{ when } N_{ZC} \text{ is even number.}$$

$$d_n(n)=(d_{N_{ZC}-u}(n))^*, \text{ when } N_{ZC} \text{ is odd number.} \quad \text{[Equation 5]}$$

2. S-SS Sign

The sequence used for the S-SS is combined with two interleaved m-sequences of length 31, and 168 cell group IDs are transmitted by combining two sequences. The m-sequence as the SSS sequence is robust in the frequency selective environment, and may be transformed to the high-speed m-sequence using the Fast Hadamard Transform, thereby the amount of operations being decreased. In addition, the configuration of SSS using two short codes is proposed to decrease the amount of operations of terminal.

FIG. 19 is a diagram illustrating two sequences in a logical region being mapped to a physical region by being interleaved.

Referring to FIG. 19, when two m-sequences used for generating the S-SS sign are defined by S1 and S2, in the case that the S-SS (S1, S2) of subframe 0 transmits the cell group ID with the combination, the S-SS (S2, S1) of subframe 5 is transmitted with being swapped, thereby distinguishing the 10 ms frame boundary. In this case, the SSS sign uses the generation polynomial x5+x2+1, and total 31 signs may be generated through the circular shift.

In order to improve the reception performance, two different P-SS-based sequences are defined and scrambled to the S-SS, and scrambled to S1 and S2 with different sequences. Later, by defining the S1-based scrambling sign, the scrambling is performed to S2. In this case, the sign of S-SS is exchanged in a unit of 5 ms, but the P-SS-based scrambling sign is not exchanged. The P-SS-based scrambling sign is defined by six circular shift versions according to the P-SS index in the m-sequence generated from the generation polynomial x5+x2+1, and the S1-based scrambling sign is defined by eight circular shift versions according to the S1 index in the m-sequence generated from the generation polynomial x5+x4+x2+x1+1.

The contents below exemplify an asynchronous standard of the LTE system.

A terminal may monitor a downlink link quality based on a cell-specific reference signal in order to detect a downlink radio link quality of PCell.

A terminal may estimate a downlink radio link quality for the purpose of monitoring the downlink radio link quality of PCell, and may compare it with Q_out and Q_in, which are thresholds.

The threshold value Q_out may be defined as a level in which a downlink radio link is not certainly received, and may correspond to a block error rate 10% of a hypothetical PDCCH transmission considering a PCFICH together with transmission parameters.

The threshold value Q_in may be defined as a downlink radio link quality level, which may be great and more certainly received than Q_out, and may correspond to a block error rate 2% of a hypothetical PDCCH transmission considering a PCFICH together with transmission parameters.

Narrow Band (NB) LTE Cell Search

In the NB-LTE, although a cell search may follow the same rule as the LTE, there may be an appropriate modification in the sequence design in order to increase the cell search capability.

FIG. 20 is a diagram illustrating a frame structure to which M-PSS and M-SSS are mapped. In the present disclosure, an M-PSS designates the P-SS in the NB-LTE, and an M-SSS designates the S-SS in the NB-LTE. The M-PSS may also be designated to 'NB-PSS' and the M-SSS may also be designated to 'NB-SSS'.

Referring to FIG. 20, in the case of the M-PSS, a single primary synchronization sequence/signal may be used. (M-)PSS may be spanned up to 9 OFDM symbol lengths, and used for determining subframe timing as well as an accurate frequency offset.

This may be interpreted that a terminal may use the M-PSS for acquiring time and frequency synchronization with a BS. In this case, (M-)PSS may be consecutively located in time domain.

The M-SSS may be spanned up to 6 OFDM symbol lengths, and used for determining the timing of a cell identifier and an M-frame. This may be interpreted that a terminal may use the M-SSS for detecting an identifier of a BS. In order to support the same number as the number of cell identifier groups of the LTE, 504 different (M-)SSS may be designed.

Referring to the design of FIG. 20, the M-PSS and the M-SSS are repeated every 20 ms average, and existed/generated four times in a block of 80 ms. In the subframes that include synchronization sequences, the M-PSS occupies the last 9 OFDM symbols. The M-SSS occupies 6th, 7th, 10th, 11th, 13th and 14th OFDM symbols in the case of normal CP, and occupies 5th, 6th, 9th, 11th and 12th OFDM symbols in the case of extended CP.

The 9 OFDM symbols occupied by the M-PSS may be selected to support for the in-band disposition between LTE carriers. This is because the first three OFDM symbols are used to carry a PDCCH in the hosting LTE system and a subframe includes minimum twelve OFDM symbols (in the case of extended CP).

In the hosting LTE system, a cell-specific reference signal (CRS) is transmitted, and the resource elements that correspond to the M-PSS may be punctured in order to avoid a collision. In the NB-LTE, a specific position of M-PSS/M-SSS may be determined to avoid a collision with many legacy LTE signals such as the PDCCH, the PCFICH, the PHICH and/or the MBSFN.

In comparison with the LTE, the synchronization sequence design in the NB-LTE may be different.

This may be performed in order to attain a compromise between decreased memory consumption and faster synchronization in a terminal. Since the M-SSS is repeated four times in 80 ms duration, a slight design modification for the M-SSS may be required in the 80 ms duration in order to solve a timing uncertainty.

Structure of M-PSS and M-SSS

In the LTE, the PSS structure allows the low complexity design of timing and frequency offset measuring instrument, and the SSS is designed to acquire frame timing and to support unique 504 cell identifiers.

In the case of In-band and Guard-band of the LTE, the disposition of CP in the NB-LTE may be selected to match the CP in a hosting system. In the case of standalone, the extended CP may be used for matching a transmitter pulse shape for exerting the minimum damage to the hosting system (e.g., GSM).

A single M-PSS may be clearly stated in the N-LTE of the LTE. In the procedure of PSS synchronization of the LTE, for each of PSSs, a specific number of frequency speculations may be used for the coarse estimation of symbol timing and frequency offset.

Such an adaption of the procedure in the NB-LTE may increase the process complexity of a receiver according to the use of a plurality of frequency assumptions. In order to solve the problem, a sequence resembling of the Zadoff-Chu sequence which is differentially decoded in time domain may be proposed for the M-PSS. Since the differential decoding is performed in a transmission process, the differential decoding may be performed during the processing time of a receiver. Consequently, a frequency offset may be transformed from the consecutive rotation for symbols to the fixed phase offset with respect to the corresponding symbols.

FIG. 21 is a diagram illustrating a method for generating M-PSS according to an embodiment of the present invention.

Referring to FIG. 21, first, when starting with a basic sequence of length 107 as a basis in order to generate an M-PSS, Equation 6 below may be obtained.

$$c(n) = e^{-\frac{j\pi un(n+1)}{N}}, n = \{0, 1, 2, \ldots, 106\} \quad \text{[Equation 6]}$$

The basic sequence c(n) may be differentially decoded in order to obtain d(n) sequence as represented in Equation 7.

$$d(n+1)=d(n)c(n), n=\{0,1,2,\ldots,106\}, d(0)=1, \quad \text{[Equation 7]}$$

The d(n) sequence is divided into 9 sub sequences, and each sub sequence has a length 12 and a sampling rate of 130 kHz. The 120-point FFT is performed for each of 9 sub sequences, and each sequence may be oversampled 128/12 times up to 1.92 MHz sampling rate using 128 IFFT zero padding. Consequently, each sub sequence may be mapped to 12 subcarriers for 9 OFDM symbols, respectively.

Each of the sub sequences is mapped to a single OFDM symbol, and the M-PSS may occupy total 9 OFDM symbols since total 9 sub sequences are existed. Total length of the M-PSS may be 1234(=(128+9)*9+1) when the normal CP of 9 samples are used, and may be 1440 when the extended CP is used.

The M-PSS which is going to be actually used during the transmission is not required to be generated every time using complex procedure in a transmitter/receiver in the same manner. The complexity coefficient (i.e., t_u(n)) that corresponds to the M-PSS may be generated in offline, and directly stored in the transmitter/receiver. In addition, even in the case that the M-PSS is generated in 1.92 MHz, the occupation bandwidth may be 180 kHz.

Accordingly, in the case of performing the procedure related to time and frequency offset measurements using the M-PSS in a receiver, the sampling rate of 192 kHz may be used for all cases. This may significantly decrease the complexity of receiver in the cell search.

In comparison with the LTE, the frequency in which the M-PSS is generated in the NB-LTE causes slightly greater overhead than the PSS in the LTE. More particularly, the synchronization sequence used in the LTE occupies 2.86% of the entire transmission resources, and the synchronization sequence used in the NB-LTE occupies about 5.36% of the entire transmission resources. Such an additional overhead has an effect of decreasing memory consumption as well as the synchronization time that leads to the improved battery life and the lower device price.

The M-SSS is designed in frequency domain and occupies 12 subcarriers in each of 6 OFDM symbols. Accordingly, the number of resource elements dedicated to the M-SSS may be 72. The M-SSS includes the ZC sequence of a single length 61 which are padded by eleven '0's on the starting point.

In the case of the extended CP, the first 12 symbols of the M-SSS may be discarded, and the remaining symbols may be mapped to the valid OFDM symbols, which cause to discard only a single symbol among the sequence of length 61 since eleven '0's are existed on the starting point. The discard of the symbol causes the slight degradation of the correlation property of other SSS.

The cyclic shift of a sequence and the sequence for different roots may easily provide specific cell identifiers up to 504. The reason why the ZC sequence is used in the NB-LTE in comparison with the LTE is to decrease the error detection rate. Since a common sequence for two different cell identifier groups is existed, an additional procedure is required in the LTE.

Since the M-PSS/M-SSS occur four times within the block of 80 ms, the LTE design of the SSS cannot be used for providing accurate timing information within the corresponding block. This is because the special interleaving structure that may determine only two positions. Accordingly, a scrambling sequence may be used in an upper part of the ZC sequence in order to provide the information of frame timing. Four scrambling sequences may be required to determine four positions within the block of 80 ms, which may influence on acquiring the accurate timing.

FIG. 22 is a diagram illustrating a method for generating M-SSS according to an embodiment of the present invention.

Referring to FIG. 22, the M-SSS may be defined as s_p,q(n)=a_p(n)·b_q(n). Herein, p={0, 1, ..., 503} represents cell identifiers and q={0, 1, 2, 3} determines the position of the M-SSS (i.e., the number of M-SSS within the block of 80 ms which is generated before the latest SSS). In addition, a_p(n) and b_q(n) may be determined by Equations 8 and 9 below.

$$\begin{aligned} a_p(n) &= 0, & n &= \{0-4, 66-71\} \\ &= a_p(n - k_p - 5), & n &= \{5, 6, \ldots, 65\} \\ a_p(n) &= e^{-\frac{j\pi m(p)n(n+1)}{61}}, & n &= \{0, 1, \ldots, 61\} \end{aligned} \quad \text{[Equation 8]}$$

$$\begin{aligned} b_q(n) &= b(\mathrm{mod}(n - l_q, 63)) & n &= \{0, 1, \ldots, 60\}, \\ & & q &= \{0, 1, 2, 3\}, \\ & & l_0 &= 0, l_1 = 3, l_2 = 7, l_3 = 11 \\ b(n+6) &= \mathrm{mod}(b(n) + b(n+1), 2), & n &= \{0, 1, \ldots 55\}, \\ b(0) &= 1, b(m) = 0, & m &= \{1, 2, 3, 4, 5\} \end{aligned} \quad \text{[Equation 9]}$$

Referring to Equation 8, a_p(n) is the ZC sequence and determines a cell identifier group. m(p) and cyclic shift k_p may be used for providing a specific cell identifier. Referring to Equation 9, b_q(n) may be the scrambling sequence that includes a cyclic shift of the basic sequence b_(n), and may be used for indicating the position of the M-SSS in the M-frame in order to acquire the frame timing. The cyclic shift l_q may be determined according to the value q.

The value of m(p) with respect to the specific p may be determined such as m(p)=1+mod(p, 61), the value of k_p may be determined such as k_p=7[p/61].

FIG. 23 illustrates an example of a method for implementing M-PSS to which the method proposed in the present disclosure can be applied.

Particularly, FIG. 23 shows a method for generating an M-PSS using a complementary Golay sequence.

As shown in FIG. 23, using a complementary Golay sequence pair, a CGS that is going to be transmitted to each OFDM symbol is selected (i.e., select a(n) or b(n)).

Next, in the case of using a cover code, c(1) to c(N) may be multiplied to each CGS, and in the case of not using the cover code, 1 may be inputted to all of c(n).

Subsequently, the DFT and the IFFT are performed for each symbol, and transmitted to each OFDM symbol on time domain.

Additionally, the ZC sequence of length 12 may also generate a sequence that is going to be transmitted to each OFDM symbol.

In this case, by using the same method applied in FIG. 23, the M-PSS may be implemented.

NB (Narrow Band)-LTE System

Hereinafter, NB-LTE (or NB-IoT) system will be described.

The UL of NB-LTE is based on SC-FDMA, and this is a special case of SC-FDMA and may flexibly allocate the bandwidth of the UE including single tone transmission.

One important aspect for the UL SC-FDMA is to enable time of a multiple of co-scheduled UEs coincide with each other so that the arrival time difference in the base station to be within the cyclic prefix (CP).

Ideally, the UL 15 kHz subcarrier spacing should be used in NB-LTE, but the time-accuracy, which may be achieved when detecting PRACH from the UEs in a very poor coverage condition, should be considered.

Hence, CP duration needs to be increased.

One way to achieve the above purpose is to reduce the subcarrier spacing for NB-LTE M-PUSCH to 2.5 kHz by dividing 15 kHz subcarrier spacing by 6.

Another motive for reducing subcarrier spacing is to allow a user multiplexing of a high level.

For example, one user is basically allocated to one subcarrier.

This is more effective for UEs in a condition that the coverage is very limited like UEs having no benefit from allocation of a high bandwidth while the capacity increases due to the simultaneous use of the maximum TX power of a multiple of UEs.

SC-FDMA is used for transmission of a multiple of tones in order to support a higher data rate along with the additional PAPR reduction technology.

The UL NB-LTE includes 3 basic channels including M-PRACH, M-PUCCH and M-PUSCH.

The design of M-PUCCH discuses at least three alternative plans as follows.

One tone in each edge of the system bandwidth
UL control information transmission on M-PRACH or M-PUSCH
Not having dedicated UL control channel
Time-Domain Frame and Structure In the UL of NB-LTE having 2.5 kHz subcarrier spacing, the wireless frame and the subframe are defined as 60 ms and 6 ms, respectively.

As in the DL of NB-LTE, M-frame and M-subframe are defined in the same manner in the UL link of the NB-LTE.

FIG. 24 illustrates how the UL numerology is stretched in the time domain.

The NB-LTE carrier includes 5 PRBs in the frequency domain. Each NB-LTE PRB includes 12 subcarriers.

The UL frame structure based on 2.5 kHz subcarrier spacing is illustrated in FIG. 17.

FIG. 24 illustrates an example of UL numerology which is stretched in the time domain when the subcarrier spacing is reduced from 15 kHz to 2.5 kHz.

FIG. 25 illustrates an example of time units for the UL of NB-LTE based on the 2.5 kHz subcarrier spacing.

Operation System of NB-LTE System

FIG. 26 illustrates an example of an operation system of NB-LTE system to which the method proposed in the present specification is applicable.

Specifically, FIG. 26(a) illustrates an in-band system, FIG. 26(b) illustrates a guard-band system, and FIG. 26(c) illustrates a stand-alone system.

The in-band system may be expressed as an in-band mode, the guard-band system may be expressed as a guard-band mode, and the stand-alone system may be expressed as a stand-alone mode.

The in-band system of FIG. 26(a) indicates a system or mode which uses a specific 1 RB within the legacy LTE band for NB-LTE (or LTE-NB) and may be operated by allocating some resource blocks of the LTE system carrier.

The guard-band system of FIG. 25(b) indicates a system or mode which uses NB-LTE in the space which is reserved for the guard band of the legacy LTE band and may be operated by allocating the guard-band of LTE carrier which is not used as the resource block in the LTE system.

The legacy LTE band includes the minimum 100 kHz at the last of each LTE band.

In order to use 200 kHz, 2 non-continuous guardbands may be used.

The in-band system and the guard-band system indicate the structure where NB-LTE co-exists within the legacy LTE band.

In contrast, the standalone system of FIG. 26(c) indicates a system or mode which is independently configured from the legacy LTE band and may be operated by separately allocating the frequency band (future reallocated GSM carrier) which is used in the GERAN.

FIG. 27 illustrates an example of an NB-frame structure of 15 kHz subcarrier spacing to which the method proposed in the present specification is applicable.

As illustrated in FIG. 27, it may be understood that the NB-frame structure for 15 kHz subcarrier spacing is the same as the frame structure of the legacy system (LTE system).

Namely, 10 ms NB-frame includes 10 1 ms NB-subframes, and 1 ms NB-subframe includes 2 0.5 ms NB-slots.

Further, 0.5 ms NB-slot includes 7 OFDM symbols.

FIG. 28 illustrates an example of NB-frame structure for 3.75 kHz subcarrier spacing to which the method proposed in the present specification is applicable.

Referring to FIG. 28, 10 ms NB-frame includes 5 2 ms NB-subframes, and 2 ms NB-subframe includes 7 OFDM symbols one guard-period (GP).

The 2 ms NB-subframe may also be expressed as NB-slot or NB-RU (resource unit), etc.

FIG. 29 illustrates an example of NB subframe structure in 3.75 kHz subcarrier spacing to which the method proposed in the present specification is applicable.

FIG. 29 shows the correspondence between legacy LTE subframe structure and 3.75 subframe structure.

Referring to FIG. 29, subframe (2 ms) of 3.75 kHz corresponds to 2 1 ms subframes (or 1 ms TTIs) of the legacy LTE.

Hereinafter, a method for configuring the M-PSS, the M-SSS, and the M-PBCH by considering the frame structure type in the NB-LTE system proposed by the present specification will be described.

As described above, the narrow band (NB)-LTE represents a system for supporting low complexity and low power consumption having a system bandwidth (BW) corresponding to 1 physical resource block (PRB) or 1 RB of the LTE system.

That is, the NB-LTE system may be primarily used as a communication mode for implementing the IoT by supporting a device (alternatively, terminal) such as machine-type communication (MTC).

Further, the NB-LTE system uses the same OFDM parameters as the LTE system, such as the subcarrier spacing used in the existing LTE system, and the like, and as a result, an additional band may not be allocated for the NB-LTE system.

That is, 1 RPB of the legacy LTE system band is allocated for the NB-LTE to efficiently use the frequency.

A physical channel in the NB-LTE system will be defined as the M-PSS/M-SSS, M-PBCH, M-PDCCH/M-EPDCCH, M-PDSCH, and the like and expressed or called by adding M- or narrowband- (N-) in order to distinguish the NB-LTE system from the LTE in the case of the downlink.

Configuring the M-PSS, the M-SSS, and the M-PBCH in the NB-LTE system proposed by the present specification may be generally divided into (1) a method for similarly configuring the M-PSS, the M-SSS, and the M-PBCH in different frame structure types (first embodiment) and (2) a method for differently configuring the M-PSS, the M-SSS, and the M-PBCH in the different frame structure types (second embodiment).

First Embodiment

The first embodiment provides a method for similarly configuring the M-PSS, the M-SSS, and the M-PBCH in different frame structure types (frame structure type 1, frame structure type 2, frame structure type 3, and the like).

Hereinafter, frame structure type 1 and frame structure type 2 in the LTE system are described as the different frame structure types as an example, but are not limited thereto and may be extensively applied even to other cases.

Further, the methods proposed by the present specification may be applied even to a stand-alone system and a guard-band system in addition to the in-band system.

One of methods for configuring the M-PSS, the M-SSS, the M-PBCH, and the like to be used for both frame structure type 1 and frame structure type 2 in the NB-LTE system is to similarly configure the M-PSS, the M-SSS, the M-PBCH, and the like regardless of the frame structure type.

That is, when the M-PSS, the M-SSS, the M-PBCH, and the like are configured regardless of the frame structure type and the corresponding signals are transmitted to the terminal, the terminal may find a timing and a frequency estimated through an initial M-PSS.

In addition, the terminal may detect a cell ID of a corresponding cell through the M-SSS.

Therefore, the terminal may successfully decode a master information block (MIB) transmitted to the M-PBCH (by a base station) through the detected cell ID.

Herein, it is assumed that the legacy LTE and the NB-LTE uses the same or similar cell ID.

In addition, the base station may announce a frame structure type (that is, whether the frame structure type is type 1 or type 2) of a current cell to the terminal by using one (alternatively, specific information or a specific field) of information announced through the corresponding MIB.

However, when decoding performance of the terminal, and the like are considered, it may be difficult to similarly apply a synchronization position to frame structure type 1 and frame structure type 2 due to availability of a downlink subframe of frame structure type 2.

In this case, a method may also be considered, which distinguishes frame structure type 1 and frame structure type 2 by using a relative distance (alternatively, time) in which the M-PSS and the M-SSS are transmitted or a subframe index in which the M-PSS and the M-SSS are transmitted.

When frame structure type 1 and frame structure type 2 are distinguished from each other by using the subframe index, the base station may add information indicating the frame structure type to the M-PBCH, and the like and transmit the M-PBCH including the corresponding information to the terminal in order to complement the decoding performance of the terminal.

When the terminal needs to obtain the frame structured type supported by the cell through blind decoding or blind detection, complexity for the blind decoding or blind detection of the terminal increases.

Accordingly, reduction of other information needs to be relatively considered.

For example, the base station may load some of information on 504 cell IDs on a synchronization sequence and transmit the corresponding information and transmit the remaining information through the M-PBCH, and the like rather than transmitting all information on 504 cell IDs to the terminal.

Alternatively, the base station may not transmit information on a frame number in which the M-SSS is transmitted to the terminal, but allow the terminal to blindly search for the frame number in which the M-SSS is transmitted or the information on the frame number to the terminal.

As a result, it may be assumed that information which needs to be distinguished through the M-PSS and the M-SSS is prevented from being '4096' or more may be assumed at the time of transmitting the synchronization signal in a limited bandwidth and limited subframes.

When one radio frame (10 ms) is considered in the legacy LTE system, the M-PSS, the M-SSS, and the M-PBCH may be configured to be transmitted in subframes #0, #4, #5, and #9 other than subframes may be allocated to an MBSFN subframe in frame structure type 1.

Next, a case where the M-PSS, the M-SSS, and the M-PBCH are transmitted in frame structure type 2 will be described.

In case of frame structure type 2, subframes that may be transmitted from the base station to the terminal vary in accordance with uplink-downlink configurations as shown in Table 1 above.

In respect to each uplink-downlink configuration, the base station may transmit the M-PSS, the M-SSS, the M-PBCH, and the like to the terminal in the case of the downlink subframe.

Therefore, in frame structure type 2, the case in which the M-PSS, the M-SSS, and the M-PBCH may be transmitted may be generally divided into case 1, case 2, and case 3.

First, case 1 is a method in which the M-PSS, the M-SSS, the M-PBCH, and the like are transmitted in subframes #0, #5, and #9 in the uplink-downlink configurations other than uplink-downlink configuration #0.

Next, case 2 is a method in which the M-PSS, the M-SSS, the M-PBCH, and the like are transmitted in subframes #0, #4, #5, and #9 in the uplink-downlink configurations other than uplink-downlink configurations #0, #3, and #6.

Next, case 3 as a case to satisfy all uplink-downlink configurations is a method in which the M-PBCH is transmitted in subframe #0 and the M-PSS and the M-SSS are alternately transmitted according to respective cycles in subframe #5.

Consequently, when the M-PSS, the M-SSS, the M-PBCH, and the like are similarly configured regardless of the frame structure type, (1) the M-PSS, the M-SSS, the M-PBCH, and the like may be configured to be transmitted in subframes #0, #5, and #9 or (2) the M-PSS, the M-SSS, the M-PBCH, and the like may be configured to be transmitted in subframes #0, #4, #5, and #9.

(Case 1)

Case 1 is described in detail with reference to FIG. 30.

FIG. 30 is a diagram illustrating one example of M-PSS, M-SSS, and M-PBCH configurations having the same location in a radio frame proposed by the present specification.

Referring to FIG. 30, it can be seen that the M-SSS is transmitted in subframe #0, the M-PBCH is transmitted in subframe #5, and the M-PSS is transmitted in subframe #9.

Further, it can be seen that the M-PSS, the M-SSS, and the M-PBCH are not allocated to first 3 symbols of the subframe and it can be seen that the M-PSS, the M-SSS, and the M-PBCH are not allocated to a resource in which an LTE CRS is transmitted.

Further, Case 1 may be divided into three cases (case 1-1, case 1-2, and case 1-3) as described below.

Case 1-1 is a method in which the M-SSS is transmitted in subframe #0, the M-PBCH is transmitted in subframe #5, and the M-PSS is transmitted in subframe #9 for each radio frame.

In the case of Case 1-1, a radio frame in which the M-PSS, the M-SSS, and the M-PBCH are not transmitted may exist, but when the M-PSS, the M-SSS, and the M-PBCH are transmitted, subframe indexes in which respective channels are transmitted may be determined as subframes #9, #0, and #5, respectively.

Herein, the subframe indexes in which the respective channels (M-PSS, M-SSS, and M-PBCH) are transmitted may be changed.

However, when the corresponding channel is transmitted for each radio frame, it may be assumed that the respective channels are transmitted in the same subframe index.

In Case 1-2, the subframe indexes in which the channels (M-PSS, M-SSS, and M-PBCH) are transmitted may be changed for each radio frame.

Alternatively, one or more channels may be mapped to one subframe index and when multiple channels are mapped to one subframe index, it may be assumed that different channels are transmitted in different radio frame.

For example, it may be defined that the M-PSS is transmitted in subframe #0 of an odd radio frame and the M-PBCH, and the like are transmitted in subframe #0 of an even radio frame.

Case 1-3 is a method in which the respective channels (M-PSS, M-SSS, and M-PBCH) are configured to be consecutively mapped to multiple subframes in one radio frame.

For example, the M-PSS may be configured to be transmitted to subframe #9 of radio frame #0 and subframe #0 of radio frame #1, the M-SSS may be configured to be mapped to subframe #9 of radio frame #1 and subframe #0 of radio frame #2, and the M-PBCH may be configured to be mapped to subframe #9 of radio frame #2 and subframe #0 of radio frame #3.

The mapping (method) of Case 1-3 may be applied to one or multiple channels and characteristically applied to the mapping of the M-PBCH.

(Case 2)

In Case 2, various methods are available as described below.

First, Case 2-1 is a method in which each of the M-PSS, the M-SSS, and the M-PBCH is transmitted by selecting one subframe among subframes #0, #4, #5, and #9 so as to prevent the M-PSS, the M-SSS, and the M-PBCH from overlapping with each other.

Next, Case 2-2 is a method in which each of each M-PSS and the M-PBCH is transmitted by selecting one subframe among subframes #0, #4, #5, and #9 so as to prevent the M-PSS and the M-PBCH from overlapping with each other and the M-SSS is transmitted by using two remaining subframes.

Case 2-1 may have a structure having the similar form to FIG. 30 described above.

When Case 2-2 is described with reference to FIG. 31, the M-PBCH may be configured to be transmitted to subframe #0, the M-SSS may be configured to be transmitted to subframes #4 and #5, and the M-PSS may be configured to be transmitted to subframe #9.

In this case, it can be seen that the M-SSS is transmitted by using 6 OFDM symbols per subframe differently from FIG. 30.

That is, FIG. 31 is a diagram illustrating another example of M-PSS, M-SSS, and M-PBCH configurations having the same location in the radio frame proposed by the present specification.

Even in Case 2, contents or options described in Case 1 may be applied.

Characteristically, in frame structure type 1, the M-SSS may be transmitted to subframe #4 and in frame structure type 2, the M-SSS may not be transmitted to subframe #4.

Therefore, the terminal may distinguish frame structure type 1 and frame structure type 2 from each other.

That is, when the M-SSS is mapped to a subframe index which may not be transmitted in frame structure type 2, the terminal may know that the frame structure type of the corresponding base station is type 1.

That is, the terminal may distinguish whether the frame structure type is type 1 or type 2 according to the position or the subframe index in which the M-SSS is transmitted.

Additionally, a case in which both the M-PSS and the M-SSS use two subframes may be considered.

When the M-PBCH is configured to be transmitted every 10 ms (alternatively, every radio frame), the M-PSS is configured to be transmitted every 20 ms, and the M-SSS is configured to be transmitted every 80 ms, three following methods may be considered.

A first method is a method in which the M-PBCH is configured to be transmitted to subframe #0, the M-PSS is configured to be transmitted to subframes #4 and #5 of the even radio frame, and the M-SSS is configured to be transmitted to subframes #4 and #5 of radio frame #1.

FIG. 32 is a diagram illustrating the first method described above.

That is, FIG. 32 is a diagram illustrating yet another example of the M-PSS, M-SSS, and M-PBCH configurations having the same location in the radio frame proposed by the present specification.

In detail, FIG. 32 is a diagram illustrating one example of M-PSS, M-SSS, and M-PBCH configurations having the same location in 8 radio frames.

Referring to FIG. 32, radio frames #3, #5, and #7 may use all uplink-downlink configurations and radio frames #0, #1, #2, #4, #5, and #6 other than radio frames #3, #5, and #7 may use uplink-downlink configurations #1, #2, #4, and #5.

A second method is a method in which the M-PBCH is configured to be transmitted to subframe #0, the M-PSS is configured to be transmitted to subframes #5 and #9 of the even radio frame, and the M-SSS is configured to be transmitted to subframes #5 and #9 of radio frame #1.

FIG. 33 is a diagram illustrating a second method.

That is, FIG. 33 is a diagram illustrating still yet another example of the M-PSS, M-SSS, and M-PBCH configurations having the same location in the radio frame proposed by the present specification.

Referring to FIG. 33, radio frames #3, #5, and #7 may use all uplink-downlink configurations and radio frames #0, #1, #2, #4, #5, and #6 other than radio frames #3, #5, and #7 may use uplink-downlink configurations #1 to #6.

A third method is a method in which the M-PBCH is configured to be transmitted to subframe #5, the M-PSS is configured to be transmitted to subframe #9 of the even radio frame and subframe #0 of the odd radio frame, and the M-SSS is configured to be transmitted to subframe #9 of radio frame #1 and subframe #0 of radio frame #2.

FIG. 34 is a diagram illustrating a third method.

That is, FIG. 34 is a diagram illustrating still yet another example of the M-PSS, M-SSS, and M-PBCH configurations having the same location in the radio frame proposed by the present specification.

Referring to FIG. 34, in the third method, radio frames #3, #5, and #7 may use all uplink-downlink configurations like the second method (FIG. 33) and radio frames #0, #1, #2, #4, #5, and #6 other than radio frames #3, #5, and #7 may use uplink-downlink configurations #1 to #6.

Additionally, the frame structure types may be defined to be distinguished by differently setting the sequence to configure the M-PSS.

In this regard, the Golay sequence described in FIG. 23 and the method for configuring and transmitting the M-PSS by using the Golay sequence will be described in brief.

Golay Sequence

Golay complementary sequences are pairs of binary codes belonging to a bigger family of signals called complementary pairs, which consists of two codes of the same length n, whose auto-correlation functions have side-lobes equal in magnitude but opposite in sign.

Summing them up results in a composite auto-correlation function with a peak of 2n and zero side-lobes.

There are several essentially different algorithms for generating Golay pairs.

Let the variables ai and bi (i=1,2, ..., n) be the elements of two n-long complementary sets, which are equal to either +1 or −1.

$$A = a_1, a_2, \ldots, a_n, \; B = b_1, b_2, \ldots, b_n \quad \text{[Equation 10]}$$

The ordered pair (A; B) are Golay sequences of length n if and only if their associated polynomials are $$A(x) = a_1 + a_2 x + \ldots + a_n x^{n-1}$$

$$B(x) = b_1 + b_2 x + \ldots + b_n x^{n-1} \quad \text{[Equation 11]}$$

And satisfy the identity, $$A(x)A(x^{-1}) + B(x)B(x^{-1}) = 2n \quad \text{[Equation 12]}$$

in the Laurent polynomial ring Z[x, x−1].

Let the auto-correlation function NA and NB, corresponding to the sequences A and B respectively, be defined by the following expressions:

$$N_A(j) = \Sigma_{i \in Z} a_i a_{i+j}, N_B(j) = \Sigma_{i \in Z} b_i b_{i+j} \quad \text{[Equation 13]}$$

where the set ak=0 if k∉(1, ..., n). Now the condition Equation 12 can be substituted by the sum NA+NB, and $$N_A(j) + N_B(j) = \begin{cases} 2N, & j = 0 \\ 0, & j \neq 0 \end{cases} \quad \text{[Equation 14]}$$

The sum of both auto-correlation functions is 2N at j=0 and zero otherwise.

Let the variables a(i) and b(i) be the elements (i=0,1, ..., 2n−1) of two complementary sequence with elements 1 and −1 of length 2n:

$$a_0(i) = \delta(i), b_0(i) = \delta(i) \quad \text{[Equation 15]}$$

$$a_n(i) = a_{n-1}(i) + b_{n-1}(i - 2^{n-1}), b_n(i) = a_{n-1}(i) + b_{n-1}(i - 2^{n-1}) \quad \text{[Equation 16]}$$

where δ(i) is the Kronecker delta function. Expression 17 shows that on each step new elements of the sequences are produced by concatenation of elements $a_n(i)$ and $b_n(i)$ of length n.

In transmitting the M-PSS (alternatively, N-PSS) in the NB-LTE system, the M-PSS (alternatively, N-PSS) may be transmitted by using multiple OFDM symbols.

In this case, as the sequence transmitted to the OFDM symbol, the same sequence may be repeatedly transmitted and the sequence may be transmitted by multiplying each OFDM symbol by a specific over sequence. When this is expressed by the drawing, a structure illustrated in FIG. 35 is provided.

That is, FIG. 35 illustrates one example of an M-PSS transmission structure to which the method proposed by the present specification can be applied.

When 1 PRB is assumed, the maximum length of the sequence which may be transmitted to one OFDM symbol is 12 on the assumption of the 15 KHz subcarrier spacing.

Hereinafter, for easy description, 1 PRB and 15 KHz subcarrier spacing are assumed.

Further, 'PSS' expressed hereinbelow which means the PSS in the NB-LTE system may be called or expressed as M-PSS, N-PSS, NB-PSS, narrowband-PSS, and the like.

When the PSS is detected by a receiver (alternatively, the terminal), implementation processed in the time domain is general by considering the complexity of the calculation.

In order to obtain time/frequency synchronization through the PSS, correlation is acquired by applying a sliding window to the PSS sequence.

Since the same sequence is transmitted every OFDM symbol, the PSS transmission structure illustrated in FIG. 35 may show a relatively large correlation value by using the OFDM symbol length as the period.

Therefore, a correlation characteristic may be improved by increasing the period in which the relatively large correlation value is output by using a condition of Equation 14 of a complementary Golay sequence.

Further, the cover sequence is applied every OFDM symbol to further improve the correlation characteristic.

In this case, a method of transmitting the PSS by using the complementary Golay sequence is described below.

(Method 1)

First, Method 1 is a method that a complementary Golay sequence pair is alternately disposed in the OFDM symbol.

For example, when N=6 OFDM symbols is assumed, a(n) is transmitted to OFDM symbol 1 and b(n) is transmitted to OFDM symbol 2.

In this case, c(n) may be applied by taking length 6 as an m-sequence of length 7.

In this case, it is preferable that the number of OFDM symbols transmitting the PSS is an even number.

When the complementary Golay sequence is assumed as a binary sequence, an available sequence length is 2a10b26c (a, b, and c are integers of 0 or more). 0∥□∥-.

If there is only 12 available resources in one OFDM symbol, the available Golay sequence length may be 10.

One example of the complement Golay sequence pair of length 10 is a(n)=[1 1-1 -1 1 1 1-1 1-1] and b (n)=[1 1 1 1 1-1 1-1 -1 1].

Among the OFDM symbols, the OFDM symbol filled with 0 is transmitted to REs to which no sequence is allocated.

When a non-binary complementary Golay sequence is assumed, the sequence pair exists without a limit in length, and as a result, sequence pairs a(n) and b(n) with a length of 12 may be transmitted while being disposed in the OFDM symbol in the same manner disposed and transmitted can be transmitted in an OFDM symbol in the same manner.

Correlation characteristics for various c(n) patterns with Sequence pairs a(n) and b(n) with the length of 10 are illustrated in FIG. 36.

FIG. 36 is a diagram illustrating correlation characteristics depending on various cover sequence patterns.

As another method, when the PSS is transmitted to odd OFDM symbols, the PSS may be transmitted in such a manner that one sequence of the sequence pair is transmitted once more.

For example, when N=7 OFDM symbols, a(n), b(n), a(n), b(n), a(n), b(n), and a(n) may be transmitted while being disposed in the OFDM symbol in the order of a(n), b(n), a(n), b(n), a(n), b(n), and a(n).

(Method 2)

Next, Method 2 is a method that all of the complementary Golay sequence pairs are disposed in one OFDM symbol.

Method 2 may be divided into (1) Method 2-1 and (2) Method 2-2 as described below.

First, Method 2-1 is a method in which a sequence corresponding to ½ of one OFDM symbol is generated and disposed.

For example, when N=6 OFDM symbols is assumed, non-binary complementary Golay sequences a(n) and b(n) having a length of 6 may be generated, a(n) ma be allocated to ½ of available REs of one OFDM symbol, and b(n) may be transmitted while being allocated to the remaining ½ REs.

In this case, a(n) may be allocated to former ½ REs and b(n) may be allocated to latter ½ REs.

Next, Method 2-2 is a method in which the OFDM symbols a(n) and b(n) are transmitted through superposition.

For example, Method 2-2 is a method in which when N=6 OFDM symbols, the binary/non-binary complementary Golay sequence with the length of 10/12 is generated and a(n)+b(n) is calculated and transmitted.

(Method 3)

Next, Method 3 is a method in which L or more complementary Golay sequences are disposed and transmitted.

In this case, the number of OFDM symbols transmitting the PSS needs to satisfy a condition in which L is multiple.

For example, when L=3 and N=6, complementary Golay sequence la(n), lb(n), and lc(n) having the length of 10 or 12 may be sequentially transmitted while being disposed in the OFDM symbol.

That is, la(n), lb(n), lc(n), la(n), lb(n), and lc(n) are disposed in the order of la(n), lb(n), lc(n), la(n), lb(n), and lc(n) and transmitted by applying cover sequence c(n).

After the PSS is detected, the terminal detects the SSS to acquire cell id detection, a subframe index in which the SSS is transmitted, and information on other system information.

The SSS expressed hereinbelow may be interpreted similarly to M-SSS, N-SSS, NB-SSS, and the like.

The transmission structure of the SS may be configured as illustrated in FIG. 37.

That is, FIG. 37 illustrates one example of an SSS transmission structure to which the method proposed by the present specification can be applied.

Referring to FIG. 37, a sequence having a length of M is generated and the generated sequence having the length of M is multiplied by a scramble sequence having the length of M.

Thereafter, a signal multiplied by the scrambling sequence is divided into sequences having a length of L (M>=L) and disposed in corresponding OFDM symbols so as to be transmitted to N OFDM symbols and transmitted by scrambling sequence s(n).

For example, when M=72, L=12, and N=6 are assumed, a sequence having a length of 72 is divided into 6 sequences having the length of 12 to be transmitted to 6 OFDM symbols, respectively.

In this case, a method for designing an SSS sequence in order to transmit the corresponding information is described below.

(Method 1)

In Method 1, two Zadoff-Chu sequences (SSS1 and SSS2) having a length of M/2 are generated and thereafter, (In this case, a root index is fixed to a specific value. For example, the root index may be fixed to 1.) concatenated to generate a sequence having a length of M.

Information on the cell id may be expressed by using a combination (CS1 and CS2) of cyclic shift values of two generated sequences.

In addition, the scrambling sequence having the length of M is generated by functions of information on a subframe in which the SSS is transmitted and system information.

The sequence having the length L is divided to be disposed in N OFDM symbols.

For example, when M=72, L=12, and N=6 are assumed, two Zadoff-Chu sequences having a length of 36 are concatenated by generating the cyclic shift value expressing the cell id.

A PN sequence having a length of 128 is divided into sequences having the length of 12 to be disposed in the corresponding OFDM symbols in order to transmit the scrambling sequence having a length of c to 6 OFDM symbols.

In the m-sequence having the length of 127 generated by initializing the scrambling sequence to the system information and the subframe information like $c_{init}=N_{sys}2^4+N_{index}^{subframe}$, the 72 scrambling sequence is generated by applying a predetermined offset to be multiplied by the concatenated Zadoff-Chu sequences.

As another method, the offset value is generated by the function of the subframe information and the system information with respect to the m-sequence having the length of 127, which is generated by initialization with a predetermined value (e.g., cinit=1) to generate the scrambling sequence having the length of 72.

In this case, when the offset value is larger than 55, the scrambling sequence is generated by counting the offset value again in a first sequence by a first circular shift method.

That is, the scrambling sequence may be generated by a method such as s(k), . . . , s(127), s(1), . . . .

(Method 2)

In Method 2, complementary Golay sequences (SSS1 and SS2) having the length of M/2 is generated and thereafter, concatenated to generate the M-length sequence.

In this case, one sequence in the complementary Golay sequence pair may be used as the SS1 and the SS2 or one sequence in the sequence pair may be allocated to SS1 and the other one may be allocated to SSS2.

The information on the cell id may be expressed by using the combination (CS1 and CS2) of the cyclic shift values of two generated sequences.

In addition, the scrambling sequence having the length of M is generated by the functions of the information on the subframe in which the SSS is transmitted and the system information.

The sequence having the length L is divided into N to be disposed in N OFDM symbols.

0 may be allocated to some REs of the OFDM symbol due to a limit in length of the complementary Golay sequence pair according to a combination of M, L, and N.

Based on the aforementioned contents, the frame structure types may be defined to be distinguished by differently setting the sequence to configure the M-PSS.

For example, the M-PSS transmitted to one or two subframes is configured by a short-Zadoff-Chu (ZC) sequence or long-ZC sequence to be transmitted.

For example, in the case of the short-Zadoff-Chu (ZC) sequence, each of the short ZC sequences may be mapped to one OFDM symbol.

In addition, in the case of the long-ZC sequence, the long-ZC sequence may be mapped to 11 OFDM symbols.

In this case, it may be considered that the base station transmits the sequences to have a complex conjugate relationship with each other as forms of the transmitted sequences in order for the terminal to efficiently find a timing offset and a frequency offset.

The complex conjugate relationship is formed by controlling the root index.

For example, in the case of frame structure type 1, the M-PSS may be transmitted by using sequences configured by two different root indexes A and B in the order of A and B.

Herein, the root indexes A and B are integers which are not larger than the corresponding sequence length and a ZC sequence configured by root index A and a ZC sequence configured by root index B have the complex conjugate relationship with each other.

In addition, in the case of frame structure type 2, the M-PSS may be transmitted by using sequences configured by two different root indexes B and A in the order of B and A.

One example of the method for transmitting the M-PSS by using the short ZC sequence is illustrated in FIG. 38 and one example of the method for transmitting the M-PSS by using the long ZC sequence is illustrated in FIG. 39.

That is, FIGS. 38 and 39 illustrate one example of a method for transmitting the M-PSS by using different sequences for each frame structure type proposed by the present specification.

As illustrated in FIGS. 38 and 39, the frame structure types may be distinguished by setting the sequences differently, but configured to be used for a purpose of distinguishing operation modes (i.e., in-band, guard band, and standalone) by setting the sequences differently.

Second Embodiment

The second embodiment provides a method for configuring the M-PSS, the M-SSS, and the M-PBCH in different frame structure types (frame structure type 2, frame structure type 2, frame structure type 3, and the like) differently from each other.

Another method of the methods for configuring the M-PSS, the M-SSS, the M-PBCH, and the like so that the NB-LTE system is used for both frame structure type 1 and frame structure type 2 defined in the LTE is to differently configure the M-PSS, the M-SSS, the M-PBCH, and the like according to each frame structure type differently from the first embodiment described above.

That is, when the M-PSS, the M-SSS, and the M-PBCH are configured differently from each other according to the frame structure type, the terminal may find the timing and the frequency estimated through the initial M-PSS and attempts blind detection with respect to candidate subframes in which the M-SSS may be transmitted, and as a result, the terminal may determine whether the frame structure type operated by the base station is type 1 or type 2.

When the frame structure type is type 1 in the first embodiment described above, the M-PSS, the M-SSS, and the M-PBCH may be transmitted in subframes #0, #4, #5, and #9.

Further, when the frame structure type is type 2, it can be seen that the M-PSS, the M-SSS, and the M-PBCH may be transmitted in subframes #0, #5, and #9 in the uplink-downlink configurations other than uplink-downlink configuration #0.

Alternatively, the M-PSS, the M-SSS, and the M-PBCH may be transmitted even in subframes #0, #4, #5, and #9 other than uplink-downlink configurations #0, #3, and #6.

Alternatively, by considering all uplink-downlink configurations, the M-PBCH may be transmitted in subframe #0 and the M-PSS and the M-SSS may be alternately transmitted in subframe #5.

Hereinafter, the second embodiment, that is, various methods that configure (alternatively, set or design) the M-PSS, the M-SSS, the M-PBCH, and the like differently from each other according to the frame structure type will be described.

(Method 1)

Method 1 is a method in which all of the M-PSS, the M-SSS, and the M-PBCH are transmitted through different subframes.

FIG. 40 is a diagram illustrating one example of M-PSS, M-SSS, and M-PBCH configurations having different locations in a radio frame proposed by the present specification.

That is, Method 1 given above is described with reference to FIG. 40.

In the case of frame structure type 1, it can be seen that the M-PBCH is configured to be transmitted in subframe #0, the M-SSS is configured to be transmitted in subframe #4, and the M-PSS is configured to be transmitted in subframe #5.

In the case of frame structure type 2, it can be seen that the M-SSS is configured to be transmitted in subframe #0, the M-PBCH is configured to be transmitted in subframe #5, and the M-PSS is configured to be transmitted in subframe #9.

In this case, the terminal may find the timing and the frequency estimated by detecting the M-PSS and determines in which subframe of the previous subframe and the just subsequent subframe the M-SSS is transmitted by attempting the blind detection, and as a result, the terminal may determine whether the frame structure type currently operated by the base station is type 1 or type 2.

Therefore, when the terminal accurately determines the frame structure type operated by the bases station, the terminal may previously know that the M-PBCH is transmitted through subframes #0 and #5 according to each frame structure type.

Accordingly, the terminal may decode the MIB transmitted through the M-PBCH.

An advantage of Method 1 is that the terminal may more accurately determine the frame structure type.

That is, when the terminal determines the frame structure type after detecting the M-PSS, the terminal may determine the frame structure type by using only the location of the subframe in which the M-SSS is transmitted, but furthermore, the terminal may determine the frame structure type by more deliberately or accurately performing the blind detection by considering even the location of the subframe in which the M-PBCH is transmitted in addition to the location of the subframe in which the M-SSS is transmitted.

However, in Method 1, detection complexity (or calculation complexity) may increase in terms of the terminal according to a situation.

(Method 2)

Method 2 is a method in which any one of the M-PSS, the M-SSS, and the M-PBCH is configured to be transmitted through the same subframe and two others are configured to be transmitted through different subframes.

FIG. 41 is a diagram illustrating Method 2.

That is, FIG. 41 is a diagram illustrating another example of the M-PSS, M-SSS, and M-PBCH configurations having different locations in the radio frame proposed by the present specification.

Method 2 given above is described with reference to FIG. 41.

It can be seen that the M-PBCH is configured to be continuously transmitted in subframe #0 regardless of the frame structure type.

In addition, in the case of frame structure type 1, the M-SSS is configured to be transmitted in subframe #4 and the M-PSS is configured to be transmitted in subframe #5.

Moreover, in the case of frame structure type 2, the M-SSS is configured to be transmitted in subframe #5 and the M-PSS is configured to be transmitted in subframe #9.

In Method 2, since the M-PBCH is continuously transmitted through the same subframe, the location of the M-PBCH need not be distinguished according to the frame structure type, but the frame structure type needs to be distinguished through the M-PSS detection and the M-SSS blind detection.

The advantage of Method 2 is that since one of the M-PSS, the M-SSS, and the M-PBCH is fixed, it is advantageous to the terminal in terms of the detection complexity.

For example, as illustrated in FIG. 38, when it is assumed that the M-PBCH is fixed, the terminal may detect the M-PSS and determine the location of the subframe in which the M-PBCH is transmitted by using the estimated timing and frequency information.

Further, the terminal may determine the frame structure type by determining how many subframes the M-PBCH and the M-PSS are spaced apart from each other by.

Additionally, the terminal may determine the frame structure type by considering both positional information of the subframe in which the M-PBCH is transmitted and subframe information in which the M-SSS is transmitted.

(Method 3)

Method 3 is a method in which only one of the M-PSS, the M-SSS, and the M-PBCH is configured to be transmitted through different subframes and two others are configured to be transmitted through the same subframe.

FIG. 42 is a diagram illustrating Method 3.

That is, FIG. 42 is a diagram illustrating yet another example of the M-PSS, M-SSS, and M-PBCH configurations having different locations in the radio frame proposed by the present specification.

When Method is described with reference to FIG. 42, the M-PBCH may be configured to be continuously transmitted in subframe #0 and the M-PSS may be configured to be continuously transmitted in subframe #5 regardless of the frame structure type.

Moreover, in the case of frame structure type 1, the M-SSS may be configured to be transmitted in subframe #4 and, in the case of frame structure type 2, the M-SSS may be configured to be transmitted in subframe #9.

Even in Method 3, since the M-PBCH is continuously transmitted through the same subframe similarly to the case of FIG. 38 described above, the location of the M-PBCH need not be distinguished according to the frame structure type, but the frame structure type needs to be distinguished through the M-PSS detection and the M-SSS blind detection.

When Method 3 is used, after the terminal detects the M-PSS, since the location of the subframe in which the M-PBCH is transmitted is determined, the terminal may know the corresponding location.

In this case, when the blind detection for the M-PBCH is not required, an effect of reducing complexity is achieved in terms of the terminal.

Further, since the terminal may determine the location by detecting the M-PSS and thereafter, performing the blind detection of only the location of the subframe in which the M-SSS is transmitted, the effect of reducing the complexity of the terminal is achieved.

(Method 4)

Method 4 is a method that distinguishes whether the frame structure type is type 1 or type 2 by considering a period in which the M-PSS is transmitted or the number of subframes transmitted in one radio frame.

For example, the M-PSS may be transmitted every 20 ms and in type 1, when the M-PSS is transmitted once, the M-PSS is transmitted through two subframes and in type 2, the M-PSS may be transmitted throughout one subframe.

Alternatively, instead of the M-PSS, a transmission frequency number or a transmission period of the M-SSS may be used.

More characteristically, the period in which the M-PSS is transmitted may be used for distinguish the operation modes (e.g., the stand-alone the in-band) or used for announcing a data rate matching pattern.

The data rate matching pattern may indicate that all REs are available or some REs are not available due to the legacy signal.

As such, when the transmission period is announced, the M-PSS may be transmitted by using different numbers of symbols or different durations in the case of mapping the M-SSS.

In this case, the M-SSS may be transmitted in the form of repetition.

In the case of the in-band, type 1 and type 2 may be distinguished from each other according to the operation and type 1 and type 2 may be distinguished from each other with the period or frequency of the M-SSS in the case of the in-band.

(Method 5)

Method 5 is a method that distinguishes the frame structure type with transmission frequencies.

For example, in the case of type 1, the M-PSS and the M-SSS may be transmitted at the same frequency and in the case of type 2, the M-PSS and the M-SSS may be transmitted at different frequencies.

(Method 6)

Method 6 is a method in which the M-PSS, the M-SSS, and the M-PBCH are configured to be transmitted by using different subframe numbers according to the frame structure type.

FIG. 43 is a diagram illustrating Method 6.

That is, FIG. 43 is a diagram illustrating yet another example of the M-PSS, M-SSS, and M-PBCH configurations having different locations in the radio frame proposed by the present specification.

In detail, FIG. 43 is a diagram illustrating the M-PSS, M-SSS, and M-PBCH configurations having different locations in 2 radio frames.

When Method 6 is described with reference to FIG. 43, in the case of frame structure type 1, the M-PBCH may be configured to be transmitted in subframe #0, the M-SSS may be configured to be transmitted in subframe #4, and the M-PSS may be configured to be transmitted in subframe #5.

In addition, in the case of frame structure type 2, the M-PBCH may be configured to be transmitted in subframe #0, the M-PSS may be configured to be transmitted in subframe #5 for former 10 ms and the M-SSS may be configured to be transmitted in subframe #5 for latter 10 ms (by considering the M-PSS and the M-SSS having a period of 20 ms).

That is, in this method, in the case of frame structure type 1, the M-PSS, the M-SSS, and the M-PBCH are transmitted by using 6 subframes and in the case of frame structure type 2, the M-PSS, the M-SSS, and the M-PBCH are transmitted by using 4 subframes for 20 ms.

Method 6 has the advantage in that Method 6 may be applied to all uplink-downlink configurations in the case of frame structure type 2.

FIG. 44 is a flowchart illustrating one example of a method for transmitting an M-PSS, an M-SSS, and an M-PBCH by considering the frame structure type proposed by the present specification.

First, the terminal receives a narrow band synchronization signal from the base station (S4410).

The narrow band synchronization signal may include a narrow band primary synchronization signal and a narrow band secondary synchronization signal.

Further, the narrow band primary synchronization signal and the narrow band secondary synchronization signal may be transmitted in different subframes.

The narrow band primary synchronization signal may be transmitted in a $6^{th}$ subframe of the radio frame.

The transmission periods of the narrow band primary synchronization signal and the narrow band secondary synchronization signal may be set to be different from each other.

In particular, the transmission period of the narrow band secondary synchronization signal may be set to 20 ms.

The narrow band secondary synchronization signal may be transmitted through 12 subcarriers.

The narrow band synchronization signal may be generated by using a Zadoff-Chu (ZC) sequence.

The narrow band primary synchronization signal may be generated based on a first ZC sequence and a second ZC sequence having different root indexes.

The first ZC sequence and the second ZC sequence may be mapped to symbols to which the narrow band primary synchronization signal is transmitted, respectively.

Further, the frame structure type supported by the base station may be distinguished according to the order in which the first ZC sequence and the second ZC sequence are mapped to the symbols, respectively.

Alternatively, the method is a method in which the narrow band primary synchronization signal is generated based on a ZC sequence having a specific length and the ZC sequence having the specific length is mapped to the symbols to which the narrow band primary synchronization signal is transmitted.

Thereafter, the terminal acquires time synchronization and frequency synchronization with the base station based on the received narrow band synchronization signal and detects an identifier of the base station (S4420).

Thereafter, the terminal receives a narrow band broadcast channel from the base station based on the detected identifier of the base station (S4430).

The narrow band synchronization signal and the narrow band broadcast channel are received through a narrow band (NB) and the narrow band includes a system bandwidth of 180 kHz and includes 12 subcarriers disposed at an interval of 15 kHz.

Further, the narrow band broadcast channel is transmitted in a first subframe of the radio frame.

The narrow band synchronization signal and the narrow band broadcast channel are not transmitted in at least one resource in which a reference signal (RS) is transmitted.

The narrow band synchronization signal and the narrow band broadcast channel are not transmitted in first three symbols of the first subframe and the sixth subframe.

Further, the first subframe and the sixth subframe are subframes which are not configured as a multicast broadcast single frequency network (MBSFN).

In addition, the narrow band synchronization signal and the narrow band broadcast channel may be transmitted through 11 orthogonal frequency division multiple access (OFDM) symbols.

Additionally, the terminal may verify the frame structure type supported by the base station based on at least one of the narrow band synchronization signal and the narrow band broadcast channel.

General Apparatus to which Present Invention can be Applied

FIG. 45 is a diagram illustrating one example of an internal block diagram of a wireless communication apparatus to which the methods proposed by the present specification can be applied.

Referring to FIG. 45, a wireless communication system includes a base station 4510 and multiple terminals 4520 positioned in a region of the base station 4510.

The base station 4510 includes a processor 4511, a memory 4512, and a radio frequency (RF) unit 4513. The processor 4511 implements a function, a process, and/or a method which are proposed in FIGS. 1 to 44 given above. The layers of the radio interface protocol may be implemented by the processor 4511. The memory 4512 is connected with the processor 4511 to store various pieces of information for driving the processor 4511. The RF unit 4513 is connected with the processor 4511 to transmit and/or receive a radio signal.

A terminal 4520 includes a processor 4521, a memory 4522, and an RF unit 4523. The processor 4521 implements a function, a process, and/or a method which are proposed in FIGS. 1 to 44 given above. The layers of the radio interface protocol may be implemented by the processor 4521. The memory 4522 is connected with the processor 4521 to store various pieces of information for driving the processor 4521. The RF unit 4523 is connected with the processor 4521 to transmit and/or receive a radio signal.

The memories 4512 and 4522 may be positioned inside or outside the processors 4511 and 4521 and connected with the processors 4511 and 4521 through various well-known means.

Further, when the base station 4510 and/or the terminal 4520 may have one antenna or multiple antennas.

The example of the method for transmitting the uplink signal the wireless communication system of the present specification, which is applied to the 3GPP LTE/LTE-A system is primarily described, but the method can be applied to various wireless communication systems including a 5G system, and the like in addition to the 3GPP LTE/LTE-A system.

The aforementioned embodiments are acquired by combining the components and features of the present invention in a predetermined format. It should be considered that each component or feature is selective if not additionally clearly mentioned. Each component or feature may be implemented while being not combined with other components or features. Further, some components and/or features are combined to configure the embodiment of the present invention. A sequence of the operations described in the embodiments of the present invention may be changed. Some components or features of any embodiment may be included in another embodiment or replaced with corresponding components or features of another embodiment. It is apparent that claims having no clear quoting relation in the claims are combined to configure the embodiment or may be included as new claims by correction after application.

The embodiments of the present invention may be implemented by various means, for example, hardware, firmware, software, or combinations thereof. In the case of the implementation by the hardware, methods according to embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

When the embodiments are implemented by the firmware or the software, the embodiments of the present invention may be implemented in the form of a module, a procedure, a function, and the like to perform the functions or operations described above. A software code may be stored in the memory and executed by the processor. The memory may be positioned inside or outside the processor and send and receive data to and from the processor by various means which is already known.

It is apparent to those skilled in the art that the present invention may be implemented in another specific form within the scope without departing from the essential feature of the present invention. Therefore, the detailed description should not limitedly be analyzed in all aspects and should be exemplarily considered. The scope of the present invention should be determined by rational interpretation of the appended claims and all changes are included in the scope of the present invention within the equivalent scope of the present invention.

What is claimed is:

1. A method for transceiving a signal in a wireless communication system supporting narrow-band (NB)-LTE, which is performed a terminal, the method performed by a terminal and comprising:
   receiving, from a base station, a narrow band synchronization signal;
   acquiring time synchronization and frequency synchronization with the base station based on the narrow band synchronization signal and detecting an identifier of the base station; and
   receiving, from the base station, broadcast information based on the detected identifier of the base station,
   wherein the narrow band synchronization signal and the broadcast information are received through a narrow band (NB),
   wherein the narrow band has a system bandwidth of 180 kHz and includes 12 subcarriers disposed at an interval of 15 kHz,
   wherein the narrow band synchronization signal includes a narrow band primary synchronization signal and a narrow band secondary synchronization signal,
   wherein the narrow band primary synchronization signal and the narrow band secondary synchronization signal are transmitted in different subframes, and
   wherein the broadcast information is transmitted in a first subframe of a radio frame.

2. The method of claim 1, wherein the narrow band primary synchronization signal is transmitted in a 6th subframe of the radio frame.

3. The method of claim 1, wherein the narrow band synchronization signal and the broadcast information are not transmitted in at least one resource in which a reference signal (RS) is transmitted.

4. The method of claim 2, wherein the narrow band synchronization signal and the broadcast information are not transmitted in first three symbols of the first subframe and the sixth subframe.

5. The method of claim 2, wherein the first subframe and the sixth subframe are subframes which are not configured as a multicast broadcast single frequency network (MBSFN).

6. The method of claim 1, wherein transmission periods of the narrow band primary synchronization signal and the narrow band secondary synchronization signal are set to be different from each other.

7. The method of claim 6, wherein the transmission period of the narrow band secondary synchronization signal is set to 20 ms.

8. The method of claim 1, wherein the narrow band synchronization signal and the broadcast information are transmitted through 11 orthogonal frequency division multiple access (OFDM) symbols.

9. The method of claim 8, wherein the narrow band secondary synchronization signal is transmitted through 12 subcarriers.

10. The method of claim 1, further comprising:
    checking a frame structure type supported by the base station based on at least one of the narrow band synchronization signal and the broadcast information.

11. The method of claim 10, wherein the narrow band synchronization signal is generated by using a Zadoff-Chu (ZC) sequence.

12. The method of claim 11, wherein the narrow band primary synchronization signal is generated based on a first ZC sequence and a second ZC sequence having different root indexes.

13. The method of claim 12, wherein the first ZC sequence and the second ZC sequence are mapped to symbols to which the narrow band primary synchronization signal, respectively.

14. The method of claim 13, wherein the frame structure type supported by the base station is distinguished according to the order in which the first ZC sequence and the second ZC sequence are mapped to the symbols, respectively.

15. The method of claim 11, wherein the narrow band primary synchronization signal is generated based on a ZC sequence having a specific length, and
the ZC sequence having the specific length is mapped to the symbols in which the narrow band primary synchronization signal is transmitted.

16. A terminal for transceiving a signal in a wireless communication system supporting narrow-band (NB)-LTE, the terminal comprising:
a radio frequency (RF) unit configured to transceive a wireless signal; and
a processor functionally connected with the RF unit, wherein the processor is configured to:
receive, from a base station a narrow band synchronization signal,
acquire time synchronization and frequency synchronization with the base station based on the narrow band synchronization signal and detect an identifier of the base station, and
receive, from the base station, broadcast information based on the detected identifier of the base station,
wherein the narrow band synchronization signal and the broadcast information are received through a narrow band (NB),
wherein the narrow band has a system bandwidth of 180 kHz and includes 12 subcarriers disposed at an interval of 15 kHz,
wherein the narrow band synchronization signal includes a narrow band primary synchronization signal and a narrow band secondary synchronization signal,
wherein the narrow band primary synchronization signal and the narrow band secondary synchronization signal are transmitted in different subframes, and
wherein the broadcast information is transmitted in a first subframe of a radio frame.

* * * * *